Feb. 22, 1955     A. H. DICKINSON     2,702,666
MULTIFREQUENCY ELECTRONIC MULTIPLIER
Filed Dec. 8, 1949     31 Sheets-Sheet 3
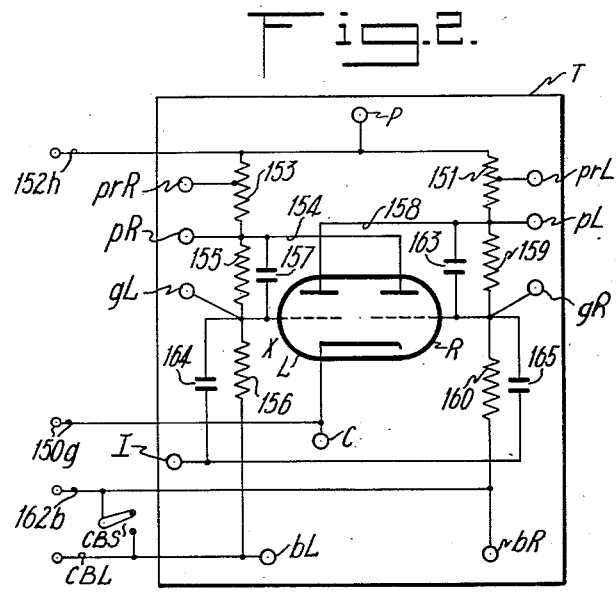
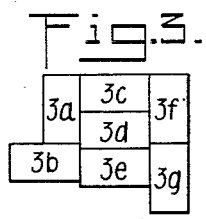
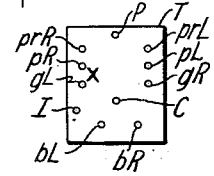
INVENTOR
ARTHUR H. DICKINSON
BY
Dwight D. Mooney
AGENT Feb. 22, 1955  A. H. DICKINSON  2,702,666
MULTIFREQUENCY ELECTRONIC MULTIPLIER
Filed Dec. 8, 1949  31 Sheets-Sheet 5
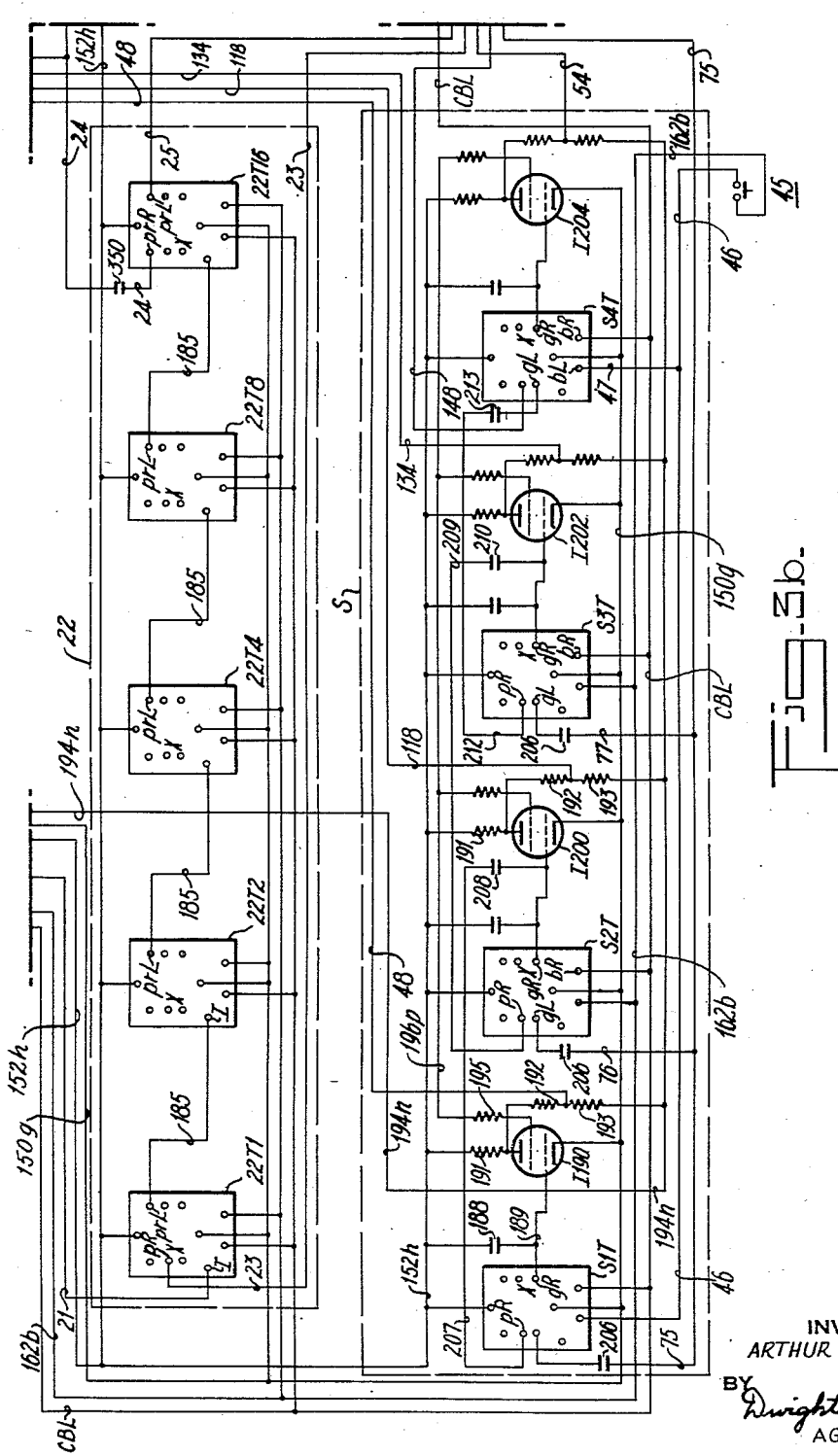
INVENTOR
ARTHUR H. DICKINSON
BY
Dwight D. Mooney
AGENT Feb. 22, 1955  A. H. DICKINSON  2,702,666
MULTIFREQUENCY ELECTRONIC MULTIPLIER
Filed Dec. 8, 1949  31 Sheets-Sheet 6
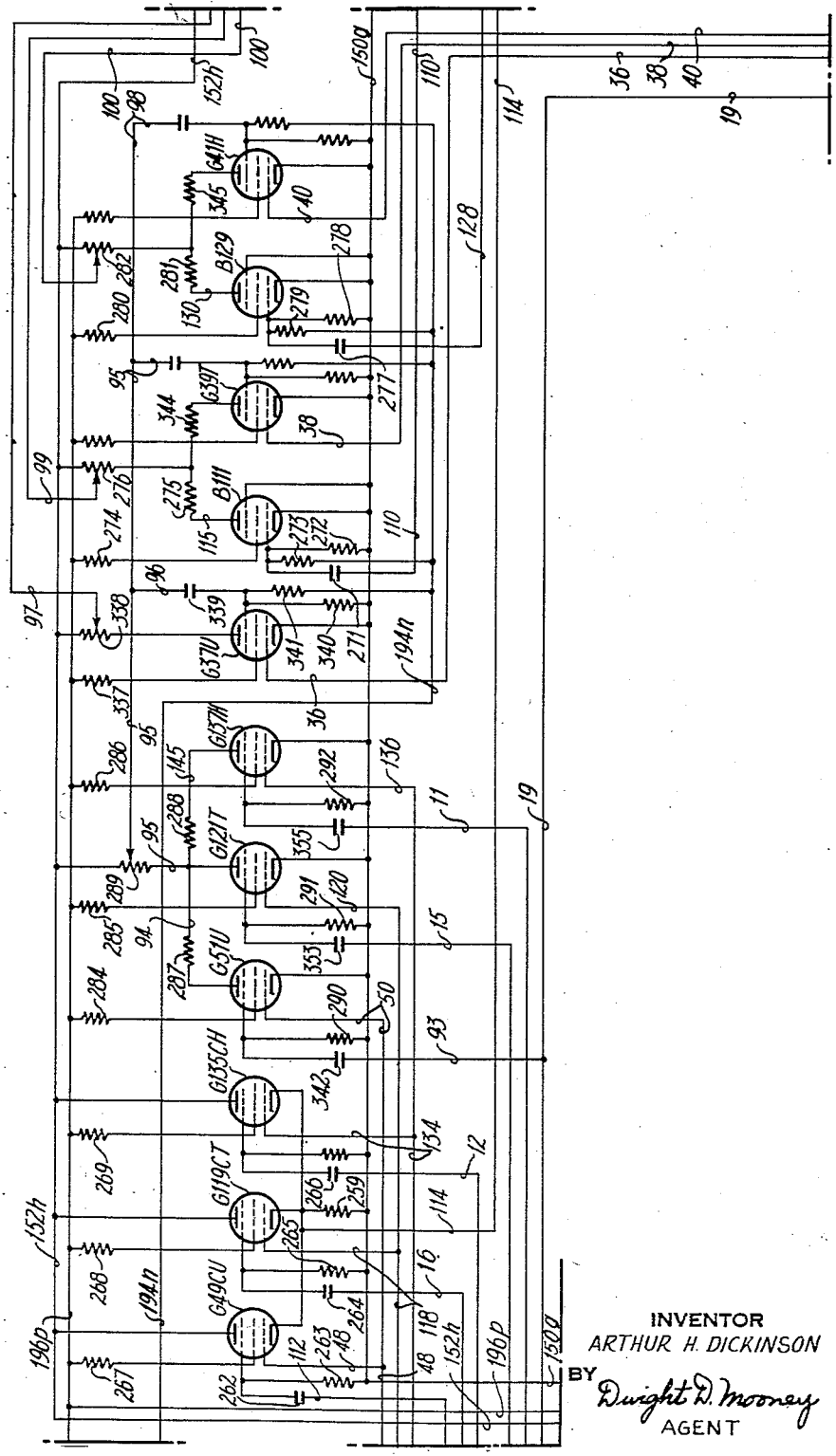
INVENTOR
ARTHUR H. DICKINSON
BY Dwight D. Mooney
AGENT

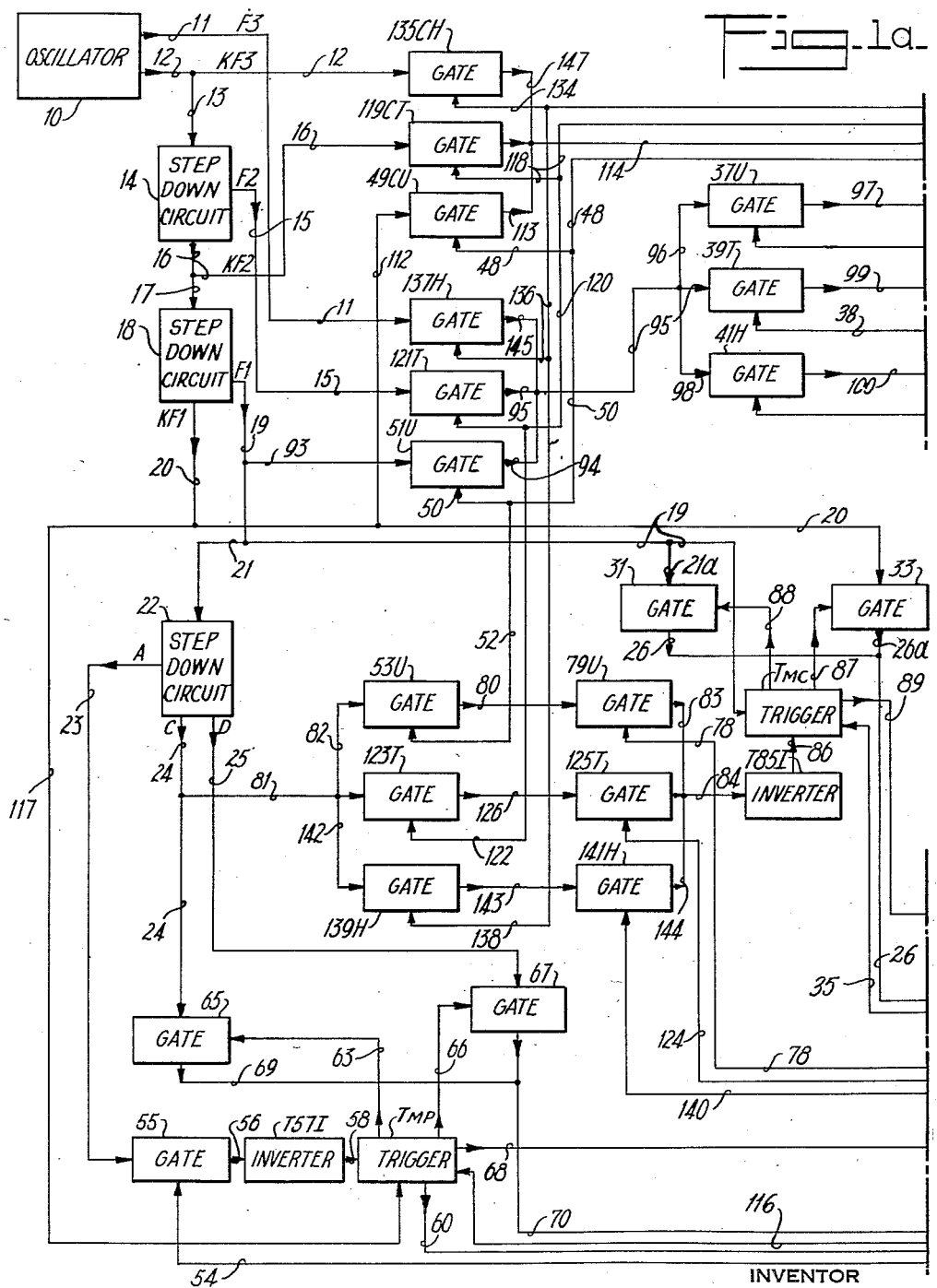

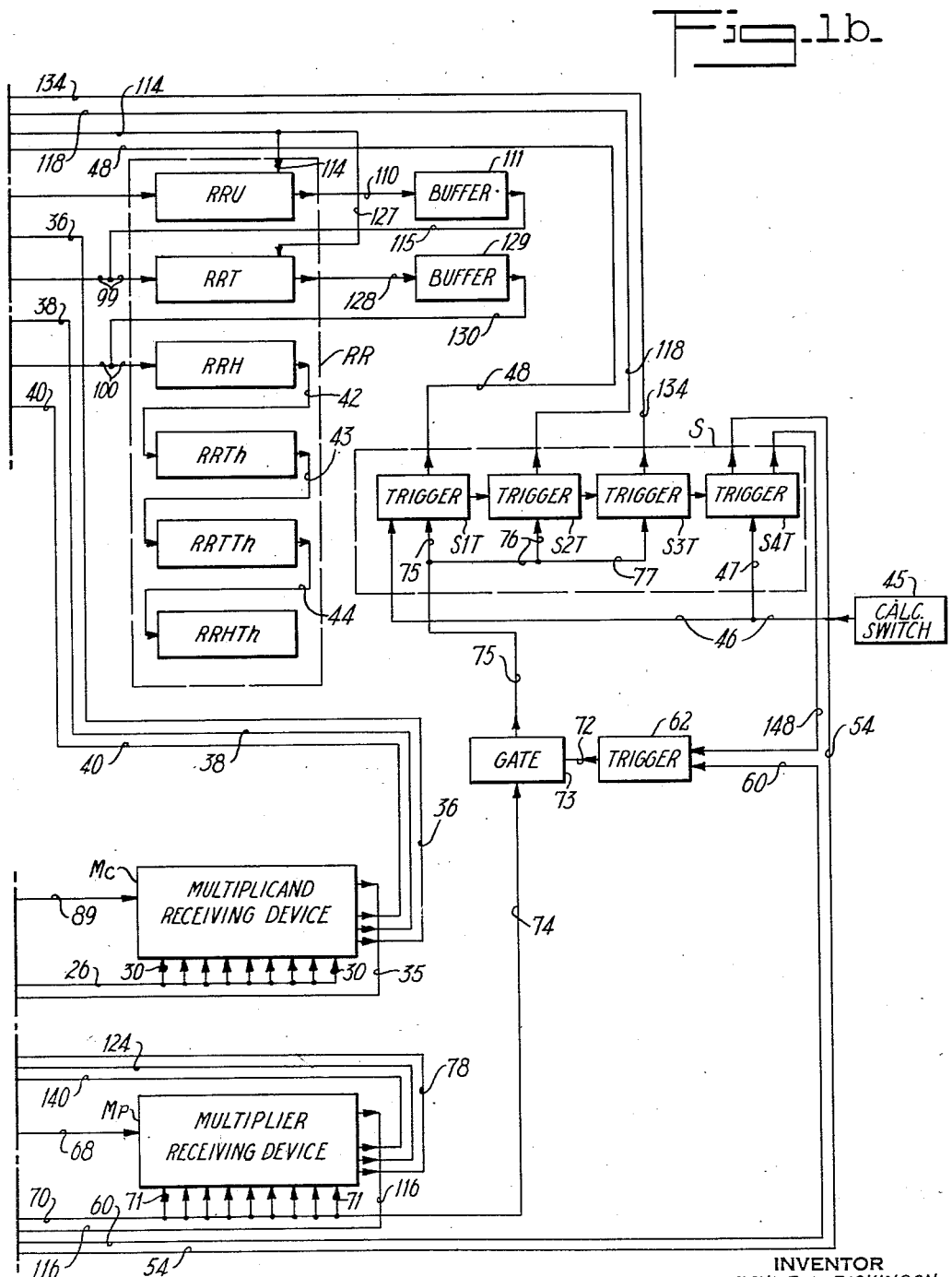

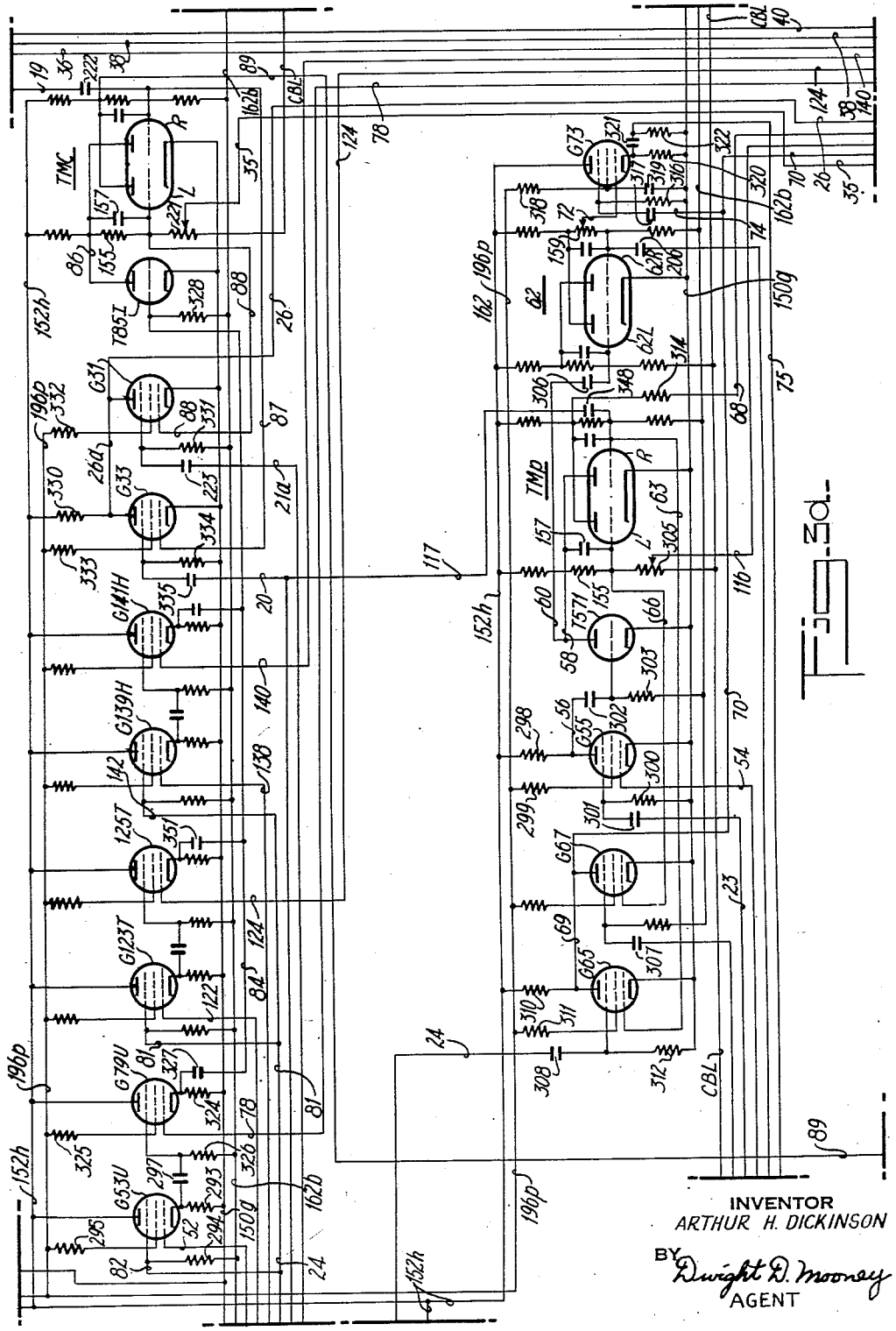

Feb. 22, 1955  A. H. DICKINSON  2,702,666
MULTIFREQUENCY ELECTRONIC MULTIPLIER
Filed Dec. 8, 1949  31 Sheets-Sheet 8

INVENTOR
ARTHUR H. DICKINSON
BY Dwight D. Mooney
AGENT

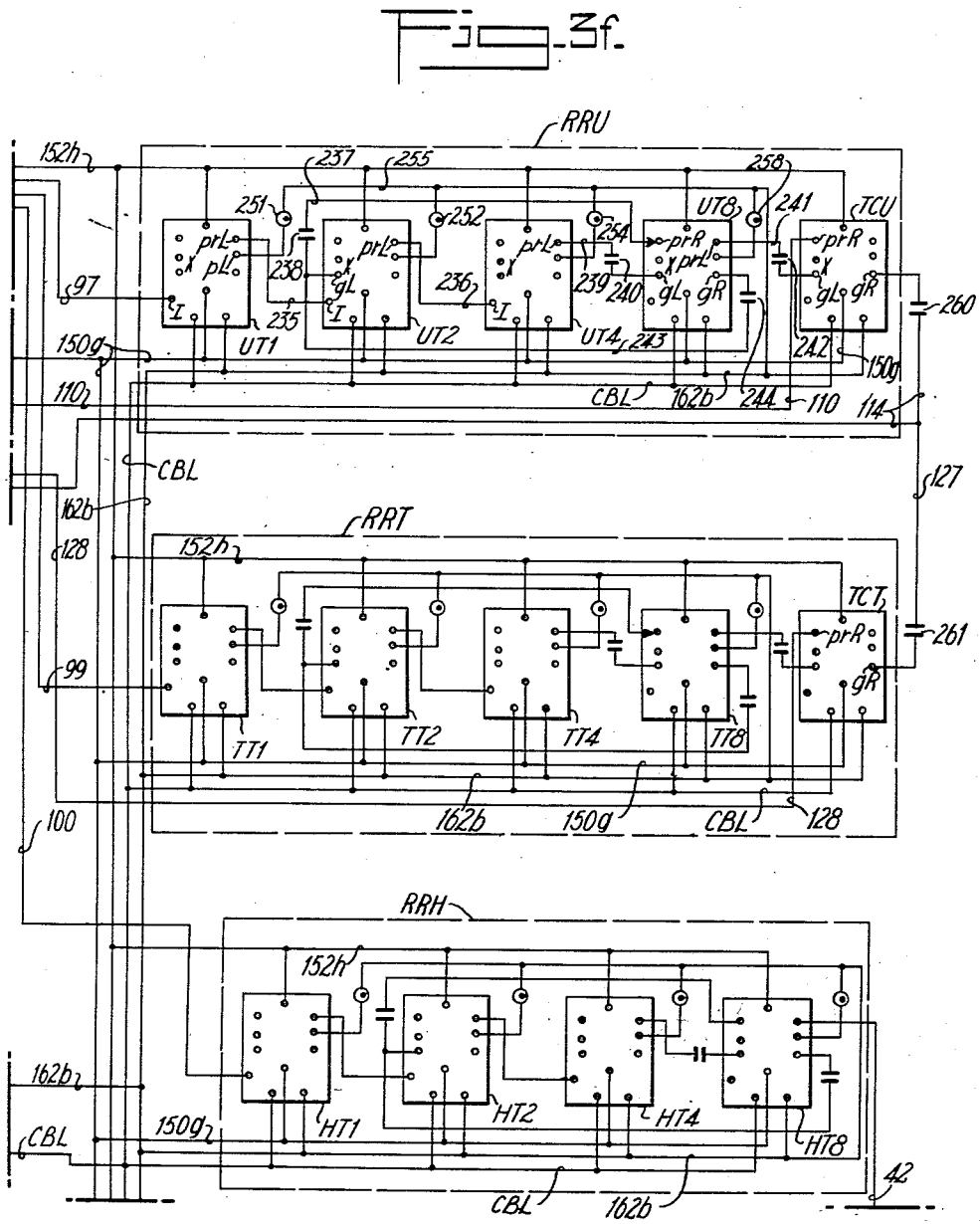

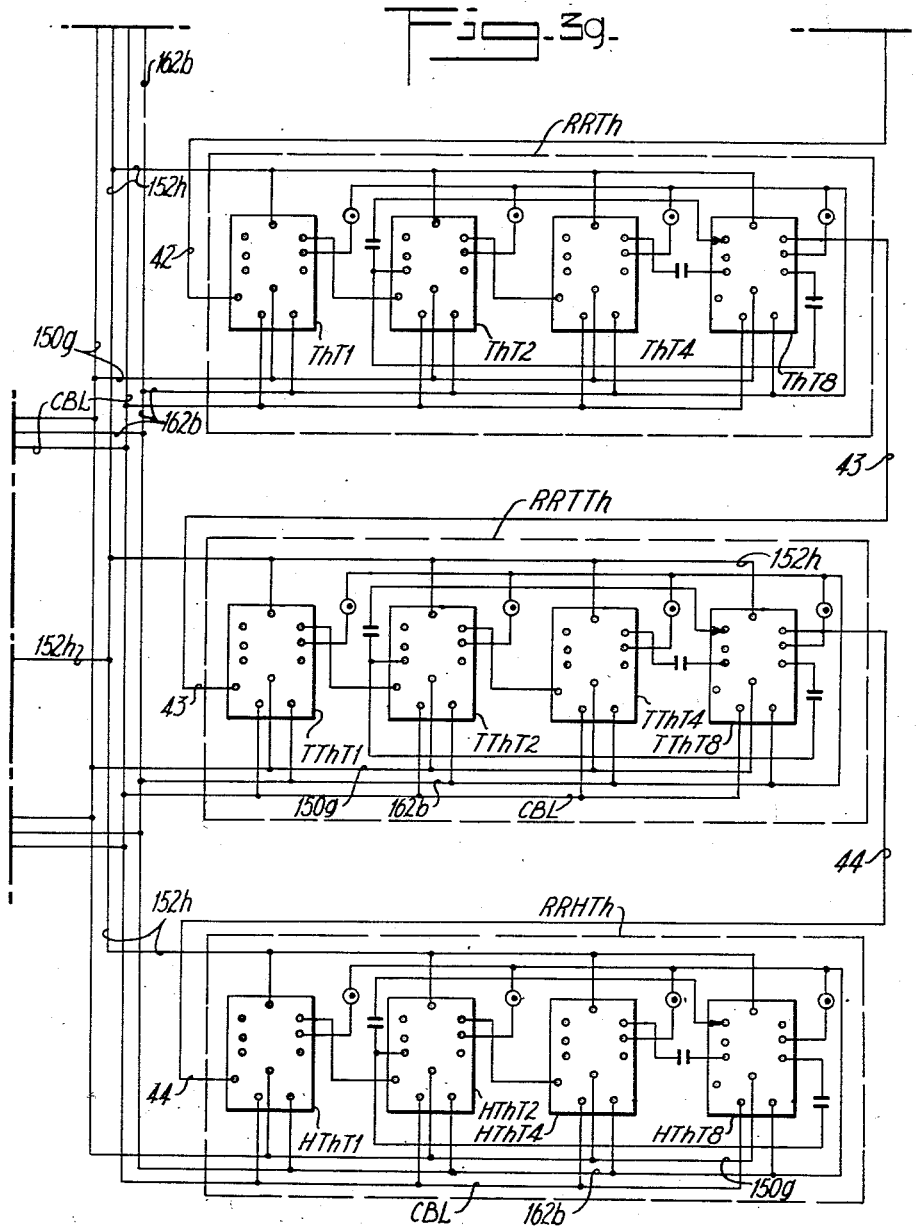

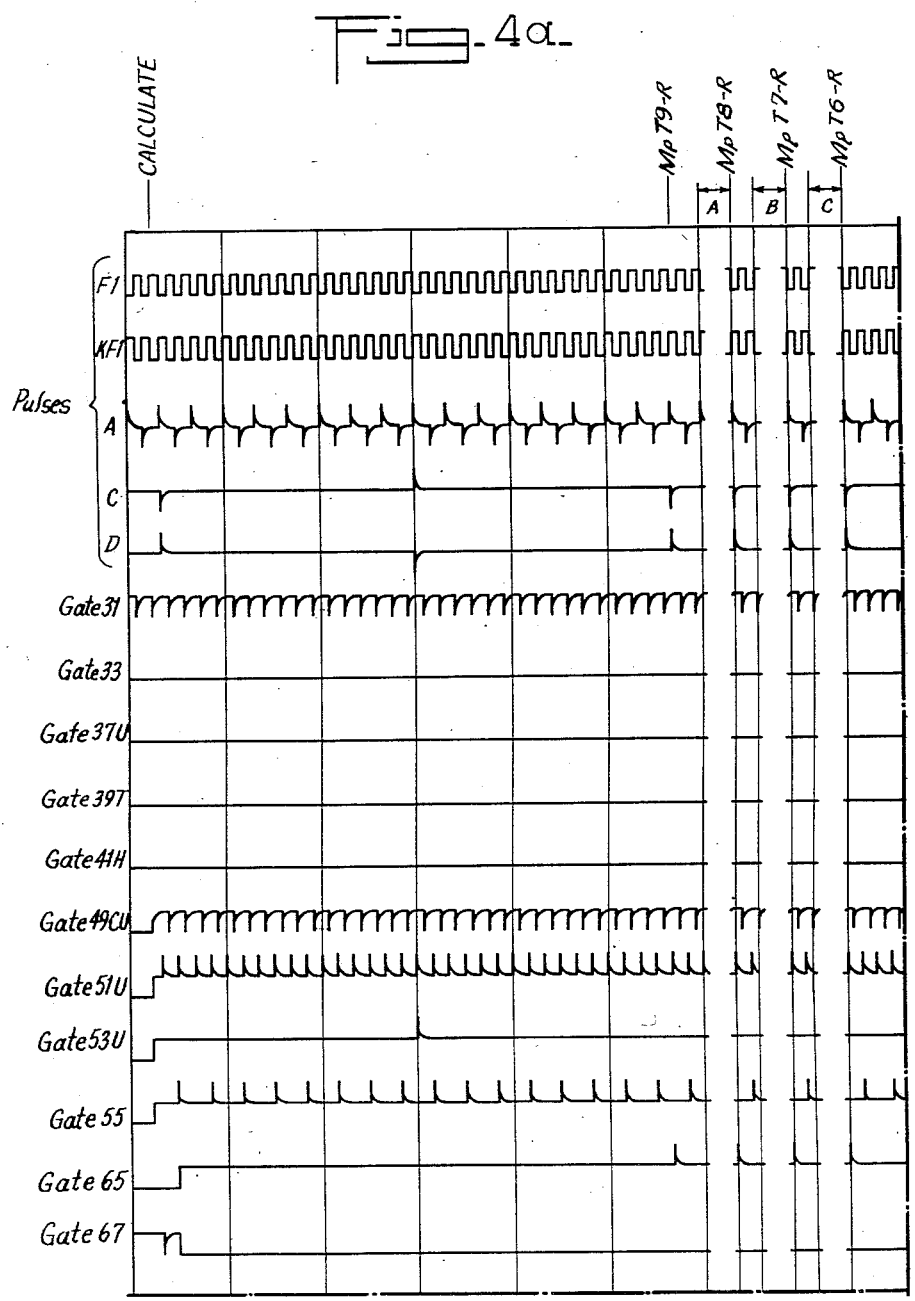

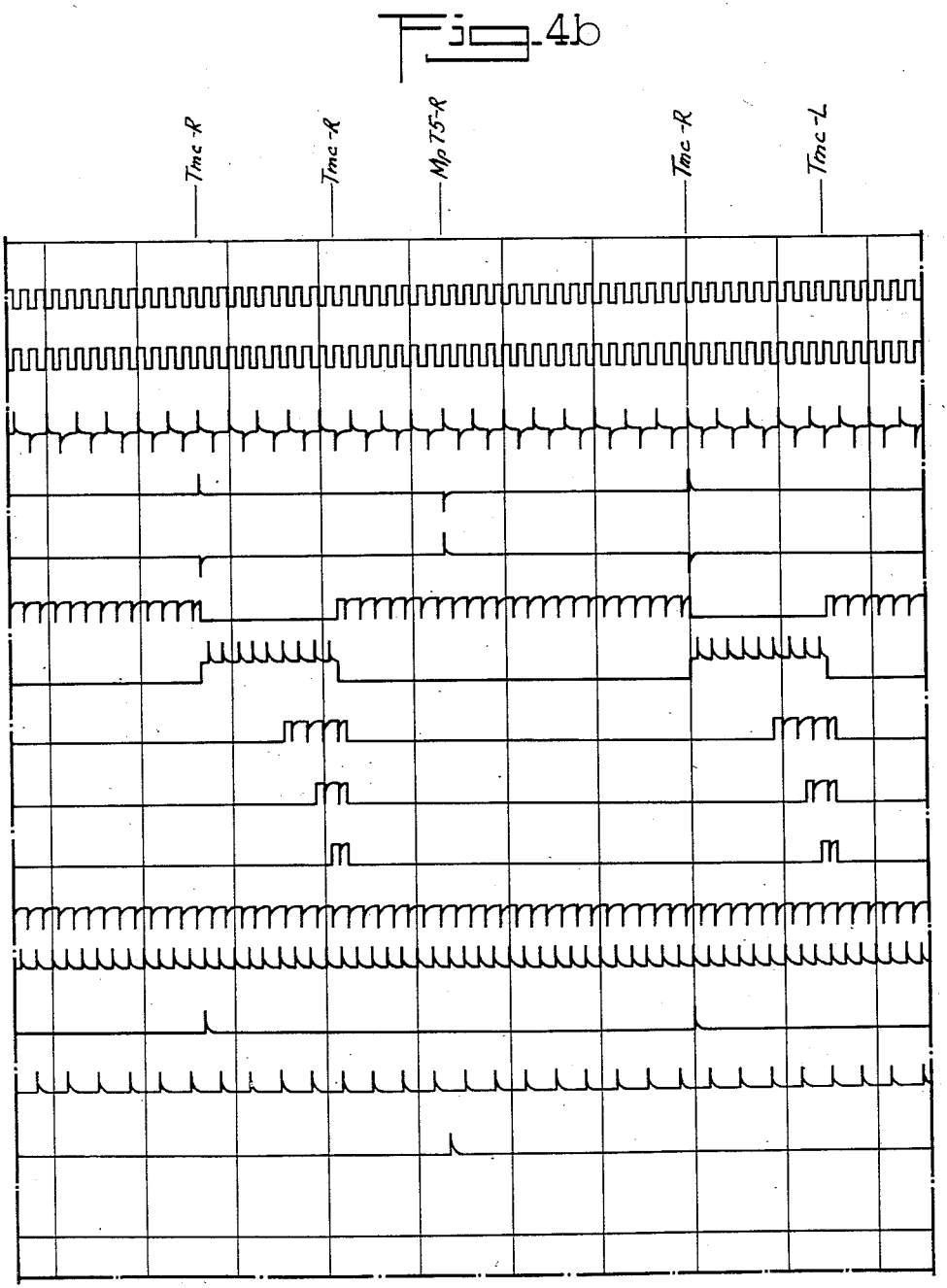

Feb. 22, 1955  A. H. DICKINSON  2,702,666
MULTIFREQUENCY ELECTRONIC MULTIPLIER
Filed Dec. 8, 1949  31 Sheets-Sheet 16

INVENTOR
ARTHUR H. DICKINSON
BY
Dwight D. Mooney
AGENT

Feb. 22, 1955 A. H. DICKINSON 2,702,666
MULTIFREQUENCY ELECTRONIC MULTIPLIER
Filed Dec. 8, 1949 31 Sheets-Sheet 20

INVENTOR
ARTHUR H. DICKINSON
BY
AGENT

Feb. 22, 1955    A. H. DICKINSON    2,702,666
MULTIFREQUENCY ELECTRONIC MULTIPLIER
Filed Dec. 8, 1949    31 Sheets-Sheet 23

INVENTOR
ARTHUR H. DICKINSON
BY
AGENT

INVENTOR
ARTHUR H. DICKINSON

Feb. 22, 1955  A. H. DICKINSON  2,702,666
MULTIFREQUENCY ELECTRONIC MULTIPLIER
Filed Dec. 8, 1949  31 Sheets-Sheet 26

INVENTOR
ARTHUR H. DICKINSON
BY
Dwight D. Mooney
AGENT

Feb. 22, 1955 A. H. DICKINSON 2,702,666
MULTIFREQUENCY ELECTRONIC MULTIPLIER
Filed Dec. 8, 1949 31 Sheets-Sheet 27

INVENTOR
ARTHUR H. DICKINSON
BY Dwight D. Mooney
AGENT

_United States Patent Office_

2,702,666
Patented Feb. 22, 1955

2,702,666

MULTIFREQUENCY ELECTRONIC MULTIPLIER

Arthur H. Dickinson, Greenwich, Conn., assignor to International Business Machines Corporation, New York, N. Y., a corporation of New York Application December 8, 1949, Serial No. 131,840

25 Claims. (Cl. 235—61)

This invention relates to an electronic multiplier which does not employ column shift and more particularly to such a multiplier which employs pulses of different recurrence frequencies to effect multiplication of a multiplicand by digits of different orders of a multiplier.

To obtain the product of a multiplicand and a multiplier the conventional multipliers either employ column shift or over-and-over addition. Multipliers of the former type necessarily employ additional circuit means to effect column shift only when multiplying the multiplicand by digits of the multiplier other than the units order digit. The incorporation of a column shift circuit is necessarily one of the major considerations involved in the design and production of multipliers and a simplification of multiplier design to eliminate it is highly desirable.

In multipliers employing over-and-over addition a multiplier receiving device controls the cyclic operation of a multiplicand receiving device to permit entry of the multiplicand into a result register only one time during each cycle of operation of the multiplicand receiving device. Sequential stepping of the multiplier receiving device causes the repeated cyclic operation of the multiplicand receiving device until the multiplicand is entered into the result register a number of times equal to the multiplier. A disadvantage of such a multiplier lies in the fact that the multiplier receiving device must go through a number of cycles of operation equal to the digital value of the multiplier. While such a multiplier does not use column shift it requires much additional operation to solve a given problem.

A principal object of this invention is to provide an electronic multiplier which eliminates the above disadvantages.

Another object is to provide a novel electronic multiplier wherein a multiplicand receiving device completes a number of cycles of operation equal to the sum of the digits of the multiplier to permit the entry into the result register of a number of pulses equal to the product of the multiplicand and the multiplier.

Another object is to provide a novel sequencer for automatically conditioning an electronic multiplier in step-by-step fashion to effect separate multiplication of a multiplicand by the digits of each order of a multiplier, from the lowest to the highest order, in turn.

Another object is to provide an electronic multiplier employing pulses having a preselected recurrence frequency of F when the multiplicand is being multiplied by the units order digit of the multiplier, a recurrence frequency of 10F when the multiplicand is being multiplied by the tens order digit of the multiplier, and a recurrence frequency of 100F when the multiplicand is being multiplied by the hundreds order digit of the multiplier.

Another object is to provide a novel electronic multiplier wherein the partial product of a multiplicand and the digit of each order of a multiplier is multiplied by a number equal to the order of the multiplier whose digit effected the multiplication to obtain the partial product.

A further object is to provide an electronic multiplier wherein the partial product of the multiplicand and each digit of the multiplier is entered into a result register in response to a source of pulses having a recurrence frequency proportional to the order of the multiplier which comprises the digit by which the multiplicand is then being multiplied.

Another object is to provide a multiplier wherein, during each cycle of the multiplicand receiving device, the multiplicand is entered into the result register a number of times equal to the order of the multiplier digit permitting that cycle of operation of the multiplicand receiving device.

Another object is to provide a multiplier receiving device having nine digit-representing elements representing the digits 1–9 inclusive, each element having two stable conditions alternately assumed and connected in series chain to be sequentially switchable to one stable condition in response to pulses applied simultaneously to all elements and a plurality of push-button switches connected to each element and representative of the same digit of different orders of a multiplier.

Another object is to provide a multiplier having a novel carry circuit selectively responsive to pulses of different preselected recurrence frequencies in accordance with the automatic stepping of a sequencer.

Another object is to provide a novel sequencer for conditioning an electronic multiplier for separately multiplying a multiplicand by the respective digits of a multiplier.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1a and 1b, placed side by side, comprise a block diagram of one embodiment of the multiplier of the invention.

Fig. 2 is a circuit diagram of a trigger circuit employed in the multiplier.

Fig. 2a is a block diagram of the trigger circuit shown in Fig. 2.

Fig. 3 is a diagram showing the arrangement of subsequent figures to comprise a complete circuit diagram of the embodiment of the invention shown in Figs. 1a and 1b.

Figs. 3a–3g are a circuit diagram of the embodiment shown in Figs. 1a and 1b.

Figure 3A:
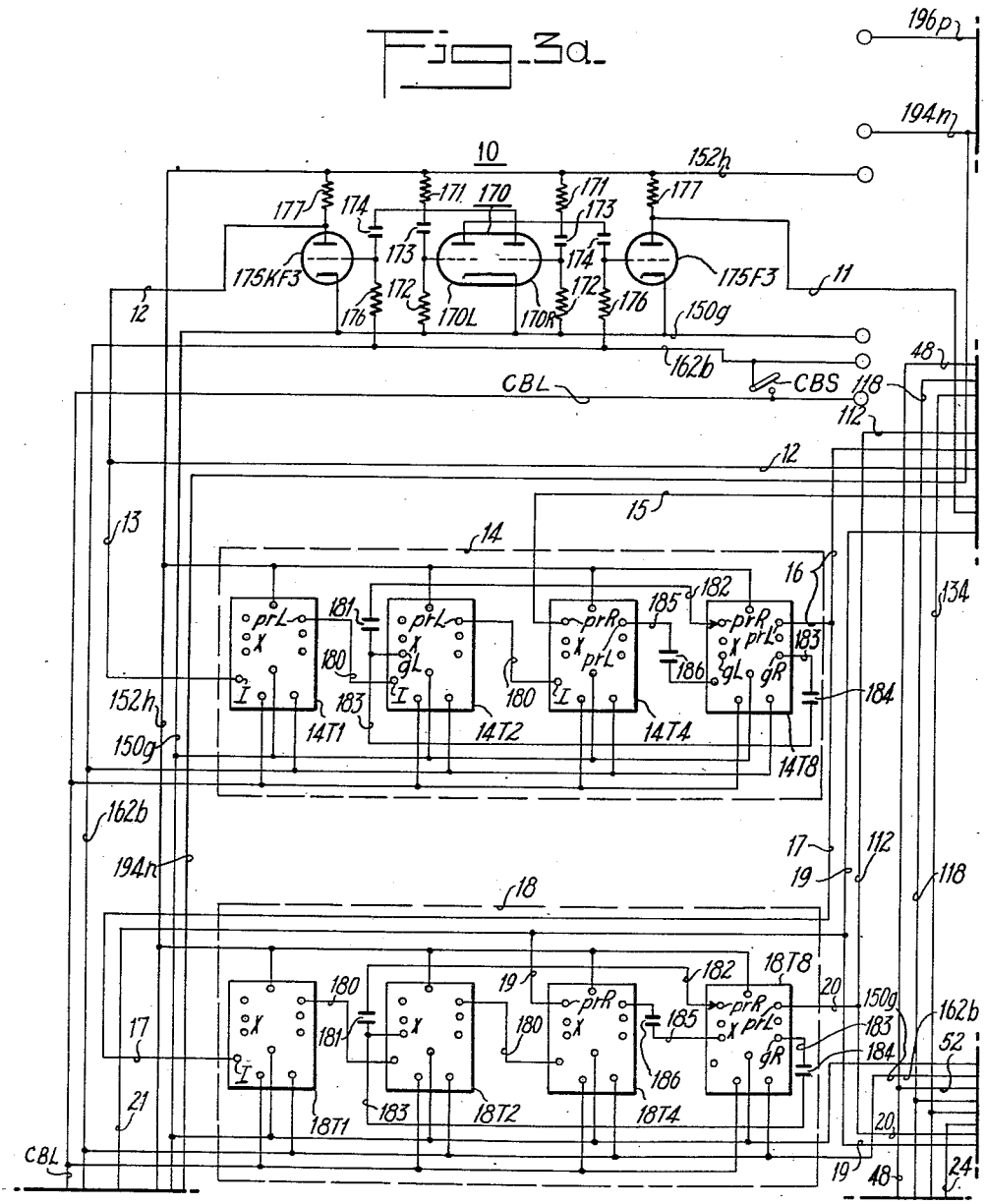
Figure 11E:
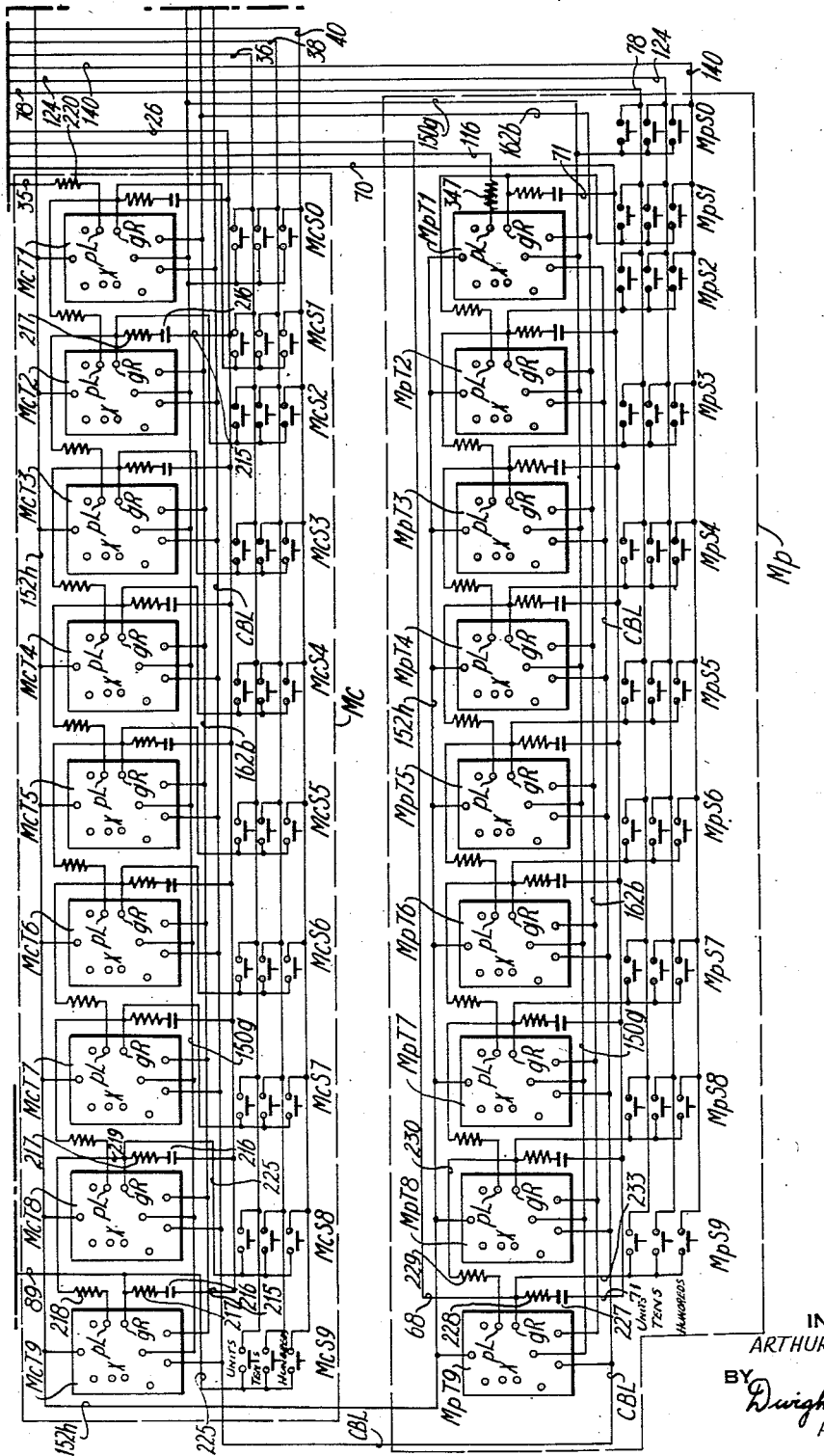
Figure 4C:
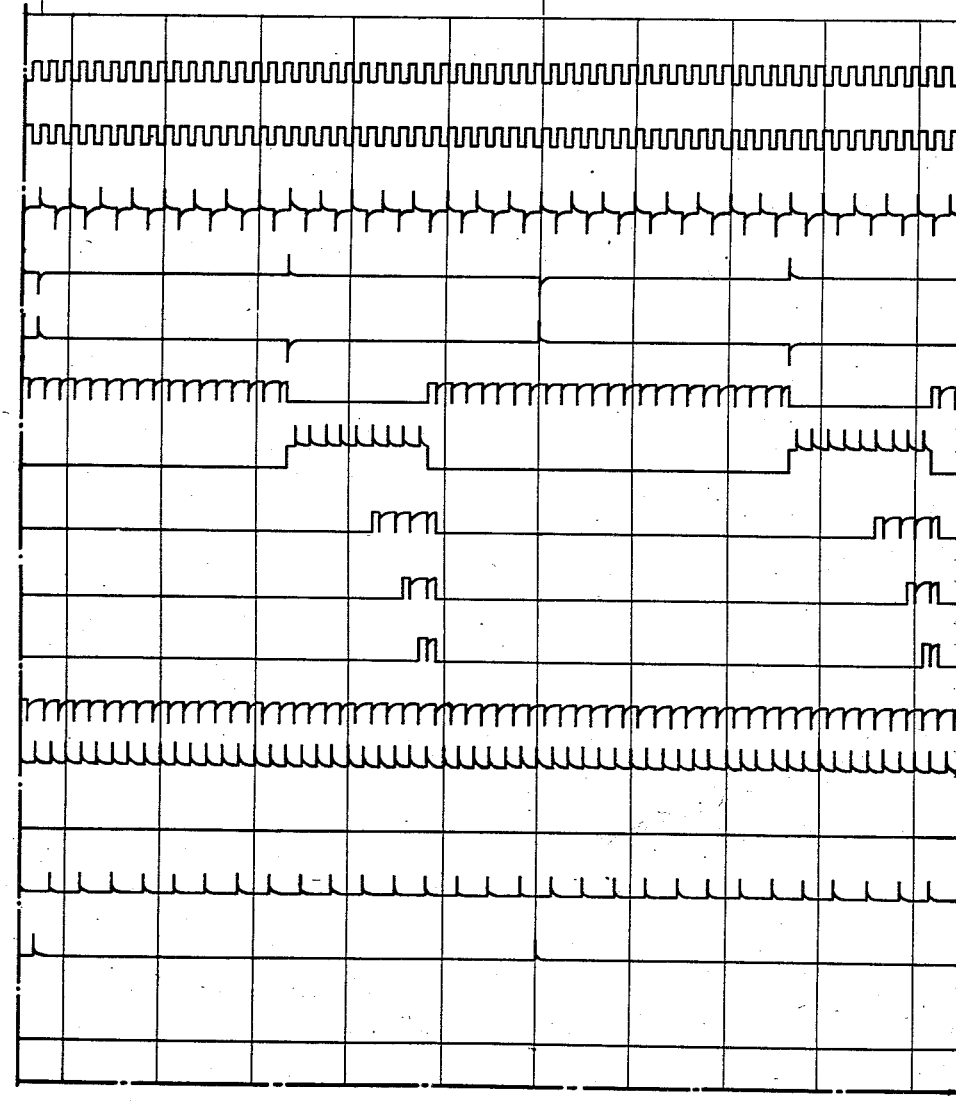
Fig. 4 is a diagram showing the arrangement of subsequent figures to provide a timing chart illustrating the operation of the multiplier when solving a particular problem, and Figs. 4a–4g, 5a–5g, and 6a–6g arranged as shown in Fig. 4 comprise a timing chart for the embodiment of the multiplier shown in Figs. 3a–3g.
Figure 4D:
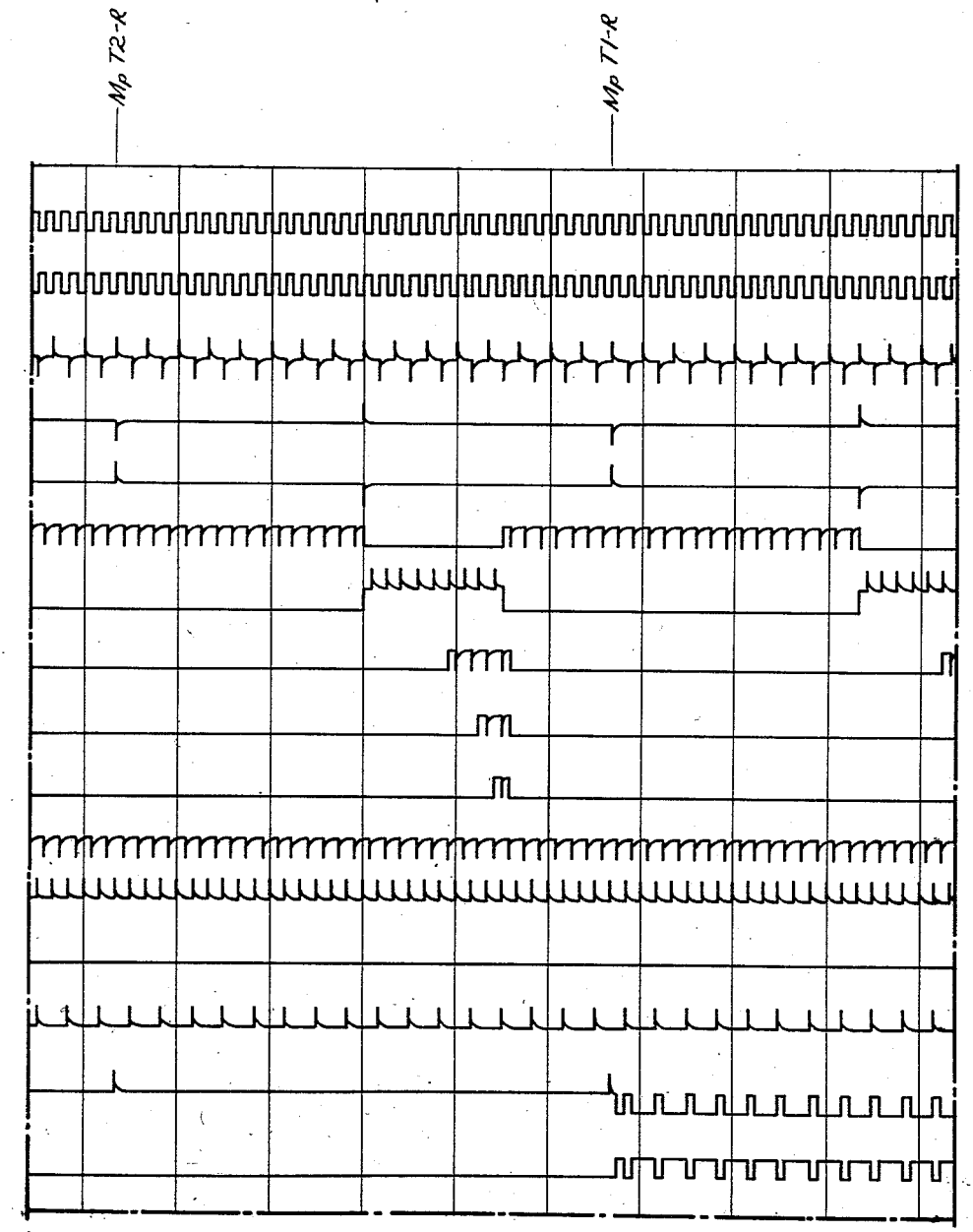
Figure 4E:
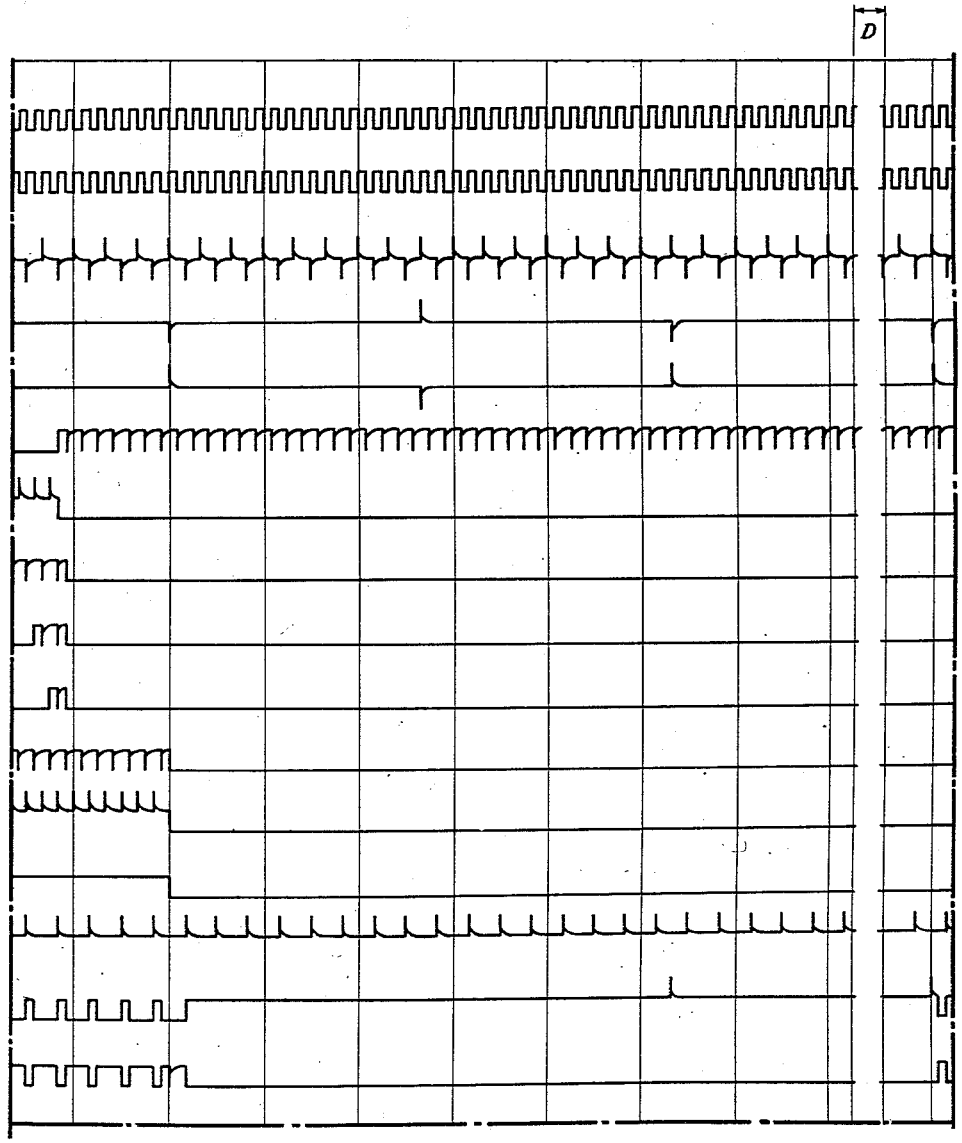
Figure 4F:
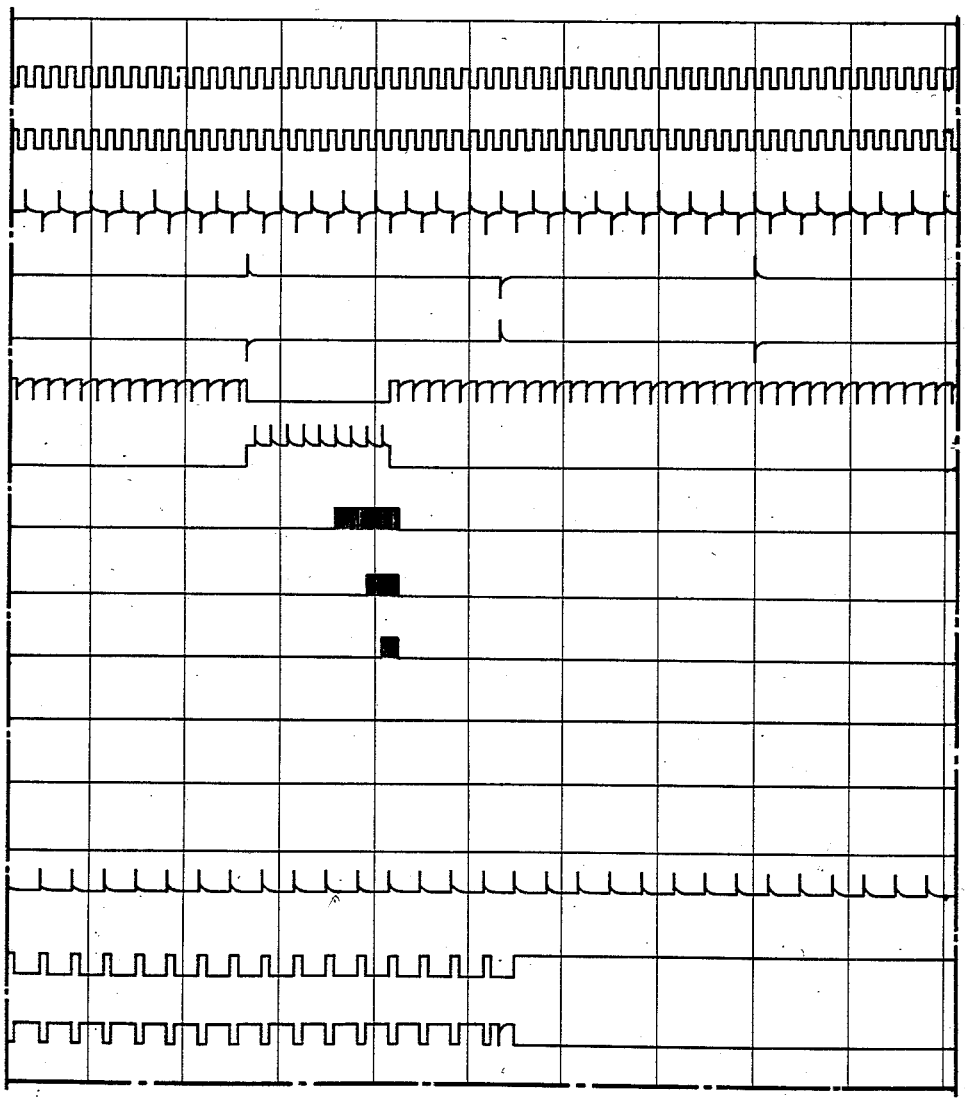
Figure 4G:
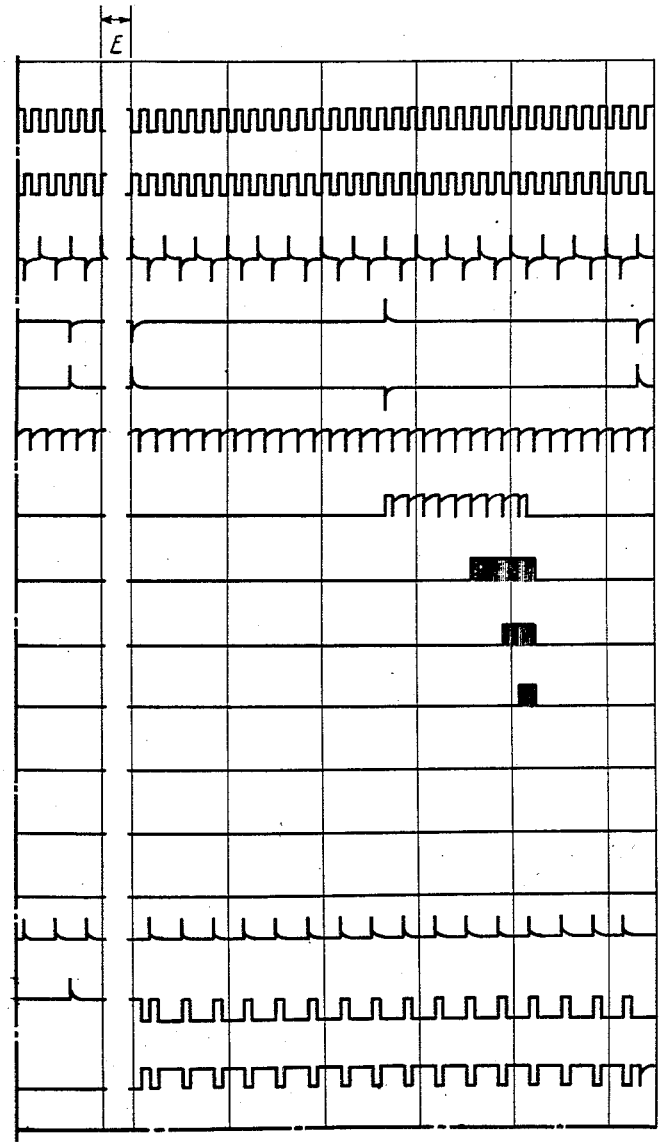

Various electronic circuits each employing one tube are used by the invention. These tubes respond to an input voltage to change their conductive state when the electrode potentials of the tube are at certain predetermined values. When the electrode potentials are at certain other values the tubes will not respond to an input voltage. Such circuits are referred to herein as electronic gates and the tubes employed in the circuits are referred to as gate tubes. When such a tube will not respond to its usual input voltage it is referred to as "de-conditioned" and when it will respond to that input it is referred to as "conditioned."

A number of trigger circuits are employed having two tubes each alternately conductive and non-conductive, and vice-versa, to represent two stable conditions. These two conditions are referred to herein as the Left and Right conditions. "Left condition" means that the left-hand tube of the trigger is conductive and that the right-hand tube is non-conductive. "Right condition" means that the right-hand tube of the trigger is conductive and the left-hand tube is non-conductive.

To facilitate the description, the specification is divided into a number of designated parts. Portions of the multiplier which do not have a part of the specification designated therefor are described in connection with the designated part deemed most pertinent thereto.

GENERAL DESCRIPTION

The product of a multiplicand and a multiplier is obtained in a novel manner in that multi-frequency entries are made into a result register a total number of times equal to the sum of digits of the multiplier and no column shift is employed. All entries are made into the result register during a single operating cycle of the multiplier receiving device employed. Entries into the units order of the result register are made at one predetermined speed and entries into the tens and hundreds order at ten times and one hundred times that preselected speed, respectively. Entries representing the multiplication of the multiplicand by the units, tens and hundreds digits, respectively, of the multiplier are always made in the result register in the order named.

This general principle of operation can be more completely understood by briefly considering the solution of a particular problem. For example, suppose the multiplicand 124 is to be multiplied by the multiplier 236. The principle employed to obtain the product of these two numbers is illustrated by Table I below.

*Table I*

| Multiplier Digit | Entries into Orders of Result Register (124×236) | | | | |
|---|---|---|---|---|---|
| | Units | Tens | Hundreds | Thousands | Ten Thousands |
| Units Order: | | | | | |
| 6 | 4 | 2 | 1 | | |
| 6 | 4 | 2 | 1 | | |
| 6 | 4 | 2 | 1 | | |
| 6 | 4 | 2 | 1 | | |
| 6 | 4 | 2 | 1 | | |
| 6 | 4 | 2 | 1 | | |
| Tens Order: | | | | | |
| 3 | 40 | 20 | 10 | | |
| 3 | 40 | 20 | 10 | | |
| 3 | 40 | 20 | 10 | | |
| Hundreds Order: | | | | | |
| 2 | 400 | 200 | 100 | | |
| 2 | 400 | 200 | 100 | | |
| Total Entries | 944 | 472 | 236 | | |
| Carry Entries | | 94 | 56 | 29 | 2 |
| Entries Remaining | 4 | 6 | 2 | 9 | 2 |

It is seen from the table that six entries are made into the units, tens and hundreds orders of the result register in response to multiplication by the units order multiplier digit 6, three entries are made in response to multiplication by the tens order multiplier digit 3, and two entries are made in response to multiplication by the hundreds order multiplier digit 2.

The first entry made into the result register is 124 and this is made six times to complete the multiplication by the units order multiplier digit 6. Next, multiplication of the multiplicand by the tens order multiplier digit 3 is performed. However, since 3 is a tens digit, and no column shift is employed, 1240 is entered into the result register three times. Next, multiplication of the multiplicand by the hundreds order multiplier digit 2 of the multiplier is performed by entering 12400 into the result register twice. Hence, entries are made into the result register eleven times which is the sum of the digits of the multiplier 236.

Each order of the result register has a digital capacity of 10. This necessitates carry from a lower order to the next higher order in response to each tenth entry into the lower order. Since a total of 944 entries are made into the units order of the result register, 94 carry entries are provided from the units order to the tens order making a total of 566 entries into the tens order. This means that 56 carry entries are provided from the tens order to the hundreds order making a total of 292 entries into the hundreds order. As a result, 29 carry entries are provided from the hundreds order to the thousands order and 2 carry entries from the thousands order to the ten-thousands order. The entries remaining in the various orders of the result register are read from right to left indicating that the product is 29,264.

The electronic multiplier of the invention will be described generally with reference to the diagrammatic showings of Figs. 1a and 1b, Fig. 1b being placed alongside and to the right of Fig. 1a to form a complete block diagram for the multiplier.

The oscillator 10 supplies two distinct series of pulses each having positive and negative pulses occurring alternately in time and 180° out of phase. These pulses, or pulses derived from them, are the only pulses used to actuate the multiplier. The pulses of these series are designated F3 and KF3, respectively. Only the negative pulses of these series, which pulses are 180° out of phase with the positive pulses, are employed by the invention.

The F3 pulses appear on a lead 11 and the KF3 pulses on a lead 12. The negative KF3 pulses are transferred over leads 12 and 13 to the step-down circuit 14 which produces positive and negative pulses on each of the leads 15 and 16. The pulses appearing on these leads are designated F2 and KF2, respectively. The F2 and KF2 pulses are 180° out of phase with each other and an F2 and KF2 pulse is always in phase with a negative KF3 pulse and occur at one-tenth the frequency that KF3 pulses occur.

The negative KF2 pulses are transferred over leads 16 and 17 to the step-down circuit 18 which produces positive and negative F1 and negative KF1 pulses which appear on the leads 19 and 20, respectively, and have a frequency equal to one-tenth that of the negative KF2 pulses. The positive and negative F1 pulses are 180° out of phase and the negative F1 and negative KF1 pulses are 180° out of phase.

Negative F1 pulses are transferred over leads 19 and 21 to the step-down circuit 22 which produces positive and negative A, C, and D pulses which pulses appear on the leads 23, 24, and 25, respectively. Negative C and negative D pulses occur simultaneously with negative F1 pulses and at one thirty-second the frequency of these F1 pulses. The negative C pulses are 180° out of phase with the negative D pulses and the positive C pulses, a negative C pulse occurring simultaneously with a positive D pulse and a negative D pulse occurring simultaneously with a positive C pulse. The positive A pulses are not utilized by the multiplier and the negative A pulses occur at one-half the frequency of the negative F1 pulses and simultaneously therewith. A negative A pulse never occurs simultaneously with either a positive or negative C or D pulse.

The multiplicand receiving device Mc includes ten push-button switches (not shown) corresponding to the digits 0–9, inclusive, for each order of the multiplicand. Only one of the switches of each order may be depressed at any one time. These switches are selectively depressed to effect a closure thereof and entry of the multiplicand corresponding to the digit of that order represented by the individual switch depressed. Nine digit-representing elements corresponding to the digits 1–9, inclusive, are provided to be sequentially switched in response to positive pulses supplied over the lead 26 connected to the gates 31 and 33 and to the digit-representing elements by the leads designated 30. The gate 31 is rendered conductive by positive F1 pulses transferred to it over the leads 19 and 21a and the gate 33 is rendered non-conductive by negative KF1 pulses supplied to it over the lead 20. When the digit-representing element corresponding to the digit 1 of the multiplicand is switched from its preselected condition, a voltage is transferred over a lead 35 to the trigger T$mc$ to supply a steady bias thereto. When the digit-representing element corresponding to the particular chosen units digit of the multiplicand is switched from its preselected condition a positive voltage is transferred over the corresponding closed switch (not shown) and a lead 36 to condition the gate 37U. When the digit-representing element corresponding to the tens digit of the multiplicand is so switched a positive voltage is transferred over the corresponding closed switch (not shown) and a line 38 to condition the gate 39T, and when the digit-representing element corresponding to the hundreds digit of the multiplicand is so switched a positive voltage is transferred over the corresponding closed switch (not shown) and a lead 40 to condition the gate 41H.

The multiplier receiving device M$p$ is similar to the multiplicand receiving device Mc. The result register RR comprises six orders labelled RRU, RRT, RRH, RRT$h$, RRTT$h$, and RRHT$h$ to designate the units, tens, hundreds, thousands, ten thousands and hundred thousands orders respectively. Input pulses are supplied to the units, tens and hundreds order with a carry pulse being supplied from the units order to the tens order and from the tens order to the hundreds order subsequent to the receiving of each tenth pulse into the units and tens orders respectively. Each tenth pulse received by RRH causes a pulse to be transferred over a lead 42 to RRT$h$ and each tenth pulse received by RRT$h$ causes a pulse to be transferred over a lead 43 to RRTT$h$.

Likewise each tenth pulse received by RRTT*h* causes a pulse to be transferred over a lead 44 to RRHT*h*.

To set up the problem to be solved by the multiplier, the push-button switches of the multiplicand receiving device corresponding to the digits of the multiplicand are depressed and the push-button switches of the multiplier receiving device corresponding to the digits of the multiplier are depressed.

A sequencer S comprises the trigger circuits S1T, S2T, S3T, and S4T. When the multiplier is in the preselected starting condition, the triggers S1T–S4T, inclusive, are in the Right condition.

To effect the multiplication of the multiplicand by the multiplier the calculate switch 45 is closed. As a result, a voltage is transferred over a lead 46 to the trigger S1T to cause it to switch to the Left condition and a voltage is transferred over the lead 46 and a lead 47 to the trigger S4T to cause it to be switched to the Left condition. When the trigger S1T is switched Left, a positive voltage is transferred over a lead 48 to the gate 49CU (Fig. 1*a*) to render it conductive and over the leads 48 and 50 to condition the gate 51U (Fig. 1*a*) and over the leads 48, 50 and 52 to condition the gate 53U (Fig. 1*a*). When the trigger S4T is switched Left, a positive voltage is transferred over a lead 54 to the gate 55 (Fig. 1*a*) to render it conductive.

The next negative A pulse transferred over the lead 23 to the gate 55 causes it to be rendered non-conductive and transfer a positive pulse over a lead 56 to the inverter 57I. The inverter then transfers a negative pulse over a lead 58 to the trigger T*mp* causing it to switch from its initial Left condition to the Right condition.

When the trigger T*mp* is switched to the Right condition, a pulse is transferred over the lead 60 to cause the trigger 62 (Fig. 1*b*) to be switched from the Left to the Right condition. Also the voltage on the lead 63 connected to the trigger T*mp* (Fig. 1*a*) rises and the increased voltage is transferred to the gate 65 to render it conductive so that it will be rendered non-conductive by subsequent negative C pulses transferred to it over the lead 24. The voltage on the lead 66 connected to the trigger T*mp* decreases and thereby de-conditions the gate 67 to prevent any further pulse transfer therefrom in response to positive D pulses transferred to it over the lead 25.

The voltage on the lead 68 connected to the trigger T*mp* is also increased and a positive bias is transferred to the digit-representing element of the multiplier receiving device M*p* corresponding to the digit 9. This positive bias renders this digit-representing element responsive to the next positive pulse from the gate 65 which is rendered non-conductive by the next negative C pulse. This positive pulse is transferred over the leads 69 and 70 to the nine leads designated 71, each connected to a different one of the nine digit-representing elements of the multiplier receiving device. The first positive pulse causes a switching of the stable condition of the digit-representing element corresponding to the digit 9 which is properly biased in the manner above described to be responsive thereto.

This switching of the digit-representing element corresponding to 9 causes a positive bias to be applied to the digit-representing element corresponding to the digit 8 such that the next positive pulse applied thereto from the gate 65 causes it to be switched to apply a similar bias voltage to the element corresponding to the digit 7. Subsequent positive pulses from the gate 65 cause the continued sequential switching of the digit-representing elements until the ninth pulse effects a switching of the element corresponding to the digit 1 to thereby place all elements in a stable condition other than their preselected starting condition.

When the trigger 62 was switched to the Right condition as a result of the switching of the trigger T*mp* to the Right condition, the voltage on the lead 72 was increased to render the gate 73 (Fig. 1*b*) conductive. The conduction of gate 73 has no effect on the condition of any other circuit of the multiplier.

When the digit-representing element of the multiplier receiving device corresponding to the digit 1 is sequentially switched, the trigger T*mp* is switched back to the Left condition and the gate 67 is rendered conductive by the next positive D pulse to transfer a negative pulse over the leads 70 and 71 to switch all the digit-representing elements of the multiplier receiving device to their preselected starting condition. This same negative pulse is transferred over the leads 70 and 74 to the gate 73 to render it non-conductive. A negative pulse is then transferred from the gate 73 over the lead 75 to the trigger S1T, over the leads 75 and 76 to the trigger S2T and over the leads 75, 76, and 77 to the trigger S3T. However, this switching of the trigger T*mp* and the positive D pulse which renders the gate 67 conductive, do not occur until after the product of the multiplicand and units digit of the multiplier is entered into the result register as described hereinafter.

When the digit-representing element of the digit represented by a closed switch of the units order of the multiplier receiving device is sequentially switched from its preselected starting condition, a positive bias voltage is transferred over a lead 78 to the gate 79U to condition it. The next positive pulse transferred over the lead 80 from the gate 53U renders the gate 79U conductive.

The gate 53U is now conditioned because the trigger S1T of the sequencer (Fig. 1*b*) is in the left condition. Positive C pulses are transferred from the step-down circuit 22 over the leads 24, 81 and 82 to render the gate 53U conductive to cause the gate 79U to be rendered conductive to transfer a positive pulse over the leads 83 and 84 to the inverter 85I which is thereby caused to transfer a negative pulse over a line 86 to the trigger T*mc* causing it to switch from the Left to the Right condition.

When the trigger T*mc* is switched to the Right condition, the increased voltage at the lead 87 is transferred to the gate 33 to render it conductive. Each subsequent negative KF1 pulse applied to the gate 33 renders it non-conductive so that positive pulses are transferred over the leads 26 and 26*a* and the leads 30 to the digit-representing elements of the multiplicand receiving device to switch the one element which is properly biased from its preselected stable condition.

Also when the trigger T*mc* is switched to the Right condition the voltage at the lead 88 is transferred to the gate 31 to de-condition it so that it is no longer responsive to positive F1 pulses applied to it. Also the voltage on the lead 89 is increased and a positive bias voltage is applied to the digit-representing element of the multiplicand receiving device M*c* which corresponds to the digit 9 so that the next positive pulse applied to the digit-representing elements of this device will switch this element from its preselected stable condition. When this digit-representing element is so switched it causes a positive bias to be impressed on the digit-representing element corresponding to the digit 8 so that the next positive pulse applied to the digit-representing elements causes a switching of this digit-representing element. This process of sequential switching is continued as in the multiplier receiving device M*p* until the ninth positive pulse impressed on the leads 30 causes a switching of the stable condition of the digit-representing element of the multiplicand receiving device M*c* corresponding to the digit 1. When the stable condition of the respective digit-representing elements corresponding to the units, tens and hundreds digit of the multiplicand is changed the respective gates 37U, 39T, and 41H are conditioned.

Since the gate 51U (Fig. 1*a*) was rendered conductive by a switching of the trigger S1T of the sequencer S (Fig. 1*b*) it is rendered non-conductive by each negative F1 pulse transferred to it over the leads 19 and 93. Each time the gate 51U is rendered non-conductive, a positive pulse is transferred over leads 94, 95, and 96 to the gate 37U to render it conductive and cause it to transfer a pulse over the lead 97 to the units order RRU of the result register RR. Pulses are also transferred from the gate 51U over the leads 94 and 95 to the gate 39T and from the gate 51U over the leads 94, 95, and 98 to the gate 41H. When the gates 39T and 41H are conditioned by a change in the stable condition of the digit-representing element of the multiplicand receiving device corresponding to the tens and hundreds digit, respectively, of the multiplicand, pulses from the gate 51U cause the gates 39T and 41H to be rendered conductive. It should be noted that the negative F1 pulses which render the gate 51U non-conductive and the negative KF1 pulses which effect sequential switching of the multiplicand receiving device are of the same frequency. Hence, one entry is made into the result register each time the stable condition of a digit-representing element of the multiplicand receiving device is changed.

The initial conduction of the gates 37U, 39T, and 41H occurs when a number of entries are made into the multiplicand receiving device equal to the tens complement of the units, tens, and hundreds digit of the multiplicand, respectively. Hence, when the multiplicand receiving device has completed a complete cycle of operation, the multiplicand has been entered into the result register one time. When the stable condition of the digit-representing element corresponding to the digit 1 is sequentially switched, a steady bias voltage is transferred over the lead 35 to the trigger T$mc$ so that the next negative F1 pulse transferred to it over the lead 19 causes it to switch from the Right to the Left condition. This causes the gate 33 to be de-conditioned and the gate 31 to be conditioned. The next positive F1 pulse transferred over the leads 19 and 21$a$ to the gate 31 causes it to be rendered conductive and a negative pulse to be transferred over the leads 26 and 30 to the digit-representing elements of the multiplicand receiving device to simultaneously switch them back to their preselected starting condition.

While the trigger T$mc$ remained in the Right condition, the multiplicand receiving device went through one complete cycle of sequential operation. During this time a negative C pulse does not occur and the stable condition of the digit-representing elements of the multiplier receiving device are not changed.

Following the switching of the trigger T$mc$ back to the Left condition, a negative C pulse occurs to change the stable condition of the next lower representing element of the multiplier receiving device. This permits the multiplicand receiving device to go through another cycle of operation to effect entry of the multiplicand into the result register one more time.

Each order of the result register, except the units and tens orders RRU and RRT, respectively, comprises four triggers (not shown) connected in series chain. Each of these orders includes a fifth or carry trigger switchable only from its preselected stable condition by a switching of the fourth trigger of the chain to one stable condition in response to each tenth entry into that order.

When this fifth trigger of the units order is so switched, a negative pulse is transferred over the lead 110 to the buffer 111 but has no effect thereon since the buffer is responsive only to positive pulses. When entries of the multiplicand are made into the result register as a result of its multiplication by the units digit of the multiplier, the gate 49CU is conductive and is rendered non-conductive by each negative KF1 pulse transferred to it over the leads 20 and 112. As a result, negative pulses are transferred over the leads 113 and 114 to the carry trigger of RRU. When this carry trigger is switched from its preselected condition to each tenth entry in the result register, the next negative pulse transferred thereto from the carry trigger causes it to be switched back to its preselected condition to transfer a positive pulse over the lead 110 to render the buffer 111 responsive. The negative pulse produced by the buffer is transferred over leads 115 and 99 to the tenth order RRT to advance it by a count of one.

Since the negative F1 pulses cause normal entry into the result register to effect multiplication by the units digit of the multiplier and the negative KF1 pulses which cause carry from the units order to the tenth order are 180° out of phase with the negative F1 pulses, the actual carry is effected between the occurrence of two negative F1 pulses so that there is no possibility of the normal entries and carry entries occurring simultaneously and thereby introducing an error in the product indicated by the result register.

The cyclic entry of the multiplicand into the result register, as described above, is continued until the stable condition of the digit-representing element of the multiplier receiving device corresponding to the digit 1 is switched from its preselected stable condition. When this occurs, the increased voltage on the lead 116 is transferred to the trigger T$mp$ so that the next negative KF1 pulse transferred from the step-down circuit 18 over the leads 20 and 117 causes the trigger T$mp$ to be switched to the Left condition. As a result of the decreased voltage transferred over the lead 63 to the gate 65, that gate is de-conditioned to prevent further pulse transfer therefrom to the multiplier receiving device. The increased voltage on the lead 66 is transferred to the gate 67 to condition it so that the next subsequent positive D pulse applied to it causes the negative pulse to be transferred over the leads 70 and 71 to switch all the digit-representing elements of the multiplier receiving device simultaneously to their initial stable condition. This same negative pulse is transferred from the gate 67 over the leads 70 and 74 to the gate 73 to de-condition it and cause a negative pulse to be transferred therefrom to the triggers S1T, S2T and S3T of the sequencer S. This causes the trigger S1T to be switched from the Left to the Right condition and the trigger S2T to be switched from the Right to the Left condition. When the trigger S1T is switched to the Right condition, the gates 49CU, 51U and 53U are de-conditioned.

When the trigger S2T is switched to the Left condition a positive voltage is transferred over the lead 118 to the gate 119CT to render it conductive and over the leads 118 and 120 to condition the gate 121T and over the leads 118, 120 and 122 to condition the gate 123T.

The circuit is now in condition to effect multiplication of the multiplicand by the tens digit of the multiplier and to effect entry of this product into the result register. Since some operations of the circuit to effect this are similar to that performed when multiplication by the units digit of the multiplier is accomplished, it will be mentioned only to the extent deemed necessary to facilitate complete understanding of the operation performed.

The next negative A pulse causes the gate 55 to be rendered non-conductive, which causes the inverter 57I to transfer a pulse to switch the trigger T$mp$ from the Left to the Right condition. This switching of the trigger T$mp$ causes the trigger 62 to switch from the Left to the Right condition, the gate 65 to be rendered conductive so that subsequent negative C pulses will render it non-conductive, the gate 67 to be de-conditioned and a positive voltage to be transferred from the trigger T$mp$ over the lead 68 to the digit-representing element of the multiplier receiving device corresponding to the digit 9. Subsequent positive pulses from the gate 65 cause sequential switching of the multiplier receiving device. The switching of the trigger 62 to the Right condition causes the gate 73 to be rendered conductive, but this does not change the condition of any other circuit.

When the digit-representing element of the multiplier receiving device corresponding to the tens digit of the multiplier is sequentially switched from its preselected stable condition, a positive bias voltage is transferred over the associated closed push-button switch and a lead 124 to the gate 125T (Fig. 1$a$) to condition it. The next positive C pulse applied to the conditioned gate 123T causes a positive pulse to be transferred over a lead 126 to render the gate 125T conductive to cause a positive pulse to be transferred over the lead 84 to the inverter 85I which produces a negative pulse to cause the trigger T$mc$ to be switched to the Right condition. This switching of the trigger T$mc$ de-conditions the gate 31, renders the gate 33 conductive and causes a positive bias voltage to be applied to the digit-representing element of the multiplicand receiving device corresponding to the digit 9. Each subsequent negative KF1 pulse renders the gate 33 non-conductive and causes a positive pulse to be transferred therefrom to the digit-representing elements of the multiplicand receiving device to advance the sequential switching thereof.

When the digit-representing element of the multiplicand receiving device corresponding to a digit of the multiplicand is sequentially switched, a positive bias voltage is transferred over the associated closed push-button switch and the lead 36, 38 or 40 connected from that switch to the repective gate 37U, 39T or 41H to condition it. Since the digit-representing elements are switched when a number of pulses are applied to the multiplicand receiving device equal to the tens complement of the multiplicand digit each represents, each of the gates 37U, 39T and 41H are conditioned in time sequence in accordance with the values of the units, tens and hundreds digits, respectively, of the multiplicand, the gate corresponding to the order of the multiplicand having the highest digital value being conditioned first.

The gate 121T is conductive and negative F2 pulses are applied to it from the step-down circuit 14 to render it non-conductive to cause positive pulses to be transferred simultaneously to the gates 37U, 39T and 41H to render each of them conductive after they are conditioned in response to the sequential switching of the multiplicand receiving device. Entries are then made into the result register as when multiplication by the units digit of the multiplier is accomplished, except at ten times the speed, the negative F2 pulses having a recurrence frequency of ten times that of the negative F1 pulses which effect entries for the multiplication by the units digit. Since the negative KF1 pulses which effect sequential switching of the multiplicand have the same frequency as the negative F1 pulses, ten distinct entries are made into the result register each time the operation of the multiplicand receiving device is sequentially advanced.

When the digit-representing element of the multiplicand corresponding to the digit 1 is sequentially switched, a positive bias voltage is transferred over the lead 35 to the trigger Tmc so that the next negative F1 pulse causes Tmc to switch from the Right to the Left condition to condition the gate 31 and de-condition the gate 33. The following positive F1 pulses render the gate 31 conductive to switch simultaneously all the digit-representing elements of the multiplicand receiving device to their preselected starting condition.

Next, a negative C pulse occurs to change the stable condition of the next lower digit-representing element of the multiplier receiving device to permit the multiplicand receiving device to go through another cycle of operation. When the fifth trigger of the units order RRU of the result register is switched from its preselected stable condition, it has no effect on the stable condition of any other circuit for the reason previously stated.

However, the next negative KF2 pulse causes the gate 119CT to be rendered non-conductive to transfer a negative pulse over lead 114 to switch the fifth trigger back to its preselected stable condition so that carry is applied to the tens order RRT, in the manner previously described, but at ten times the speed. This same negative pulse is transferred from the gate 119CT over the leads 114 and 127 to the fifth trigger of the tens order RRT to switch it back to its preselected stable condition if it has been switched therefrom. As a result of the switching of the fifth trigger to its preselected stable condition, a positive pulse is transferred over the lead 128 to render the buffer 129 conductive so that it transfers a negative pulse over the leads 130 and 100 to the hundreds order RRH to advance it by one count.

The cyclic entry of the multiplicand into the result register in response to multiplication by the tens digit of the multiplier is continued until the digit-representing element of the multiplier receiving device corresponding to the digit 1 is switched from its preselected stable condition. When this occurs, the increased voltage transferred from that digit-representing element over the lead 116 to the trigger Tmp permits the next negative KF1 pulse to switch Tmp to the Left condition. As a result, the gate 65 is again de-conditioned and the gate 67 is conditioned so that the next positive D pulse applied to the gate 67 renders it conductive to cause a negative pulse to be transferred to all digit-representing elements of the multiplier receiving device to switch them simultaneously to their preselected stable condition. This same negative pulse de-conditions the gate 73 to cause a negative pulse to be transferred to the triggers S1T, S2T, and S3T of the sequencer S. This negative pulse causes the trigger S2T to be switched from the Left to the Right condition and the trigger S3T to be switched from the Right to the Left condition.

The switching of the trigger S2T to the Right condition causes the gates 119CT, 121T and 123T to be de-conditioned. The switching of the trigger S3T to the Left condition causes a positive voltage to be transferred over a lead 134 to a gate 135CH (Fig. 1a) to condition it, over the leads 134 and 136 to a gate 137H (Fig. 1a) to condition it, and over the leads 134, 136 and 138 to a gate 139H (Fig. 1a) to condition it.

The circuit is now in condition to effect multiplication of the multiplicand by the hundreds digit of the multiplier and effect entry of this product into the result register.

The next negative A pulse causes the gate 55 to be rendered non-conductive, which causes the inverter 57I to transfer a pulse to switch the trigger Tmp from the Left to the Right condition. This switching of the trigger Tmp causes the trigger 62 to switch from the Left to the Right condition, the gate 65 to be rendered conductive so that subsequent negative C pulses will render it non-conductive, the gate 67 to be de-conditioned and a positive bias voltage to be transferred from the trigger Tmp over the lead 68 to the digit-representing element of the multiplier receiving device corresponding to the digit 9. Subsequent positive pulses from the gate 65 cause sequential switching of the multiplier receiving device.

When the digit-representing element of the multiplier receiving device corresponding to the hundreds digit of the multiplier is sequentially switched, a positive voltage is transferred over lead 140 to a gate 141H (Fig. 1a) to condition it. The next positive C pulse transferred from the step-down circuit 22 over the leads 24, 81 and 142 to the conditioned gate 139H causes a positive pulse to be transferred over a lead 143 to render the gate 141H conductive to cause a positive pulse to be transferred over the leads 144 and 84 to the inverter 85I which causes the trigger Tmc to switch to the Right condition. This switching of Tmc de-conditions the gate 31, renders the gate 33 conductive and applies a positive bias voltage to the digit-representing element of the multiplicand receiving device corresponding to the digit 9. Subsequent negative KF1 pulses render the gate 33 non-conductive and cause it to transfer a positive pulse to advance the sequential switching of the digit-representing elements of the multiplicand receiving device.

This switching causes the gates 37U, 39T and 41H to be conditioned in the manner described hereinbefore. The gate 137H is conductive and negative F3 pulses are applied to it from the oscillator 10 to render it non-conductive to cause positive pulses to be transferred over the leads 145, 95 and 96 to the gate 37U, over the leads 145 and 95 to the gate 39T and over the leads 145, 95 and 98 to the gate 41H. These positive pulses cause the gates 37U, 39T and 41H to be rendered conductive after they are conditioned by the sequential switching of the multiplicand receiving device. Entries are then made into the result register as in the case of multiplication by units and tens digits of the multiplier, except at ten times and one-hundred times those speeds, respectively.

When the digit-representing element of the multiplicand corresponding to the digit 1 is sequentially switched, a positive bias voltage is transferred over the lead 35 to the trigger Tmc so that the next negative F1 pulses cause Tmc to switch from the Right to the Left condition to condition the gate 31 and de-condition the gate 33. The following positive F1 pulses render the gate 31 conductive to switch simultaneously all of the digit-representing elements of the multiplicand receiving device to their preselected stable conditions.

Next, a negative C pulse occurs to change the stable condition of the next lower digit-representing element of the multiplier receiving device to permit the multiplicand receiving device to go through another cycle of operation.

When the fifth trigger of the units order RRU of the result register is switched from its preselected stable condition, the next negative KF3 pulse causes the gate 135CH to be rendered non-conductive to transfer a negative pulse over leads 147 and 114 to switch the fifth trigger back to its preselected stable condition so that carry is applied to the tens order RRT, in the manner previously described; but at ten times and one-hundred times the speed it was effected when multiplying by the units and tens digits of the multiplier, respectively. This same negative pulse is transferred from the gate 135CH over the leads 147, 114 and 127 to the fifth trigger of the tens order RRT to switch it back to its preselected stable condition if it has been switched therefrom. As a result of the switching of the fifth trigger to its preselected stable condition the buffer 129 transfers a carry pulse to the hundreds order RRH.

The cyclic entry of the multiplicand into the result register in response to multiplication by the hundreds digit of the multiplier is continued until the digit-representing element of the multiplier receiving device corresponding to the digit 1 is switched from its preselected stable condition. When this occurs, the increased voltage transferred from that digit-representing element over the lead 116 to the trigger Tmp permits the next negative KF1 pulse to switch T*mp* to the Left condition. As a result, the gate 65 is again de-conditioned and the gate 67 is conditioned so that the next positive D pulse applied to the gate 67 renders it conductive to cause a negative pulse to be transferred to all digit-representing elements of the multiplier receiving device to switch them simultaneously to their preselected stable condition. This same negative pulse de-conditions the gate 73 to cause a negative pulse to be transferred to the triggers S1T, S2T and S3T of the sequencer S. This negative pulse causes the triggers S3T and S4T to switch from the Left to the Right condition. When the trigger S3T switches to the Right condition, it de-conditions the gates 135CH, 137H and 139H. When the trigger S4T switches to the Right condition, a voltage is transferred over a lead 148 to switch the trigger 62 from the Right to the Left condition and a voltage is transferred over the lead 54 to the gate 55 to de-condition it. The entire multiplier is now in the initial starting condition, except that the product of the multiplicand and multiplier is indicated by the result register.

TRIGGER CIRCUIT

Fig. 2 shows a trigger T typical of the type employed in the invention. The trigger is shown as comprising a tube of the type having two triode tube sections with a common cathode arranged in a single envelope. The left-hand tube section is designated L and the right-hand tube section is designated R. These sections are referred to herein as the tube L and the tube R, respectively.

The tubes L and R are alternately conductive and non-conductive, and vice versa. As stated hereinbefore, when the tube L is conductive the trigger is referred to as being in the Left condition, and when the tube R is conductive the trigger is referred to as being in the Right condition.

The common cathode of the tubes L and R is connected to the ground line 150*g*. The plate of the tube L is connected through a resistor 151 to the high voltage line 152*h* and the plate of the tube R is connected through a resistor 153 to the line 152*h*. A lead 154 connects the plate of the tube R to the junction of the resistor 153 and a voltage divider consisting of resistors 155 and 156 in series, the junction of the resistors 155 and 156 being connected to the control grid of the tube L. The lower end of the resistor 156 is connected to the cancel bias line CBL and a capacitor 157 is connected in parallel with the resistor 155.

Similarly, a lead 158 connects the plate of the tube L to the junction of the resistor 151 and a voltage divider consisting of resistors 159 and 160 in series, the junction of the resistors 159 and 160 being connected to the control grid of the tube R. The lower end of the resistor 160 of this divider is connected to a bias voltage line 162*b*. The capacitor 163 is connected in parallel with the resistor 159. The bias voltage line 162*b* and the cancel bias line CBL are connected together through a cancel bias switch CBS. Switch CBS provides for quick resetting of the trigger to its initial stable condition. When the lower end of the resistors 156 and 160 are connected to the lines CBL and 162*b*, respectively, as described above, the trigger is initially in the Left condition, as indicated by an *x*, to the lower left-hand side of the tube L.

The connection of the lower end of the resistor 160 to the cancel bias line CBL and the connection of the lower end of the resistor 156 to the bias voltage line 162*b* will cause the Right condition to be the initial stable condition of the trigger. When such connections are made, an *x* is placed to the lower right-hand side of the tube R indicating that the trigger is initially in the Right condition.

When the switch CBS is opened to disconnect the line CBL from the line 162*b*, the grid bias voltage applied to the tube L rises above the cut-off bias and this tube is rendered conductive, irrespective of its condition immediately prior to the time when the switch was opened. The closing of switch CBS does not remove the positive bias voltage on the tube L but permits that tube to remain conductive so that the trigger is placed in the Left condition. The actual voltage at the control grid of the tube L is determined, among other things, by the voltage divider section of the resistors 153, 155 and 156.

A single cancel bias line CBL is used to reset all of the triggers employed in the invention to their initial condition.

Terminal I is connected to the control grids of the tubes L and R through capacitors 164 and 165 respectively. The application to the terminal I of either positive or negative pulses of appropriate amplitude and duration will effect a change in the stable condition of the trigger circuit.

Since the trigger circuit employed is well known in the art, one cycle of its operation in response to negative pulses applied to the terminal I will be described briefly. A similar cycle may be effected by the application of positive pulses having a shape and amplitude determined by the particular design of the trigger circuit.

When the first negative pulse is applied to the terminal I, it is transferred to the control grid of the tubes L and R through the capacitors 164 and 165, respectively. This pulse has no direct effect on the tube R because its control grid is already below bias cut-off. However, this negative pulse decreases the bias on the control grid of the tube L and its plate voltage rises rapidly. This voltage is transferred from the plate of the tube L over lead 158 and the parallel connected resistor 159 and capacitor 163 to the control grid of the tube R. The grid of the tube R is thus made sufficiently positive to start conduction through that tube. The resulting decrease of the voltage at the plate of the tube R is transferred over the lead 154 and the parallel connected resistor 155 and capacitor 157 to the control grid of the tube L to effect a further increase of the voltage at its plate. This increased voltage is again transferred to the control grid of the tube R to render it still more conductive. The resulting decreasing voltage at the plate of the tube R is again transferred to the control grid of the tube L to render it still less conductive. This cumulative action is continued until the tube L is rendered non-conductive and tube R is rendered uniformly conductive to place the trigger in the Right condition.

In a similar manner, the second negative pulse applied to the input terminal I increases the voltage at the plate of the conducting tube R. This voltage is transferred to the control grid of the tube L to permit that tube to become conductive. The resulting decreased voltage at the plate of the tube L is transferred to the control grid of the tube R to render it still less conductive. The increased voltage at the plate of the tube R is transferred to the control grid of the tube L to render it still more conductive. This cumulative action is continued until the tube R is rendered non-conductive and the tube L is rendered uniformly conductive to place the trigger in the Left condition.

While it has been explained that the trigger is switched from either stable condition to the other by the application of pulses to the terminal I, and hence simultaneously to the grids of the tubes L and R, it is understood that the trigger may be switched from one stable condition to the other by the application of a pulse to the control grid of only one tube or by any other conventional means, such as plate or cathode keying.

Fig. 2*a* is a schematic showing of the trigger T of Fig. 2. The terminals shown in Fig. 2*a* correspond to the similarly designated terminal shown in Fig. 2. It should be noted that the absence of a connection to the terminal I in a schematic showing, such as Fig. 2*a*, indicates that the capacitors 164 and 165, shown in Fig. 2, are omitted. A connection to the terminal I indicates that the trigger is switched from either stable condition to the other by the simultaneous application of pulses to the control grids of the tubes L and R.

A connection to terminals C, P, *b*R, *b*L, *g*R, *p*L, *pr*L, *g*L, *p*R and *pr*R indicates connection is made to the cathode of the tube T, to the plate resistors 151 and 153, grid bias resistor 160 of tube R, grid bias resistor 156 of tube L, the control grid of the tube R, the plate of the tube L, the plate resistor 151 of the tube L, the grid of the tube L, the plate of the tube R, and the plate resistor 153 of the tube R, respectively.

An *x* near the terminals *p*R and *g*L in Fig. 2*a* indicates that the trigger represented thereby is initially in the Left condition, such designation being used hereinafter. Also, in a diagrammatic showing, such as Fig. 2*a*, an *x* near the terminals *g*R and *p*L indicates the trigger represented thereby is initially in the Right condition.

PULSE SOURCES

The following description of the pulse sources utilized and subsequent description of various circuits of the multiplier are best understood by arranging the drawings as illustrated in Fig. 3.

In the circuit diagram a tube included in a gate shown in Figs. 1a and 1b bears the same designation except that it is prefixed by a G and a tube included in a buffer and inverter shown in Figs. 1a and 1b are similarly designated in the circuit diagram except that they are prefixed by a B and T respectively.

The oscillator 10 (Fig. 3a) includes dual type tube 170 having left and right triode sections, referred to hereinafter as tubes 170L and 170R, respectively. The common cathode of the tubes 170L and 170R is connected directly to the ground line 150g and each of the plates is connected through a resistor 171 to the high voltage line 152h. The control grid of each tube is connected through a bias resistor 172 to the ground line 150g and the grid of each tube is connected through a capacitor 173 to the plate of the other tube. It is seen that these tubes are connected to operate as a multivibrator. Such a multivibrator is well known in the art and it suffices to state that the tubes 170L and 170R are alternately conductive and non-conductive and vice versa, because of small differences in the characteristics of those tubes and of the components used in the circuit associated therewith. This operation is continuous and causes positive and negative pulses to be produced at the plates of the tubes 170L and 170R. When the voltage at the plate of the tube 170L is low, the voltage at the plate of the tube 170R is high, and vice versa.

Hence, the pulses at each of these plates is alternately positive and negative and pulses of like polarity are 180° out of phase. The plate of the tube 170L is connected through a capacitor 174 to the control grid of the amplifier tube 175F3. This grid is also connected through a resistor 176 to the bias voltage line 162b and its cathode is connected directly to the ground line 150g. The plate of the tube 175F3 is connected through a resistor 177 to the high voltage line 152h. The amplified pulses designated herein as F3 pulses are transferred over the lead 11 from the plate of the tube 175F3.

The plate of the tube 170R is connected through a capacitor 174 to the control grid of an amplifier tube 175KF3. This grid is also connected through a resistor 176 to the bias voltage line 162b and its cathode is connected directly to the ground line 150g. The plate of the tube 175KF3 is connected through a resistor 177 to the high voltage line 152h. KF3 pulses are transferred over the lead 12 from the plate of the tube 175KF3.

The step-down circuit 14 (Fig. 3a) comprises a series chain of four triggers 14T1, 14T2, 14T4 and 14T8. Each trigger is constructed to be relatively non-responsive to positive pulses as compared to its response to negative pulses of similar magnitude. This circuit is energized by negative KF3 pulses applied to the terminal I of the trigger 14T1 and completes a cycle of operation in response to each ten pulses. This cycle of operation is illustrated by Table II below, wherein L indicates that the particular trigger is in the Left condition and R indicates that the particular trigger is in the Right condition.

*Table II*

STEP-DOWN CIRCUIT 14

| Input pulses | Triggers | | | |
|---|---|---|---|---|
| | 14T1 | 14T2 | 14T4 | 14T8 |
| 0 | L | L | L | L |
| 1 | R | L | L | L |
| 2 | L | R | L | L |
| 3 | R | R | L | L |
| 4 | L | L | R | L |
| 5 | R | L | R | L |
| 6 | L | R | R | L |
| 7 | R | R | R | L |
| 8 | L | L | L | R |
| 9 | R | L | L | R |
| 10(0) | L | L | L | L |

As shown in Table II and Fig. 3a, all triggers are initially in the Left condition.

The first negative KF3 pulse transferred from the plate of the tube 175KF3 over the leads 12 and 13 to the terminal I of the trigger 14T1 causes it to switch to the Right condition. The increased voltage at the terminal prL of the trigger 14T1 is transferred over a lead 180 to the terminal I of the trigger 14T2. However, the trigger 14T2 remains in the Left condition because the positive pulse impressed upon the control grids of its tubes is insufficient to cause a switching of the stable condition of the trigger.

The second input or negative KF3 pulse applied to the terminal I of the trigger 14T1 causes it to switch to the Left condition. The resulting decreased voltage at its terminal prL is transferred over a lead 180 to the terminal I of the trigger 14T2 causing it to switch to the Right condition. The increased voltage appearing at terminal prL of the trigger 14T2 is insufficient to cause a switching of the stable condition of the trigger 14T4.

When the trigger 14T2 is switched to the Right condition, a decreased voltage is transferred from its terminal gL over a capacitor 181 and a lead 182 to the terminal prR of the trigger 14T8. However, this decreased voltage is insufficient to effect a change in the stable condition of the trigger 14T8. The arrow on the lead 182 pointing to the terminal prR of the trigger 14T8 indicates that the plate resistor of the tube R of that trigger is a potentiometer and that the lead 182 is connected to the arm thereof. Such an arrangement is provided to facilitate the adjustment of the magnitude of the pulse transferred.

Also, when the trigger 14T2 is switched to the Right condition, the decreased voltage appearing at its terminal gL is transferred over a lead 183 and a capacitor 184 to the terminal gR of the trigger 14T8. The decreased voltage so transferred has no effect on the stable condition of the trigger 14T8 because the tube R thereof is non-conductive and its grid below the cut-off value.

It is seen that the first two input pulses cause normal binary operation of the triggers. Such is continued until the tenth input pulse is applied to the trigger 14T1. When the tenth input pulse is so applied, the trigger 14T1 is switched to the Left condition. The resulting decreased voltage at the terminal prL is transferred to the trigger 14T2 and initiates a switching thereof to the Right condition. The decreased voltage at the terminal gL of the trigger 14T2 is transferred over capacitor 181 and lead 182 to the terminal prR of the trigger 14T8 and effects a switching of it from the Right to the Left condition. When the trigger 14T8 switches to the Left condition, the decreased voltage appearing at terminal gR thereof is transferred over the lead 183 and capacitors 184 to the terminal gL of the trigger 14T2. This negative voltage transferred from the trigger 14T8 to the trigger 14T2 is sufficient to prevent a complete switching of the trigger 14T2 to the Right condition and effectively blocks it in the Left condition. This action is indicated in Table II by an R intermediate the ninth and tenth input pulses.

When the trigger 14T8 is switched to the Left condition in response to this tenth input pulse, the voltage at its terminal prL is decreased and a negative pulse is transferred therefrom. These pulses are designated herein as negative KF2 pulses. It should be noted that in response to the eighth input pulse the trigger 14T4 is switched to the Left condition and a decreased voltage transferred from its terminal prL over a lead 185 and a capacitor 186 to the terminal gL of the trigger 14T8 to cause it to switch to the Right condition. The resulting increased voltage at the terminal prL of the trigger 14T8 is transferred therefrom as in the case of the negative KF2 pulses. However, this positive KF2 pulse is not employed in practicing the invention.

When the trigger 14T4 is switched to the Right condition in response to the fourth input pulse, the voltage at its terminal prR is decreased and when it is switched to the Left condition in response to the eighth input pulse the voltage at its terminal prR is increased. These increased and decreased voltages are transferred from the terminal prR over the lead 15 and are designated herein as positive and negative F2 pulses. Only the negative F2 pulses are employed in the practice of the invention.

It is seen that the negative KF2 pulses always occur simultaneously with and at one-tenth the frequency of the negative KF3 pulses. It is also seen that, after receipt of the first eight input pulses by the circuit 14, the negative F2 pulses occur simultaneously with and at one-tenth the frequency of the negative KF3 pulses. So far as the operation of the multiplier of the invention is concerned, it may be considered that the negative F2 pulses always occur at one-tenth the frequency of the negative KF3 pulses since the negative F2 pulses produced during the first cycle of operation of the circuit 14 is not utilized by any other circuit of the multiplier.

The step-down circuit 18 comprises four triggers 18T1, 18T2, 18T4 and 18T8 connected in a series chain with interconnections between the triggers 18T2 and 18T8 to cause the circuit to complete a cycle of operation in response to ten input pulses. The triggers are all initially in the Left condition and the interconnections between the triggers are exactly as the interconnections between the triggers of the circuit 14. For this reason, such interconnections are similarly designated.

The step-down circuit 18 is operated in response to negative KF2 pulses transferred from the terminal $prL$ of the trigger 14T8 over the leads 16 and 17 to the terminal I of the trigger 18T1. The stable condition of the triggers during a cycle of operation is exactly as that shown by Table II for the triggers of the step-down circuit 14. Since negative KF3 pulses serve as input pulses to the trigger 14 and negative KF2 pulses serve as the input pulses to the circuit 18, the F1 pulses transferred over the lead 19 from the terminal $prR$ of the trigger 18T4 are related to the KF2 pulses exactly as the F2 pulses transferred over the lead 15 from the terminal $prR$ of the trigger 14T4 are related to the KF3 pulses. The KF1 pulses transferred over the lead 20 from the terminal $prL$ of the trigger 18T8 occur at one-tenth the frequency of the KF2 pulses and simultaneously therewith.

The step-down circuit 22 (Fig. 3b) comprises five triggers 22T1, 22T2, 22T4, 22T8 and 22T16 connected in series chain, each initially in the Left condition and operable in response to negative F1 pulses transferred over the leads 19 and 21 to the terminal I of the trigger 22T1. When each trigger is switched to the Left condition, a negative pulse at the terminal $prL$ is transferred therefrom over a lead 185 to the terminal I of the next higher trigger in the chain to switch it from either stable condition to the other.

There is no provision for preventing or effecting a switching of the triggers artificially. That is to say, the only switching of the triggers is the switching of the trigger 22T1 in response to the negative F1 pulses and the switching of the triggers 22T2, 22T4, 22T8 and 22T16 in response to a negative pulse transferred thereto, as described above, from the next lower trigger in the chain. Obviously, the operation of the chain of triggers is binary, a switching of the triggers 22T16 occurring in response to each sixteenth negative F1 pulse applied to the terminal I of the trigger 22T1.

Each time the trigger 22T1 is switched to the Right condition, a positive A pulse is transferred over the lead 23 from its terminal $pR$ and each time it switches to the Left condition a negative A pulse is transferred from that terminal. Hence, these A pulses are alternately positive and negative and out of phase. It follows that the positive A pulses are in phase with the negative F1 pulses and occur at one-half the frequency of the F1 pulses and that the negative A pulses occur in phase with and at one-half the frequency of the negative F1 pulses. Each switching of the trigger 22T16 to the Right condition causes a negative C pulse to be transferred over the lead 24 from its terminal $prR$ and a positive D pulse to be transferred over the lead 25 from its terminal $prL$. Accordingly, each switching of the trigger 22T16 to the Left condition causes a positive C pulse to be transferred from its terminal $prR$ and a negative D pulse to be transferred from its terminal $prL$.

SEQUENCER

The principal elements of the sequencer (Fig. 3b) are four triggers, S1T, S2T, S3T and S4T, each connected to be initially in the Right condition. The terminal $bL$ of the trigger S1T is connected to the lead 46 and the terminal $bL$ of the trigger S4T is connected through the lead 47 to the lead 46. The lead 46 is connected through the calculate switch 45 to the line 162b so that a closing of the switch will cause the triggers S1T and S4T to switch to the Left condition.

The terminal $gR$ of the trigger S1T is connected through a capacitor 188 to the line 152h and through a lead 189 to the control grid of an isolating tube I190 having its cathode connected directly to the line 150g and its plate connected through the resistor 191 to the line 152h. The plate of the tube I190 is also connected through resistors 192 and 193 in series to a line 194n having a voltage more negative than that of any supply lines mentioned hereinbefore. The screen grid of the tube I190 is connected through a resistor 195 to a line 196p having a voltage less positive than that of the high voltage line 152h. The lead 48 is connected between the resistors 192 and 193.

When the trigger S1T is in the Right condition, as shown, a positive voltage is transferred over the lead 189 to the control grid of the tube I190 to render it conductive. A similar isolating tube I200 is connected to the terminal $gR$ of the trigger S2T and is conductive when that trigger is in the Right condition. Similar isolating tubes I202 and I204 are connected to the terminals $gR$ of the triggers S3T and S4T, respectively. The components associated with the isolating tubes I200, I202 and I204 are similar to those associated with the isolating tube I190.

It is seen that when the isolating tube I190 is conductive the voltage transferred to the lead 48 is low because the voltage at the plate of the tube I190 is low. Hence, when the sequencer is in its initial condition, the potential on the leads 48, 118, 134 and 54 is low. Since it is required that the voltage on one of these leads be high before multiplication is effective, it is necessary that one of the isolating tubes be rendered non-conductive before multiplication can be effected.

When the calculate switch 45 is closed, the triggers S1T and S4T are switched to the Left condition as previously pointed out. When the trigger S4T switches to the Left condition, a positive voltage is transferred over the lead 148 and a capacitor 206 to the trigger 62 (Fig. 3d). A negative voltage is transferred from the terminal $gR$ of the trigger S4T to the control grid of the isolating tube 204 to render it non-conductive and cause a positive voltage to be transferred over the lead 54 to the control grid of the tube G55 (Fig. 3d) to condition it. When the trigger S1T is switched to the Left condition, a negative voltage is transferred from its terminal $gR$ to the control grid of the isolating tube I190 to render it non-conductive and cause a positive voltage to be transferred over the lead 48 to condition the various gates, as stated hereinbefore, to permit multiplication of the multiplicand by the units digit of the multiplier.

Finally, when multiplication by the units digit of the multiplier is completed, a negative pulse is transferred over the lead 75 and capacitor 206 to the terminal $gL$ of the trigger S1T causing it to switch back to the Right condition. This same pulse is transferred over the leads 75 and 76 and a capacitor 206 to the terminal $gL$ of the trigger S2T and over the leads 75 and 77 and a capacitor 206 to the terminal $gL$ of the trigger S3T. However, since the triggers S2T and S3T are in the Right condition, this negative pulse does not effect a change in the stable condition of either.

When the trigger S1T is switched to the Right condition, the tube I190 is rendered conductive and the voltage transferred over the lead 48 decreased to such a value that the gates permitting multiplication by the units digit of the multiplier are de-conditioned. When the trigger S1T switches to the Right condition, a decreased voltage is transferred from its terminal $pR$ over a lead 207 and capacitor 208 to the terminal $gR$ of the trigger S2T and the control grid of the tube I200. As a result, the trigger S2T is switched to the Left condition and the tube I200 is rendered non-conductive to cause a positive voltage to be transferred over a lead 118 to the various gates to permit the multiplication of the multiplicand by the tens digit of the multiplier. When the trigger S2T is switched to the Left condition, a positive voltage is transferred from its terminal $pR$ over a lead 209 and a capacitor 210 to the control grid of the tube I202 and the terminal $gR$ of the trigger S3T. This voltage has no effect on the stable condition of the trigger S3T since it is already in the Right condition and has no effect on the stable condition of the tube I202 because it is already conductive.

When multiplication of the multiplicand by the tens digit of the multiplier is completed, a negative pulse is again transferred to the terminal $gL$ of the triggers S1T, S2T and S3T and causes the trigger S2T to switch back to the Right condition, thereby rendering the isolating tube I200 conductive and causing the voltage transferred over the lead 118 to be decreased so that the gates permitting multiplication by the tens digit of the multiplier are de-conditioned. A decreased voltage is transferred from the terminal pR of the trigger S2T over a lead 209 and a capacitor 210 to the terminal gR of the trigger S3T and the control grid of the tube I202. As a result, the trigger S3T is switched to the Left condition and the tube I202 is rendered non-conductive to cause an increased voltage to be transferred over a lead 134 to condition various gates to permit multiplication of the multiplicand by the hundreds digit of the multiplier. Hence, during this multiplication, the triggers S1T and S2T are in the Right condition and the triggers S3T and S4T are in the Left condition.

When multiplication by the hundreds digit of the multiplier is completed, a negative pulse is transferred over the lead 75 to the terminal gL of the triggers S1T, S2T and S3T to cause the trigger S3T to switch back to the Right condition. This switching of the trigger S3T causes the isolating tube I202 to be rendered conductive and a decreased voltage to be transferred over a lead 134 to the gates permitting multiplication by the hundreds digit of the multiplier to de-condition them. When the trigger S3T is so switched, a decreased voltage is transferred from the terminal pR over a lead 212 and a capacitor 213 to the terminal gL of the trigger S4T to cause it to switch back to the Right condition. When the trigger S4T switches back to the Right condition, the isolating tube I204 is rendered conductive and a decreased voltage is transferred over a lead 54 to the control grid of the gate 55 (Fig. 3d) to de-condition it. The sequencer has now gone through the cycle of its operation and is in its initial stable condition.

MULTIPLICAND RECEIVING DEVICE

Referring to Fig. 3e, the multiplicand receiving device Mc includes a single series of nine digit-representing trigger circuits McT9–McT1, inclusive, arranged to accommodate a multiplicand of three orders. The triggers McT9–McT1 are representative of the digits 9–1 respectively. Each trigger is initially in the Left condition and is connected in series chain to be sequentially switchable to the Right condition in response to successive positive pulses applied simultaneously to the control grid of the tube R of each trigger. These positive pulses are transferred from the plate of the tube G33 (Fig. 3d) over the leads 26a, 26, and 215, capacitor 216 and resistor 217 to the terminal gR of each of the triggers McT1–McT9, the terminal gR being connected to the control grid of the non-conducting tube R of the trigger. Such pulses are not sufficient to cause a switching of the stable condition of any trigger, unless it has previously been properly biased.

To initiate the sequential switching of the triggers, a positive bias voltage is supplied from the trigger circuit Tmc (Fig. 3d) over the lead 89 to the terminal gR of the trigger McT9. The voltage thus applied to the control grid of the non-conducting tube R of the trigger McT9 is sufficient to allow the next positive pulse transferred to it over the lead 26 to switch it to the Right condition. This switching causes a voltage increase at the terminal pL of the trigger McT9, which voltage is transferred over a resistor 218 and a lead 219 to the terminal gR of the trigger McT8, thereby applying a steady positive bias to the control grid of the non-conducting tube R thereof. This bias is of insufficient magnitude to cause the trigger McT8 to switch to the Right condition but permits the next positive pulse transferred to its terminal gR from the lead 26 to switch it to the Right condition. Similar to the action following the switching of the trigger McT9 to the Right condition, this switching causes a positive bias voltage to be transferred over the resistor 218 and the lead 219 to the terminal gR of the trigger McT7 to permit it to be switched to the Right condition when the next positive pulse is transferred from the lead 26 to its terminal gR. In a similar manner, subsequent positive pulses transferred over the lead 26 cause the triggers McT7–McT1, inclusive, to be switched to the Right condition.

The sequential switching of the triggers is illustrated by Table III wherein L represents that the particular trigger is in the Left condition and R represents that the particular trigger is in the Right condition.

Table III

MULTIPLICAND RECEIVING DEVICE

| Input Pulses | Digit-Representing Triggers | | | | | | | | |
|---|---|---|---|---|---|---|---|---|---|
| | McT9 | McT8 | McT7 | McT6 | McT5 | McT4 | McT3 | McT2 | McT1 |
| 0 | L | L | L | L | L | L | L | L | L |
| 1 | R | L | L | L | L | L | L | L | L |
| 2 | R | R | L | L | L | L | L | L | L |
| 3 | R | R | R | L | L | L | L | L | L |
| 4 | R | R | R | R | L | L | L | L | L |
| 5 | R | R | R | R | R | L | L | L | L |
| 6 | R | R | R | R | R | R | L | L | L |
| 7 | R | R | R | R | R | R | R | L | L |
| 8 | R | R | R | R | R | R | R | R | L |
| 9 | R | R | R | R | R | R | R | R | R |

It is seen from Table III that the ninth positive input pulse to the multiplicand receiving device switches the trigger McT1 to the Right condition. As a result, the voltage at the terminal pL thereof is increased. This increased voltage is transferred over a resistor 220 and lead 35 to the control grid bias potentiometer 221 of the trigger Tmc (Fig. 3d). This biases the trigger Tmc so that the next negative F1 pulse transferred to it over the lead 19 and capacitor 222 causes it to switch to the Left condition and thereby transfer a steady positive voltage over the lead 88 to condition the tube G31 and a negative pulse over the lead 87 to de-condition the tube G33. The next positive F1 pulse transferred over the leads 19 and 21a and a capacitor 223 to the suppressor grid of the tube G31 renders it conductive and causes a negative pulse to be transferred over the lead 26 to the terminals gR of the triggers of the multiplicand receiving device to effect a simultaneous switching of all the triggers to the Left condition. Since this negative pulse is applied to the control grid of the tube R of each trigger, it is effective only to switch any triggers to the Left condition which are in the Right condition. A single negative pulse is thus effective to switch simultaneously such triggers to the Left condition.

The multiplicand receiving device includes ten digit-representing push-button type switches McS9–McS0, inclusive, for each order of the multiplicand. All switches of the units order are indicated by "units" adjacent to the switch McS9 and the switches corresponding to the tens and hundreds order are indicated by the "tens" and "hundreds" adjacent to the switches McS9. Each switch has a left and a right terminal and only a single switch in any one order may be depressed at any one time. One terminal of each of the switches, McS9–McS1, inclusive, representing the same digital value in each order, is commonly connected to the terminal gR of the tube R of the trigger representing the same digital value, e. g., the left-hand terminal of the switches McS9 are connected together and to the terminal gR of the trigger McT9 through a lead 225, similarly the switches McS8–McS1, inclusive, are connected respectively to the triggers McT8–McT1, inclusive. The right-hand terminal of each of the switches of the units order is connected to the lead 36, the right-hand terminal of each of the switches of the tens order is connected to the lead 38 and the right-hand terminal of each of the switches of the hundreds order is connected to the lead 40.

It is seen that when each of the triggers McT9–McT1, inclusive, is switched to the Right condition, an increased voltage is transferred from its terminal gR over the lead 225 to the corresponding switch of the units, tens and hundreds order, which switches are commonly connected to the lead 225 associated with that trigger and individually connected at their other terminal to the leads 36, 38 and 40, respectively. This increased voltage is then transferred through any of the switches which are closed to their corresponding leads 36, 38 or 40.

Suppose, for example, the multiplicand to be employed is 124. To enter this number into the multiplicand receiving device, the units switch McS4, the tens switch McS2 and the hundreds switch McS1 are closed or depressed. The sixth input pulse (Table III) to the multiplicand receiving device causes the trigger McT4 to be switched to the Right condition and an increased voltage to be transferred from its terminal gR over the lead 225 connected thereto and the closed units switch McS4 to the lead 36 to permit entries into the result register. The eighth input pulse of the multiplicand receiving device causes the trigger McT2 to be switched to the Right condition and an increased voltage to be transferred over the tens switch McS4 to permit entries into the result register. Similarly the ninth input pulse to the multiplicand receiving device causes the trigger McT1 to be switched to the Right condition and an increased voltage to be transferred over the hundreds switch McS1 to permit entries into the result register. It is seen that the increased voltage transferred over the closed switches McS1, McS2 and McS4 is maintained until the corresponding triggers are switched back to the Left condition. Hence, entries are permitted to be made into the result register until the gate tube G31 (Fig. 3d) is rendered non-conductive by a negative F pulse. The circuit operation effecting the repeated cyclic operation of the multiplicand receiving device and the entries into the result register will be described hereinafter.

The switch McS0 is representative of a multiplicand digit of 0. As shown, the right-hand terminal of the units, tens and hundreds order switches are connected to the leads 36, 38 and 40, respectively, and the left-hand terminals are commonly connected together and may be connected to a source of voltage provided it is not sufficiently positive to effect circuit operations when it is transferred over the leads 36, 38 or 40. It is provided merely for the sake of continuity in that it insures that a push button will be depressed for each digit of the multiplicand.

MULTIPLIER RECEIVING DEVICE

The multiplier receiving device shown in Fig. 3e includes a single series of digit-representing triggers MpT9–MpT1, inclusive, arranged to accommodate a multiplier of three orders. These triggers are connected and arranged exactly as the triggers McT9–McT1, respectively, of the multiplicand receiving device.

To initiate the sequential switching of the triggers a steady positive bias voltage is supplied from the trigger circuit Tmp (Fig. 3d) over the lead 68 to the terminal gR of the trigger MpT9. The next positive pulse transferred over the leads 70 and 71, capacitor 227, and a resistor 228 to the terminals gR of the triggers MpT9–MpT1 causes the trigger MpT9 to switch to the Right condition and thereby transfer a steady positive bias voltage from its terminal pL over a resistor 229 and a lead 230 to the terminal gR of the trigger MpT8. The next positive pulse transferred from the lead 70 to the terminal gR of the trigger MpT8 causes it to switch to the Right condition and transfer a steady positive bias voltage to the terminal gR of the trigger MpT7 so that the next positive pulse applied to its terminal gR will switch it to the Right condition. In a similar manner, subsequent positive pulses applied to the triggers from the lead 70 cause the triggers MpT7–MpT1 to be switched to the Right condition.

This sequential switching of the triggers during a cycle of sequential operation is also illustrated by Table III if the triggers MpT9–MpT1 are substituted for the triggers McT9–McT1, respectively, there shown.

When the trigger MpT1 is switched to the Right condition in response to the ninth input pulse, a steady positive voltage is transferred over a resistor 347 and the lead 116 to the trigger Tmp so that the next negative KF1 pulse will switch it to the Left condition to condition the gate tube G67 (Fig. 3d) and de-condition the gate tube G65 (Fig. 3d). The next positive D pulse renders the tube G67 conductive and a negative pulse is transferred over the leads 70 and 71, the capacitor 227 and the resistor 228 to the terminals gR of the triggers MpT9–MpT1 to effect a simultaneous switching of them to the Left condition.

The novel multiplier receiving device includes ten digit-representing push-button type switches MpS9–MpS0, inclusive for each order of the multiplier. Switches are shown for the units, tens and hundreds orders and are indicated by "units," "tens" and "hundreds" respectively adjacent to the MpS9 switches. The switches are utilized to enter a multiplier in the multiplier receiving device in the same manner as the corresponding switches McS9–McS0 associated with the multiplicand receiving device are utilized to effect the entry of a multiplicand therein. The commonly connected terminals of the switches MpS9–MpS1 are connected over a lead 233 to the terminal gR of the corresponding digit-representing triggers MpT9–MpT1, respectively. The other terminals of these switches or the units, tens and hundreds orders respectively are connected to the leads 78, 124 and 140.

Suppose, for example, the multiplier to be employed is 236. To enter this number into the multiplier receiving device the units switch MpS6, the tens switch MpS3 and the hundreds switch MpS2 are depressed. The fourth input pulse to the multiplier receiving device causes the trigger MpT6 to switch to the Right condition and an increased voltage to be transferred from its terminal gR over the closed units switch MpS6 and the lead 78 to permit the product of the multiplicand and the units digit of the multiplier to be entered into the result register.

The seventh input pulse of the second cycle of operation of the multiplier receiving device causes the trigger MpT3 to be switched to the Right condition and an increased voltage to be transferred from its terminal gR over the closed tens switch MpS3 and the lead 124 to permit the product of the multiplicand and the tens digit of the multiplier to be entered into the result register ten times.

The eighth input pulse of the third cycle of operation of the multiplier receiving device causes the trigger MpT2 to be switched to the Right condition and an increased voltage to be transferred from the terminal gR over the closed hundreds switch MpS2 and the lead 140 to permit the product of the multiplicand and the hundreds digit of the multiplier to be entered into the result register one-hundred times.

Since each of the triggers MpT9–MpT1 is switched to the Right condition during each cycle of operation of the multiplier receiving device, it is obvious that an increased voltage is transferred over the closed push-button switch of each order during each such cycle of operation. However, because of the selective conditioning of the circuits of the multiplier by the sequencer, the increased voltage transferred by each closed switch is utilized during only one cycle of operation of the multiplier receiving device.

Obviously the MpS0 push-button switches are provided for the same purpose as the McS0 switches associated with the multiplicand receiving device.

RESULT REGISTER

Referring to Figs. 3f and 3g, the triggers of each order of the result register are individually represented by a block diagram as in Fig. 2a. Fig. 3f shows the units, tens and hundreds orders, and Fig. 3g shows the thousands, ten-thousands and hundred-thousands orders.

The units order will be described in detail and the remaining orders will be described with reference to it.

The units order RRU comprises five triggers as shown in Fig. 2. These triggers are connected in series chain so that each trigger is initially in the Left condition. The five triggers are designated from the left to right as UT1, UT2, UT4, UT8 and TCU. Triggers UT1, UT2, UT4 and UT8, when in the Right condition, are representative of the receipt of the digits 1, 2, 4 and 8, respectively. The trigger TCU is provided to aid in effecting the timed transfer of a carry pulse to the tens order RRT after each tenth input pulse has been applied to the units order RRU. The timing of this carry pulse is such that it cannot occur when a negative input pulse is transferred over the lead 99 to the tens order RRT. Since the function of the trigger TCU is to permit the transfer of a timed carry pulse to the tens order, it will be described in connection with the carry circuits and is referred to in the description of the units order of the result register only insofar as is necessary to an understanding of the operation of the result register. Each of the triggers UT1, UT2, UT4, UT8 and TCU is constructed to be relatively non-responsive to positive pulses as compared to its response to negative pulses. Hence, the stable condition of any trigger may be switched by a negative pulse and be non-responsive to a positive pulse of similar shape and magnitude. A cycle of operation of the triggers UT1, UT2, UT4, and UT8 of the units order is illustrated by Table IV, wherein L indicates that the particular trigger is in the Left condition and R indicates that the particular trigger is in the Right condition.

Table IV
RESULT REGISTER, UNITS ORDER RRU

| Input pulses | Triggers | | | |
|---|---|---|---|---|
| | UT1 | UT2 | UT4 | UT8 |
| 0 | L | L | L | L |
| 1 | R | L | L | L |
| 2 | L | R | L | L |
| 3 | R | R | L | L |
| 4 | L | L | R | L |
| 5 | R | L | R | L |
| 6 | L | R | R | L |
| 7 | R | R | R | L |
| 8 | L | L | L | R |
| 9 | R | L | L | R |
| 10(0) | L | L | L | L |

The first negative input pulse transferred over the lead 97 to the terminal I of the trigger UT1 causes it to switch to the Right condition. The increased voltage at the terminal prL of the trigger UT1 is transferred over a lead 235 to the terminal I of the trigger UT2. However, trigger UT2 remains in the Left condition because the increased voltage impressed upon the control grid of its tubes is insufficient to cause a switching of the stable condition of the trigger.

The second input pulse applied to the trigger UT1 causes it to switch to the Left condition which causes a decreased voltage at its terminal prL. This decreased voltage is transferred over the lead 235 to the trigger UT2 to switch it to the Right condition. An increased voltage is then transferred over lead 236 from the terminal prL of trigger UT2 to the terminal I of the trigger UT4 but is insufficient to effect a switching of the stable condition of the trigger UT4.

When the trigger UT2 is switched to the Right condition, a decreased voltage appears at its terminal gL and is transferred therefrom over a lead 237 and a capacitor 238 to the terminal prR of the trigger UT8. However, this decreased voltage is insufficient to effect a switching of the stable condition of the trigger UT8. The arrow at the end of the lead 237 pointing to the terminal prR of the trigger UT8 indicates that the plate resistor of the tube R thereof is a potentiometer and that the lead 237 is connected to the arm thereof. Such an arrangement is included to provide for adjustment of pulse magnitude.

The terminal prL of the trigger UT4 is connected through a lead 239 and a capacitor 240 to the terminal gL of the trigger UT8 and the terminal prL of the trigger UT8 is connected through a lead 241 and a capacitor 242 to the terminal gL of the trigger TCU.

It is seen that the first two input pulses applied to the trigger UT1 cause normal binary operation of the chain of triggers. Such is continued until the tenth pulse is applied to the trigger UT1. It is seen that as a result of the application of the eighth pulse the trigger UT8 is switched to the Right condition. The resulting increased voltage at the terminal prL of the trigger UT8 is transferred over the lead 241 and the capacitor 242 to the terminal gL of the trigger TCU. However, this increased voltage has no effect on the stable condition of the trigger TCU because it is already in the Left condition. The tenth input pulse switches the trigger UT1 to the Left condition. The resulting decreased voltage at its terminal prL is transferred to the trigger UT2 and initiates a switching thereof to the Right condition. The resulting decreased voltage at the terminal gL of the trigger UT2 is transferred over the lead 237 and the capacitor 238 to the terminal prR of the trigger UT8 and effects a switching of UT8 from the Right to the Left condition.

When the trigger UT8 is switched to the Left condition, the decreased voltage appearing at its terminal prL is transferred to the terminal gL of the trigger TCU to switch it to the Right condition. At the same time the decreased voltage at the terminal gR of the trigger UT8 is transferred over a lead 243 and a capacitor 244 to the terminal gL of the trigger UT2. The decreased voltage so transferred is sufficient to prevent a complete switching of the trigger UT2 to the Right condition and effectively blocks it into Left condition. Four neon bulbs 251, 252, 254 and 258 are connected from the terminal pL of the triggers UT1, UT2, UT4 and UT8, respectively, and to a lead 255 connected at its other end to the bias voltage line 162b. When a trigger is in the Left condition, the voltage across the neon bulb connected to its terminal pL is insufficient to cause the bulb to glow. However, when a trigger is switched to the Right condition, the voltage at its terminal pL is increased sufficiently to cause the corresponding bulb to glow. Hence, the bulbs 251, 252, 254 and 258 correspond respectively to the digits 1, 2, 4 and 8 as do their corresponding triggers. To illustrate, when seven input pulses have been applied to the trigger UT1, each of the triggers UT1, UT2, and UT4 are in the Right condition and the bulbs 251, 252 and 254 glow. The bulb 251 corresponds to the digit 1, the bulb 252 corresponds to the digit 2, and the bulb 254 corresponds to the digit 4. The sum of these digits is 7, the number of input pulses applied to the trigger UT1. Hence, by merely noting the bulbs which glow and adding together the digits represented by them, the product standing in the units order is obtained.

The tens order RRT includes four triggers TT1, TT2, TT4, and TT8, similar to and corresponding to the triggers UT1, UT2, UT4, and UT8, respectively, of the units order. Triggers of the tens order are interconnected exactly as those of the units order. Table IV, therefore, may be representative of a cycle of operation of the tens order. The tens order also includes a trigger TCT for aiding in effecting carry between the tens order and the hundreds order of the result register and its functions correspond to the functions of the trigger TCU of the units order.

The hundreds order RRH includes four triggers HT1, HT2, HT4 and HT8 connected and arranged exactly as the triggers UT1, UT2, UT4, and UT8 of the units order RRU. Input is supplied to the trigger HT1 over the lead 100.

The thousands order RRT$h$ includes four triggers T$h$T1, T$h$T2, T$h$T4 and T$h$T8 connected and arranged exactly as the triggers UT1, UT2, UT4 and UT8 of the units order RRU. However, the only input to the thousands order RRT$h$ is transferred from the trigger HT8 of the hundreds order over the lead 42 to the terminal I of the trigger T$h$T1 of the thousands order. This input is effected when the trigger HT8 is switched to the Left condition in response to each tenth input pulse to the hundreds order.

The triggers of the ten-thousands order RRTT$h$ are identical with the corresponding triggers of the hundreds and thousands orders. Its input is received from the trigger T$h$T8 of the thousands order and is transferred over the lead 43 to the trigger TT$h$T1.

The hundred-thousands order RRHT$h$ includes four triggers HT$h$T1, HT$h$T2, HT$h$T4 and HT$h$T8 and is connected and arranged exactly as the triggers of the hundreds, thousands, and ten-thousands orders. Input to the hundred-thousands order RRHT$h$ is transferred from the trigger TT$h$T8 over the lead 44 to the trigger HT$h$T1.

*Carry circuit.*—It was pointed out in connection with the description of the block diagram of Figs. 1a and 1b that the gates 49CU, 119CT and 135CH (Fig. 1a) are individually conditioned by the sequencer when the multiplicand is being multiplied by the units, tens and hundreds order digits, respectively, of the multiplier.

Each of the tubes G49CU, G119CT and G135CH (Fig. 3c) has its plate connected directly to the line 152$h$. The cathodes are commonly connected through a resistor 259 to the line 150$g$ and over the lead 114 and a capacitor 260 to the terminal gR of the units order carry trigger TCU and over the leads 114 and 127 and a capacitor 261 to the terminal gR of the tens order carry trigger TCT. The suppressor grid of the tube G49CU has negative KF1 pulses applied to it from the trigger 18T8 (Fig. 3a) of the step-down circuit 18 over the leads 20 and 112 and a capacitor 262 and is connected through a resistor 263 to the line 150$g$. The suppressor grid of the tube G119CT has negative KF2 pulses applied to it from the trigger 14T8 (Fig. 3a) of the step-down circuit 14 over the lead 16 and a capacitor 264 and is connected through a resistor 265 to the line 150 $g$. The suppressor grid of the tube G135CH has negative KF3 pulses applied to it from the plate of the amplifier tube 175KF3 (Fig. 3a) over the lead 12 and capacitor 266. The screen grids of the tubes G49CU, G119CT and G135CH are connected through resistors 267, 268 and 269, respectively, to the line 196$p$.

When the trigger S1T of the sequencer (Fig. 3b) is switched to the Left condition, the entire circuit is conditioned to effect multiplication of the multiplicand by the units order of the multiplier and enter the product thereof into the result register. A positive voltage is transferred from the plate circuit of the tube I190 (Fig. 3b) over the lead 48 to the control grid of the tube G49CU to render it conductive. Subsequent negative KF1 pulses applied to its suppressor grid render it non-conductive and, as a result, negative pulses are transferred from its cathode over the lead 114 and capacitor 260 to the trigger TCU and over the leads 114 and 127 and capacitor 261 to the trigger TCT. Obviously these negative pulses do not affect the stable condition of either trigger if it is in the Left condition. However, after the trigger TCU is switched to the Right condition by each tenth input pulse applied to the units order RRU of the result register, the next negative pulse transferred from the cathode of the tube G49CU causes it to switch back to the Left condition. A positive voltage is then transferred from its terminal prR over lead 110 and capacitor 271 to the control grid of the buffer tube B111 included in the buffer 111 (Fig. 1b). The control grid of the tube B111 is also connected to the lines 150g and 194n, through resistors 272 and 273, respectively. The cathode and suppressor grid of the tube B111 are connected directly to the line 150g and its screen grid is connected through a resistor 274 to the line 196p. The plate of the tube B111 is connected through resistor 275 and potentiometer 276 to line 152h.

When the positive pulse is transferred from the trigger TCU to the control grid of the tube B111, it is rendered conductive and a negative pulse is transferred from the potentiometer 276 over the lead 99 to the terminal I of the trigger TT1 of the tens order RRT of the result register to advance that order by a count of 1.

It should be noted that this carry pulse was initiated by a negative KF1 pulse and that at this time the normal input pulses into the tens order are initiated by negative F1 pulses. Since a negative KF1 pulse and a negative F1 pulse cannot occur simultaneously, there is no possibility of attempting the entry of a carry and input pulse at the same time.

When the trigger TCT of the tens order of the result register is switched to the Right condition by each tenth input pulse applied to that order over the lead 99, the next negative pulse transferred from the cathode of the tube G119CT causes it to switch back to the Left condition. A positive pulse is then transferred from its terminal prR over the lead 128 and capacitor 277 to the control grid of the buffer tube B129 (Fig. 3c). This control grid is also connected to the lines 150g and 194n through resistors 278 and 279 respectively. The cathode and suppressor grid of the tube B129 are connected directly to the line 150g and its screen grid is connected through a resistor 280 to the line 196p. The plate of the tube B129 is connected through resistor 281 and potentiometer 282 to the line 152h.

When a positive pulse is transferred from the trigger TCT to the control grid of the tube B129, it is rendered conductive and a negative pulse is transferred from the potentiometer 282 over the lead 100 to the terminal I of the trigger HT1 of the hundreds order RRH of the result register to advance that order by a count of 1.

When the trigger S2T of the sequencer is switched to the Left condition the entire circuit is conditioned to effect multiplication of the multiplicand by the tens digit of the multiplier. A positive voltage is transferred from the plate of the tube I200 (Fig. 3b) over the lead 118 to the control grid of the tube G119CT to render it conductive so that subsequent negative KF2 pulses applied to its suppressor grid will render it non-conductive. Each time the tube G119CT is rendered non-conductive, a negative pulse is transferred from its cathode over the lead 114 to the triggers TCU and TCT of the units and tens orders of the result register, respectively. Carry is effected between the units and tens orders and between the tens and hundreds orders of the result register by the tubes B111 and B129, respectively, in exactly the same manner as described when multiplication of the multiplicand by the units order digit of the multiplier was effected.

However, when multiplication by the tens order digit of the multiplier is effected, the normal input pulses to the result register are derived from negative F2 pulses and carry is derived from negative KF2 pulses. These pulses cannot occur simultaneously and there is therefore no possibility of the attempted entry of a carry and an input pulse at the same time.

When the trigger S3T of the sequencer is switched to the Left condition, the entire circuit is conditioned to effect multiplication of the multiplicand by the hundreds order of the multiplier. A positive voltage is transferred from the plate of the tube I202 (Fig. 3b) over the lead 134 to the control grid of the tube G135CH to render it conductive so that subsequent negative KF3 pulses applied to its suppressor grid will render it nonconductive. Each time the tube G135CH is rendered non-conductive a negative pulse is transferred from its cathode over the lead 114 to the carry triggers TCU and TCT. Again carry is effected between the units and tens orders and between the tens and hundreds orders of the result register by the buffer tubes B111 and B129 in exactly the same manner as described when multiplication of the multiplicand by the units order digit of the multiplier was effected.

However, when multiplication by the hundreds order digit of the multiplier is effected, the normal input pulses to the result register are derived from negative F3 pulses and carry is derived from negative KF3 pulses. These pulses cannot occur simultaneously and there is therefore no possibility of the attempted entry of a carry and an input pulse at the same time.

OPERATION

A complete cycle of multiplier operation will be described without reference to any particular values of the multiplier and multiplicand used. A description of particular circuits not described hereinbefore will be given along with the circuit operation.

After the multiplicand and multiplier are entered into the multiplicand and multiplier receiving devices respectively by depressing the push-button switches representing the digital values corresponding thereto, the calculate switch 45 (Fig. 3b) is closed. As previously described, this causes the triggers S1T and S4T to be switched from the Right to the Left condition and the isolating tubes I190 and I204 to be rendered conductive and an increased voltage to be transferred therefrom over the leads 48 and 54, respectively.

The increased voltage transferred over the lead 48 is applied to the control grid of the gate tube G49CU (Fig. 3c) to condition it, to the control grid of the gate tube G51U (Fig. 3c) to condition it and to the control grid of the gate tube G53U to condition it.

The cathodes of the tubes G51U, G121T and G137H are connected directly to the line 150g and their respective screen grids are connected through the resistors 284, 285, and 286 to the line 196p. The plates of the tubes G51U and G137H are connected through the resistors 287 and 288 respectively to the plate of the tube G121 connected through the potentiometer 289 to the line 152h. The suppressor grids of the tubes G51U, G121T, and G137H are connected through the resistors 290, 291, and 292, respectively, to the line 150g. Each of these tubes is normally non-conductive and when the increased voltage is applied to its control grid from the tube I190 it is conditioned to be conductive in response to a positive voltage subsequently applied to its suppressor grid.

The plate of the tube G53U is connected directly to the line 152h and its cathode is connected through a resistor 293 to the line 150g. The screen grid is connected through a resistor 295 to the line 196p and the suppressor grid is connected through a resistor 294 to the line 162b. The tube G53U is normally non-conductive and when the increased voltage is applied to its control grid from the tube 190 over the leads 48 and 52 it is conditioned to be rendered conductive by a subsequent positive voltage applied to its suppressor grid to transfer an increased voltage from its cathode over the capacitor 297.

The increased voltage transferred over the lead 54 is applied to the control grid of the gate tube 55 to condition it. The cathode of the tube G55 is connected directly to the line 150g and its plate is connected through a resistor 298 to the line 152h. The screen grid is connected through a resistor 299 to the line 196p and the suppressor grid is connected through the resistor 300 to the line 150g. The next negative A pluse transferred over the line 23 and capacitor 301 to the suppressor grid of the tube G55 renders it non-conductive and a positive pulse is transferred from its plate over the lead 56 and capacitor 302 to the control grid of the normally non-conductive inverter tube T57I to render it conductive. The decreased voltage is transferred from the plate of the tube T57I over the lead 58 through the resistor 155 and capacitor 157 to the control grid of the conducting tube L of the trigger T$mp$ to switch it from the Left to the Right condition. The trigger T$mp$ is similar to the trigger shown in Fig. 2 except that the potentiometer 305 is used instead of a resistor to permit easy regulation of the bias voltage transferred over the lead 116.

When the trigger T$mp$ is switched to the Right condition, a decreased voltage is transferred from the plate of the conducting R tube thereof over the lead 60 and capacitor 306 to the conducting tube 62L of the trigger 62 to switch it from the Left to the Right condition. Trigger 62 is similar to that shown in Fig. 2 except that the lead 72 is connected to the resistor 159 so that the desired bias voltage will be transferred to the control grid of the tube G73. Also when the trigger T$mp$ switches to the Right condition a decreased voltage is transferred therefrom over the lead 66 to the control grid of the tube G67 to de-condition it so that it will not respond to positive D pulses transferred to its suppressor grid over the lead 25 and capacitor 307. At the same time an increased voltage is transferred over the lead 63 to the control grid of the tube G65 to render it conductive so that it will be rendered non-conductive by subsequent negative C pulses transferred to its suppressor grid over the lead 24 and capacitor 308.

The tube G65 has its cathode connected directly to the line 150$g$ and its plate connected through a resistor 310 to a line 152$h$. The screen grid is connected through a resistor 311 to the line 196$p$ and the suppressor grid supplied with negative C pulses is connected through a resistor 312 to the line 150$g$. It is obvious from the circuit arrangement that when the trigger T$mp$ is in the Right condition the tube G65 is conductive and when it is in the Left condition the tube G65 is de-conditioned.

Tube G67 is connected as the tube G65 except that its suppressor grid is connected through a resistor to the line 162$b$. Hence, the tube G67 is normally non-conductive and is conditioned and de-conditioned in turn when the trigger T$mp$ is in the Left condition and Right condition, respectively.

When the trigger T$mp$ is switched to the Right condition a positive voltage is transferred from the plate of the non-conductive tube L thereof over resistor 314 and the lead 63 to the terminal $g$R of the trigger M$p$T9 (Fig. 3$e$) of the multiplier receiving device.

The next negative C pulse applied to the tube G65 renders it non-conductive and a positive pulse is transferred over the leads 69, 70 and 71, capacitor 227 and resistor 228 to the terminal $g$R of each of the triggers M$p$T9–M$p$T1, inclusive, of the multiplier receiving device. This positive pulse causes the trigger M$p$T9 to switch from the Left to the Right condition and causes the trigger M$p$T8 to be conditioned so that the next negative C pulse switches M$p$T8 to the Right condition. The sequential switching of the triggers in the multiplier receiving device is continued in the manner described hereinbefore.

When the trigger 62 is switched to the Right condition, an increased voltage is transferred from its resistor 159 over the lead 72 to the control grid of the tube G73 (Fig. 3$d$) to render it conductive. The plate of the tube G73 is connected directly to the line 152$h$ and its suppressor grid is connected through a resistor 316 to the line 150$g$ and through a capacitor 317 and leads 74, 70 and 71 and capacitor 227 and resistor 228 to the terminal $g$R of the triggers M$p$T9–M$p$T1, inclusive. The screen grid is connected through a resistor 318 to the line 196$p$ and through a capacitor 319 to the line 150$g$. The cathode is connected through a resistor 320 to the line 150$g$ and a capacitor 321 and a resistor 322 in series to the line 150$g$. When the tube G73 is rendered conductive, a positive pulse is transferred from its cathode over the condenser 321 and lead 75 to the triggers S1T, S2T, and S3T of the sequencer S (Fig. 3$b$) but has no effect on the stable condition of any of its triggers.

When the trigger of the multiplier receiving device having its corresponding push-button switch of the units order closed is sequentially switched to the Right condition an increased voltage is transferred therefrom over the closed switch and the lead 78 to the control grid of the tube G79U (Fig. 3$d$) to condition it.

The tube G79U has its plate connected directly to the line 152$h$ and its cathode connected through a resistor 324 to the line 150$g$ and its screen grid and suppressor grid connected through the resistors 325 and 326 to the lines 196$p$ and 162$b$, respectively.

The next positive C pulse applied to the suppressor grid of the tube G53U renders it conductive so that a positive voltage pulse is transferred from its cathode over the capacitor 297 to the suppressor grid of the tube G79U to render it conductive. When the tube G79U is rendered conductive, a positive voltage pulse is transferred from its cathode over capacitor 327 and a lead 84 to the control grid of the convertor tube T85I (Fig. 3$d$) to render it conductive. The cathode of the tube T85I is connected directly to the line 150$g$ and its control grid is connected through a resistor 328 to the line 162$b$ thereby normally biasing its control grid below the cutoff value.

When the tube T85I is rendered conductive, a decreased voltage is transferred from its plate over lead 86 and the resistor 155 and capacitor 157 to the control grid of the conducting tube L of the trigger T$mc$ to switch it from the Left to the Right condition. A decreased voltage is then transferred from the control grid of its non-conducting tube L over the lead 88 to the control grid of the tube G31 (Fig. 3$d$) to de-condition it so that it will be non-responsive to subsequent positive F1 pulses applied to its suppressor grid.

The cathode of the tube G31 is connected directly to the line 150$g$, the plate is connected through a resistor 330 to the line 152$h$, the screen grid is connected through resistor 332 to the line 196$p$ and the suppressor grid is connected through a resistor 331 to the line 162$b$. It is obvious from the circuit arrangement that the tube G31 is conditioned when the trigger T$mc$ is in the Left condition to be rendered conductive by positive F1 pulses applied to its suppressor grid and is de-conditioned when the trigger T$mc$ is in the Right condition.

Also, when the trigger T$mc$ is switched to the Right condition, an increased voltage is transferred from the control grid of its tube R over the lead 87 to the control grid of the tube G33. The plate of the tube G33 is connected through the resistor 330 to the line 152$h$ as is the plate of the tube G31 and its cathode is connected directly to the line 150$g$. The screen grid of the tube G33 is connected through a resistor 333 to the line 196$p$ and the suppressor grid is connected through a resistor 334 to the line 150 $g$. It is seen from the circuit arrangement that the tube G33 is de-conditioned when the trigger T$mc$ is in the Left condition and rendered conductive when the trigger T$mc$ is in the Right condition so that it will be rendered non-conductive by negative KF1 pulses transferred over the lead 20 and capacitor 335 to its suppressor grid.

Further, when the trigger T$mc$ is switched to the Right condition, an increased bias voltage is transferred therefrom over the lead 89 to the terminal $g$R of the trigger McT9 (Fig. 3$e$) thereby rendering it switchably responsive to the next positive pulse transferred over the lead 26 to the triggers of the multiplicand receiving device.

The next negative KF1 pulse renders the tube G33 non-conductive and a pulse is transferred from its plate over the leads 26$a$ and 26 to all the triggers of the multiplicand receiving device to switch the triggers McT9 from the Left to the Right condition. Subsequent negative KF1 pulses advance the sequential operation of the multiplicand receiving device as described hereinbefore.

When the trigger of the multiplicand receiving device having its corresponding push-button switch of the units order closed is sequentially switched to the Right condition, an increased voltage is transferred therefrom over the closed switch and lead 36 to the control grid of the tube G37U (Fig. 3$c$). The tube G37U has its cathode connected directly to the line 150$g$, its screen grid connected through resistor 337 to the line 196$p$, its plate connected through potentiometer 338 to the line 152$h$, and its suppressor grid connected through the lead 96 and a capacitor 339 to the lead 95 connected to potentiometer 289 in the plate circuit of the tube G121T (Fig. 3$c$) and through resistors 340 and 341 respectively to the lines 150$g$ and 194$n$.

The increased voltage transferred over the lead 36 to the tube G37U conditions it. The next negative F1 pulse transferred over the leads 19, 93, and a capacitor 342 to the suppressor grid of the conductive gate tube G51U (Fig. 3c) renders it non-conductive and causes a decreased voltage to be transferred from the potentiometer 289 over the leads 95 and 96 and the capacitor 339 to the suppressor grid of the conditioned tube G37U to render it conductive. A negative pulse is then transferred from the potentiometer 338 over the lead 97 to the trigger UT1 (Fig. 3f) of the units order RRU of the result register to effect an entry therein. Each subsequent negative F1 pulse causes a similar entry into the units order.

When the trigger of the multiplicand receiving device having its corresponding push button of the tens order closed is sequentially switched to the Right condition, an increased voltage is transferred therefrom over the closed switch and the lead 38 to the control grid of the tube G39T (Fig. 3c). The tube G39T has its cathode, screen grid and suppressor grid connected as are the corresponding electrodes of the tube G37U and its plate connected through a resistor 344 and potentiometer 276 to the line 152h.

The increased voltage transferred over the lead 38 to the tube G39T conditions it so that when the next negative F1 pulse renders the tube G31U conductive a positive pulse is transferred over the lead 95 to the tube G39T to render it conductive. The conduction of tube G39T causes a negative pulse to be transferred from the potentiometer 276 over the lead 99 to the trigger TT1 (Fig. 3f) of the tens order RRT of the result register to effect an entry therein. Each subsequent negative F1 pulse causes a similar entry into the tens order.

When the trigger of the multiplicand receiving device having its corresponding push-button switch of the hundreds order closed is sequentially switched to the Right condition an increased voltage is transferred therefrom over the closed switch and lead 50 to the control grid of the tube G41H (Fig. 3c). The cathode, screen grid, and suppressor grid of the tube G41H are connected as as the corresponding electrodes of the tube G37U and its plate is connected through a resistor 345 and a potentiometer 282 to the line 152h.

The increased voltage transferred over the lead 40 to the control grid of the tube G41H conditions it. The next negative F1 pulse renders the tube G51U conductive and a positive voltage is transferred over the lead 95 to the tube G41H to render it conductive. A negative voltage is then transferred from the potentiometer 282 over the lead 100 to the trigger HT1 of the hundreds order RRH of the result register to effect an entry therein. Each subsequent negative F1 pulse causes a similar entry into the hundreds order.

It is obvious that initiation of entries into the units, tens, and hundreds orders of the result register is determined by the value of the digits of the units, tens, and hundreds order of the multiplicand. These entries are made in response to the multiplicand digit having the highest value, then in response to the digit having the intermediate value, and lastly in response to the digit having the lowest value. Hence, entries are made in the order above described only when the units order of the multiplicand has the highest value, the tens digit the intermediate value, and the hundreds digit the lowest value.

The sequential switching of the multiplicand receiving device and entries into the result register are continued in response to each negative KF1 pulse and negative F1 pulse respectively. Finally, the trigger McT1 of the multiplicand receiving device is switched to the Right condition in response to a negative F1 pulse and an increased steady bias voltage is transferred over the lead 35 to the potentiometer 221 of the trigger Tmc.

A positive F1 pulse occurs simultaneously with this negative KF1 pulse but has no effect on the conductive condition of the circuit. The next negative F1 pulse causes entries to again be made into the units, tens, and hundreds orders of the result register and this pulse is also transferred over the lead 19 and capacitor 222 to the conducting tube R of the trigger Tmc to switch it back to the Left condition. As a result, a decreased voltage is transferred over the lead 87 to the tube G33 to de-condition it and an increased voltage is transferred over lead 88 to the tube G31 to condition it.

The next positive F1 pulse applied to the suppressor grid of the tube G31 renders it conductive and causes a negative pulse to be transferred from its plate over the lead 26 to the terminals gR of the triggers of the multiplicand receiving device to switch them all simultaneously to the Left condition.

During the time the multiplicand receiving device was completing a cycle of operation, the multiplicand was entered into the result register one time and a negative C pulse did not occur to advance the sequential switching of the multiplier receiving device. A negative C pulse occurs next and renders the tube G65 non-conductive to cause the next lower digit-representing trigger of the multiplicand receiving device to switch to the Right condition.

The next positive C pulse renders the tube G53U conductive and an increased voltage is transferred from its cathode to effect a switching of the trigger Tmc to the Right condition and thereby permit the multiplicand receiving device to go through another cycle of operation and again enter the multiplicand into the result register. This cycle of operation of the multiplicand receiving device is continued until the trigger MpT1 of the multiplier receiving device is switched to the Right condition at which time the multiplicand has been entered into the result register a number of times equal to the units digit of the multiplier.

When the trigger MpT1 is switched to the Right condition, an increased voltage is transferred from its terminal pL over the resistor 347 and the lead 116 to the potentiometer 305 to supply a steady positive bias voltage to the control grid of the tube L of the trigger Tmp. The next negative KF1 pulse from the trigger 18T8 of the step-down circuit 18 is transferred over the leads 20 and 117 and a capacitor 348 to the control grid of the conducting tube R of the trigger Tmp to switch it to the Left condition. When the trigger Tmp is switched to the Left condition, the tube G65 is de-conditioned and the tube G67 is conditioned. The positive D pulse from the trigger 22T16 of the step-down circuit 22 is transferred over the lead 25 and capacitor 307 to the suppressor grid of the tube G67 to render it conductive so that a negative pulse is transferred over the lead 70 to the control grid of the conducting tube R of the triggers of the multiplier receiving device to switch them all simultaneously back to the Left condition.

This same negative pulse is transferred over leads 70 and 74 and capacitor 317 to the suppressor grid of the tube G73 to de-condition it and thereby render it non-conductive. As a result, a negative pulse is transferred from the cathode of the tube G73 over the capacitor 321 and lead 75 to the terminal gL of the triggers S1T, S2T, and S3T of the sequencer to effect a switching of the triggers S1T and S2T to the Right condition and Left condition, respectively. Also the tubes I190 and I200 are rendered conductive and non-conductive, respectively. This switching of the trigger S1T de-conditions the tubes G49CU, G51U and G53U.

An increased voltage is then transferred over the lead 118 to the control grid of the gate tube G119CT (Fig. 3c) to condition it, over the leads 118 and 120 to the control grid of the gate tube G121T (Fig. 3c) to condition it, and over the leads 118 and 122 to the control grid of the gate tube G123T (Fig. 3d) to condition it. The circuit is now in condition to effect multiplication of the multiplicand in response to the tens digit of the multiplier.

It should be noted that the tube G123T is connected exactly as the tube G53U previously described and that it is capacitively coupled to the suppressor grid of the tube G125T (Fig. 3d) which is connected as tube G79U except that the tube G125T is connected to be rendered conductive in response to the tens order push-button switches of the multiplier receiving device.

As in multiplying the multiplicand by the units order digit of the multiplier, the next positive A pulse causes the trigger Tmp to switch to the Right condition to switch the trigger 62 to the Right condition to render the tube G65 conductive, de-condition the tube G67, and bias the trigger MpT9 so that subsequent negative C pulses applied to the tube G65 cause sequential switching of the triggers of the multiplier receiving device.

This sequential switching continues until the triggers of the multiplier receiving device representative of the tens digit of the multiplier are switched to the Right condition when an increased voltage is transferred over the closed push-button switch of the tens order connected thereto and the lead 124 to the control grid of the tube G125T to condition it. The tube G125T is rendered conductive by the increased voltage transferred to its suppressor grid from the cathode of the conditioned tube G123T when the latter tube is again rendered conductive by the next positive C pulse transferred from the terminal $prR$ of the trigger 22T16 over the capacitor 350 and leads 24 and 81 to its suppressor grid.

When the tube G125T is rendered conductive, an increased voltage is transferred from its cathode over a capacitor 351 and the lead 84 to the control grid of the inverter tube T85I to render it conductive. A negative voltage is then impressed upon the control grid of the conducting tube L of the trigger $Tmc$ to switch it to the Right condition. This switching of the trigger $Tmc$ de-conditions the tube G31, renders the tube G33 conductive and applies a positive bias voltage to the trigger $McT9$. Each subsequent negative KF1 pulse causes an increased voltage to be transferred from the tube G33 to effect a sequential switching of the triggers of the multiplicand receiving device.

When a number of negative KF1 pulses equal to the tens complement of the units, tens, and hundreds orders digits, respectively, of the multiplicand are applied to the tube G33 the trigger of the multiplicand receiving device representative of the digit of those respective orders is caused to switch to the Right condition and thereby transfer an increased voltage to the control grid of the tubes G37U, G39T, and G41H, respectively, to condition them as described in connection with the multiplication of the multiplicand by the units orders digit of the multiplier.

As each of the tubes G37U, G39T, and G41H is conditioned the next negative F2 pulse which is transferred from the trigger 14T4 over the lead 15 and capacitor 353 to the suppressor grid of the tube G121T renders it non-conductive and causes an increased voltage to be transferred from the potentiometer 289 to render the conditioned tube conductive and effect entries into the result register. The manner in which the tubes G37U, G39T, and G41H are conditioned and effect entries into the units, tens, and hundreds orders of the result register is exactly as described relative to multiplication of the multiplicand by the units digit of the multiplier. However, these tubes are now rendered conductive in response to the occurrence of negative F2 pulses which have ten times the recurrence frequency of the negative F1 pulses which cause their energization when effecting multiplication by the units digit of the multiplier. Hence, ten times as many entries are made into the result register so that the necessity for providing for column shift is thereby circumvented and the product entered into the result register in the same manner.

When the multiplicand receiving device completes a cycle of operation the multiplicand has been entered into the result register ten times. The next negative C pulse causes the next lower digit-representing trigger of the multiplier receiving device to be switched to the Right condition and the next positive C pulse causes the circuit to be placed in condition to permit the triggers of the multiplicand receiving device to be sequentially switched in response to negative KF1 pulses. This circuit operation is effected exactly as it was when multiplication by the units order digit of the multiplier was carried out.

The cycle of operation of the multiplicand receiving device and entry of the multiplicand into the result register is continued until the trigger $MpT1$ is switched to the Right condition to permit a switching of the trigger $Tmp$ to the Left condition to de-condition the tube G65 and condition the tube G67 so that the next positive D pulse causes a negative pulse to be transferred from the tube G67 to the triggers $MpT9$–$MpT1$, inclusive, and the suppressor grid of the tube G73 to switch all the triggers simultaneously to the Left condition and to de-condition the tube G73.

When the tube G73 is de-conditioned, a negative pulse is again transferred therefrom to the triggers S1T, S2T, and S3T, of the sequencer. This causes the trigger S2T to be switched to the Right condition, the tube I200 to be rendered conductive, the trigger S3T to be switched to the Left condition, and the tube I202 to be rendered non-conductive. As a result a decreased voltage is transferred to the control grids of the tubes G119CT, G121T, and G123T to de-condition them. Also an increased voltage is transferred over the lead 134 to the control grid of the tube 135CH (Fig. 3c), over the leads 134 and 136 to the control grid of the tube G137H (Fig. 3c) and over the leads 134 and 138 to the control grid of the tube G139H (Fig. 3d) to condition them. The conditioning of these tubes places the circuit in condition to effect multiplication of the multiplicand in response to the hundreds order digit of the multiplier.

Tube G139H is connected as the tube G53U except that it is conditioned by a change in the conductive condition of the tube I202 instead of the tube I190. As the tube G53U, the tube G139H is rendered conductive by positive C pulses applied to its suppressor grid. The increased voltage at its cathode is transferred over a capacitor to the suppressor grid of the tube G141H (Fig. 3d) to render it conductive as it is already conditioned. Except for the connections specified, the tube G141H is connected as the tube G79U which is rendered conductive by the tube G53U. The tube G141H is conditioned by an increased voltage transferred over the lead 140 to its control grid when the trigger of the multiplier receiving device representing the hundreds order digit of the multipler is switched to the Right condition.

In the usual manner, the next positive A pulse results in the triggers $Tmp$ and 62 being switched to the Right condition and the tubes G65 and G67 being rendered conductive and de-conditioned respectively. The switching of $Tmp$ causes a steady bias voltage to be applied to the trigger $MpT9$ of the multiplier receiving device so that subsequent negative C pulses applied to the suppressor grid of the tube G65 cause sequential switching of the triggers of the multiplier receiving device.

Finally, when the trigger representative of the hundreds digit of the multiplier is switched to the Right condition, an increased voltage is transferred over the closed push-button switch of the hundreds order connected thereto and the lead 140 to the control grid of the tube G141H to condition it.

When the tube G139H is again rendered conductive by a positive C pulse applied to its suppressor grid, an increased voltage is transferred from its cathode through the associated capacitive coupling to the suppressor grid of the tube G141H to render it conductive. An increased voltage is then transferred from the cathode of the tube G141H to the control grid of the inverter tube T85I to render it conductive to effect a switching of the trigger $Tmc$ to the Right condition. As previously described, this switching of the trigger $Tmc$ causes the tube G31 to be de-conditioned, the tube G33 to be rendered conductive, and a positive bias to be applied to the trigger $McT9$ of the multiplicand receiving device so that sequential switching of the triggers of the multiplicand receiving device is initiated by the next negative KF1 pulse.

In the manner previously described the sequential switching of the multiplicand receiving device causes the tubes G37U, G39T, and G41H to be conditioned.

As each of these tubes is conditioned, the next negative F3 pulse is transferred from the plate of the tube 175F3 over the lead 11 and capacitor 355 to the suppressor grid of the conductive tube G137H to render it non-conductive and cause an increased voltage to be transferred from the potentiometer 289 to the suppressor grid of the tubes G37U, G39T, and G41H to render the conditioned ones conductive and cause entries into the result register as described hereinbefore. However, the tubes G37U, G39T, and G41H are now rendered conductive in response to the occurrence of a negative F3 pulse which has ten and one hundred times the recurrence frequency as the respective negative F2 and negative F1 pulses which render these tubes conductive when the multiplicand is multiplied in response to the tens and units digits of the multiplier respectively. Hence, the product entered into the result register when multiplying by the hundreds order digit of the multiplier is increased ten and one-hundred times respectively over the product entered when multiplying by the units and tens orders digits respectively. This novel means of multiplication eliminates the necessity of employing column shift and obviously can be employed to obtain the product of a multiplicand and a multiplier having any number of orders.

As the multiplicand receiving device completes a cycle of operation, the multiplicand has been entered into the result register a hundred times and cyclic operation of the multiplicand receiving device is continued in the manner previously described until the trigger $MpT1$ of the multiplier receiving device is switched to the Right condition.

In the usual manner, the trigger T*mp* is switched to the Left condition to de-condition the tube G65 and condition the tube G67, the triggers M*p*T9–M*p*T1, inclusive, are switched back to the Left condition and the tube G73 de-conditioned.

When the tube G73 is de-conditioned a negative pulse is transferred over the capacitor 321 and the leads 75 and 77 and capacitor 206 to the terminal gL of the trigger S3T of the sequencer to switch it from the Left to the Right condition to cause the isolating tube I202 to be rendered conductive and the trigger S4T to be switched from the Left condition to the Right condition. The conduction of the tube I202 causes the tubes G135CH, G137H, and G139H to be de-conditioned and the switching of the trigger S4T to the Right condition causes the isolating tube I204 to be rendered conductive to transfer a decreased voltage to the tube G55 (Fig. 3d) to de-condition it. The entire circuit is now in its initial starting condition except that the product of the multiplicand and multiplier is indicated by the result register.

It is understood that while entries were being made into the result register the carry was made at the proper times in the manner previously described in detail.

TIMING CHART

The correspondingly lettered sheets of Figs. 5a–5g and 6a–6g in that order are placed underneath the correspondingly lettered sheets of Figs. 4a–4g to comprise a timing chart representing the multiplier operation in which a multiplicand 124 is multiplied by a multiplier 236.

This timing chart shows the sequential operation of all of the gates and triggers associated with the device except the triggers associated with the result register. However, the diagram shows the pulses applied to the result register but does not show the status of the register at any time.

Figure 5A:
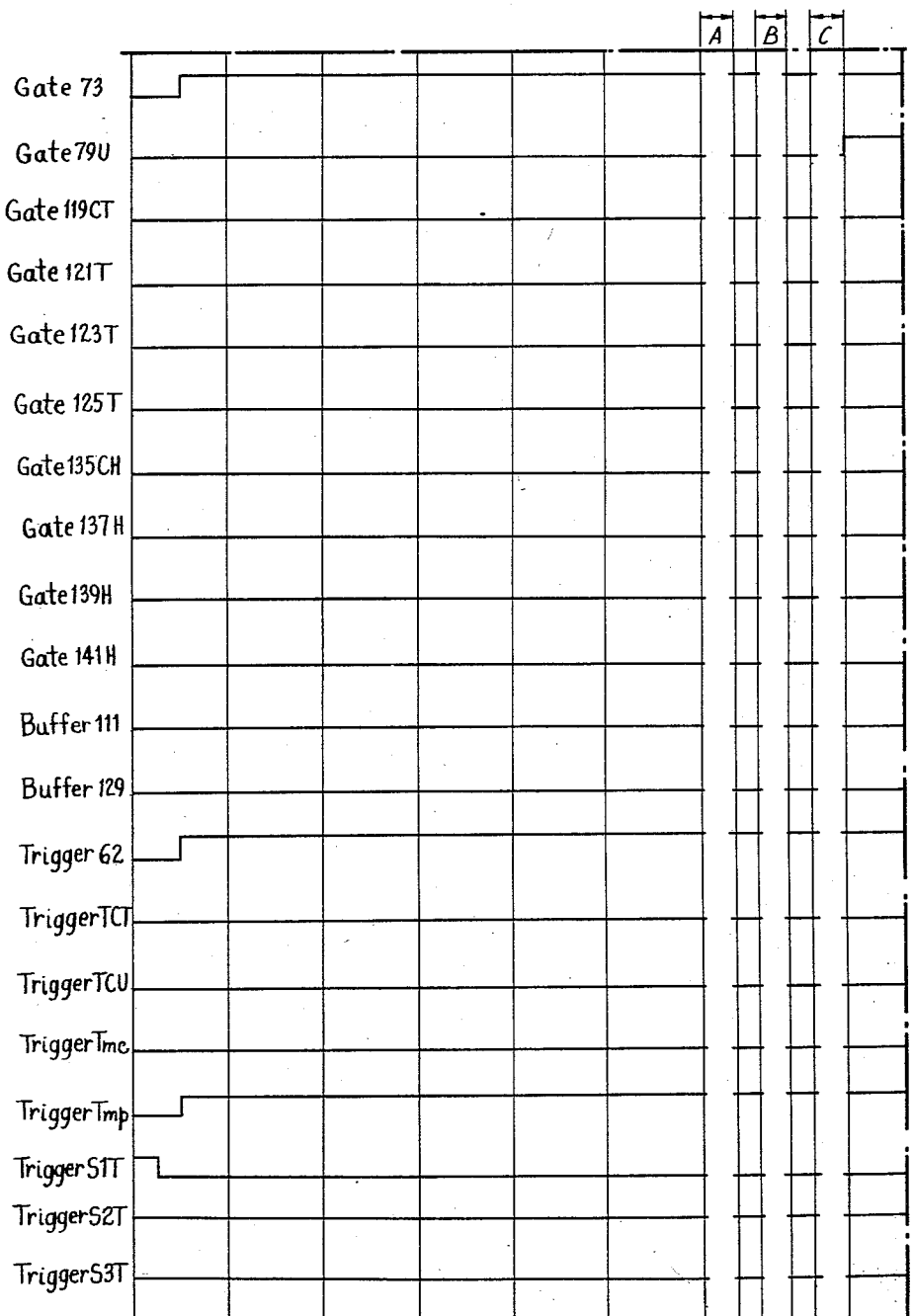
Figure 5B:
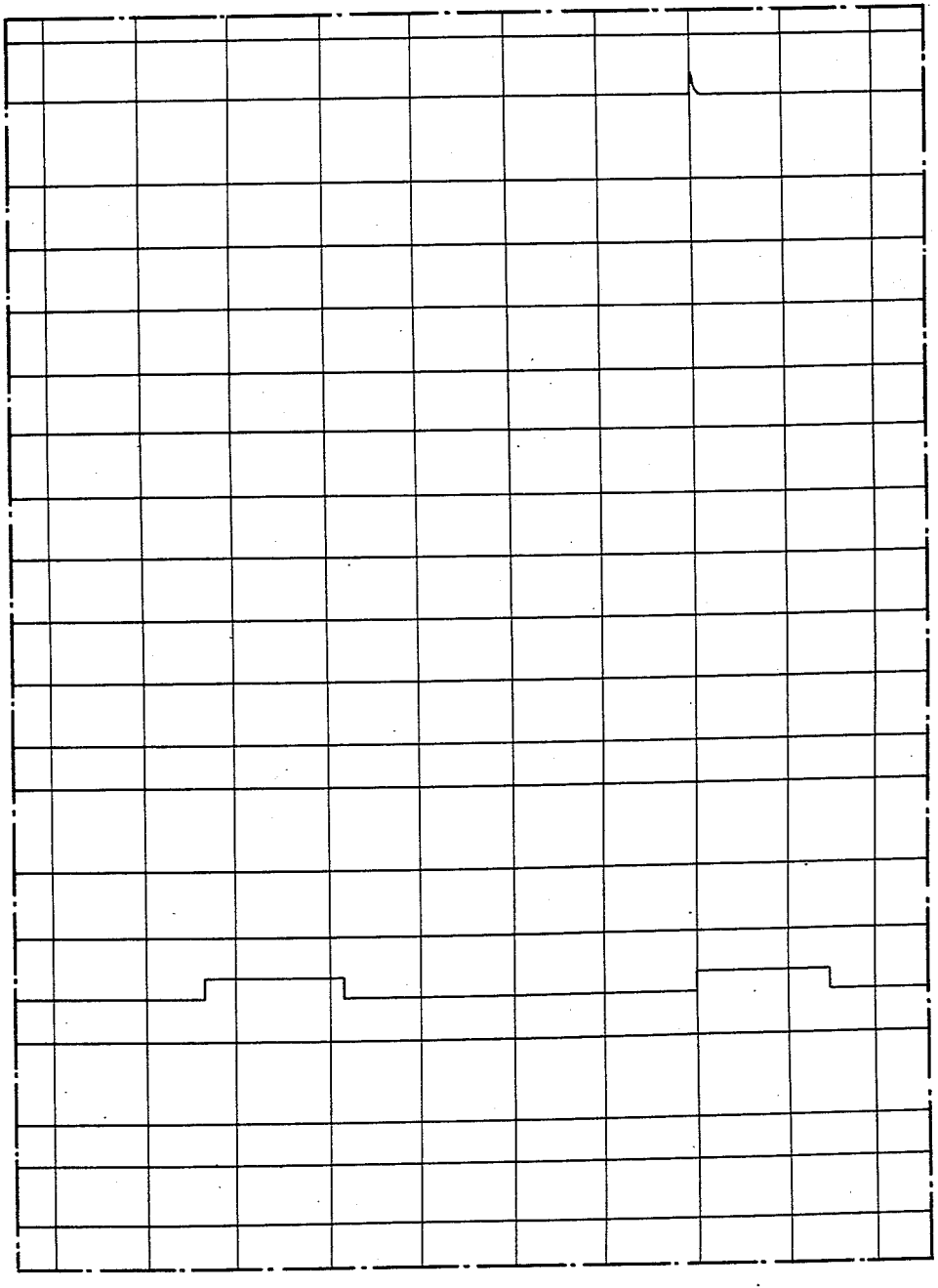
Figure 5C:
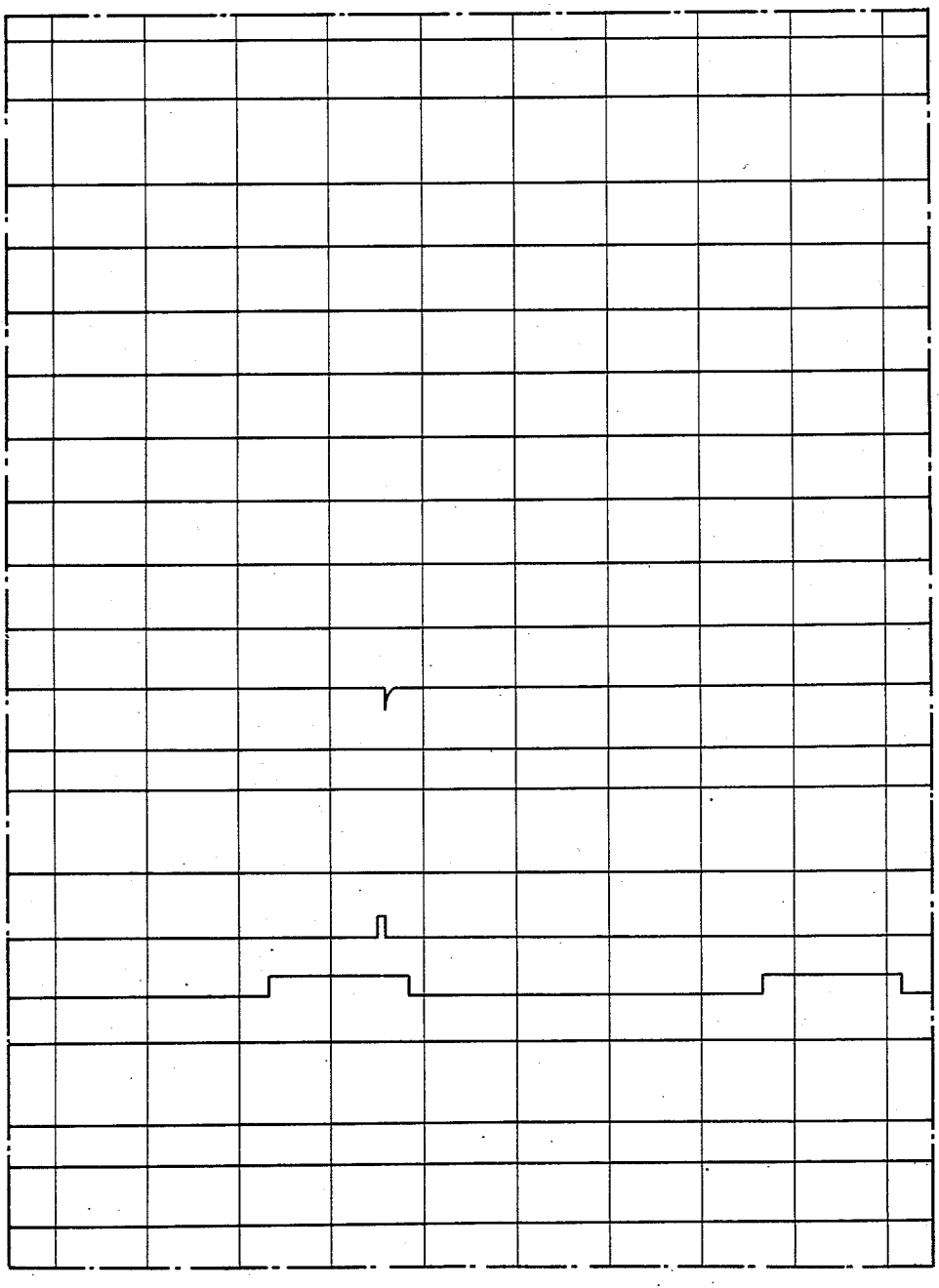
Figure 5D:
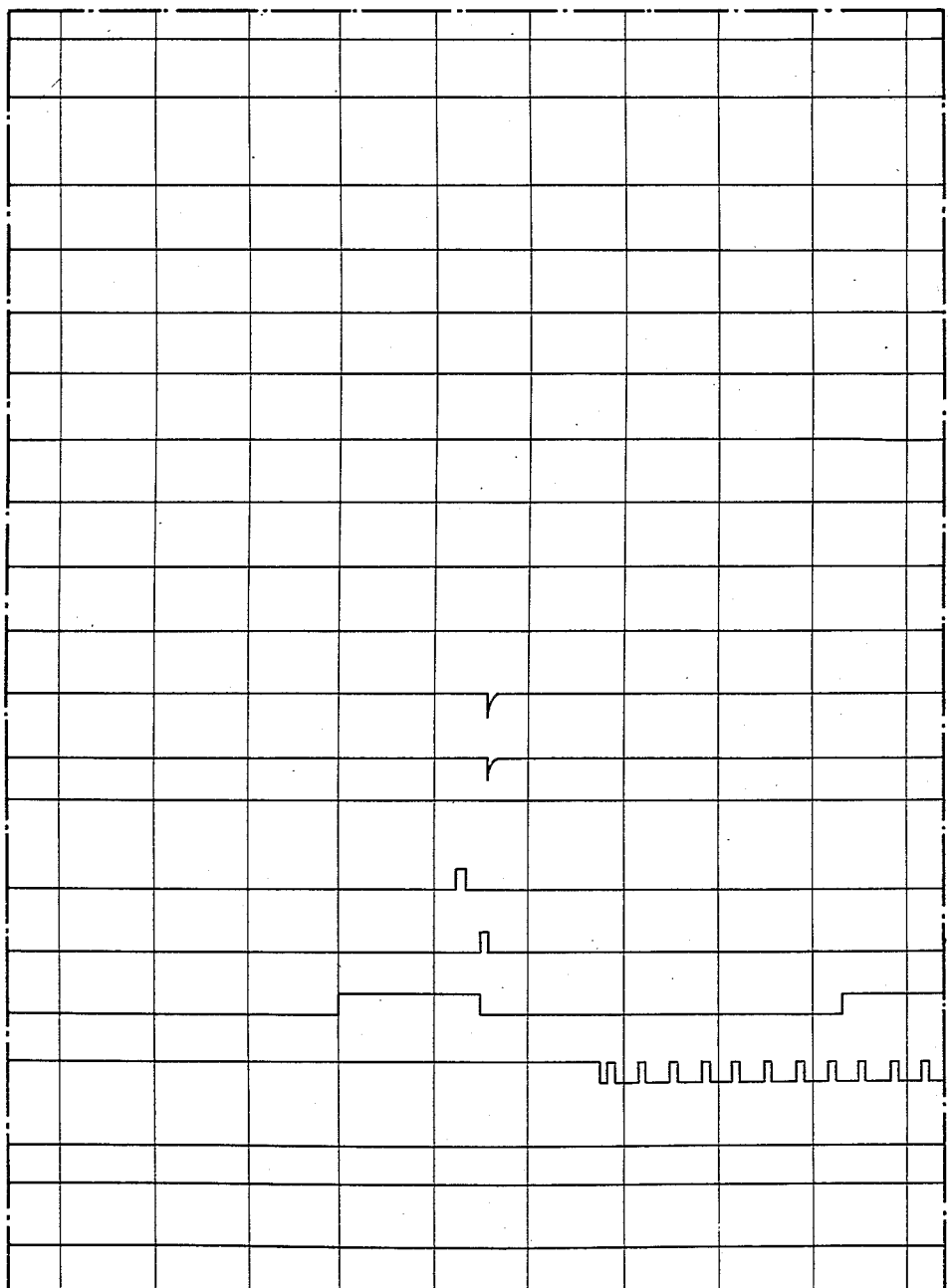
Figure 5E:
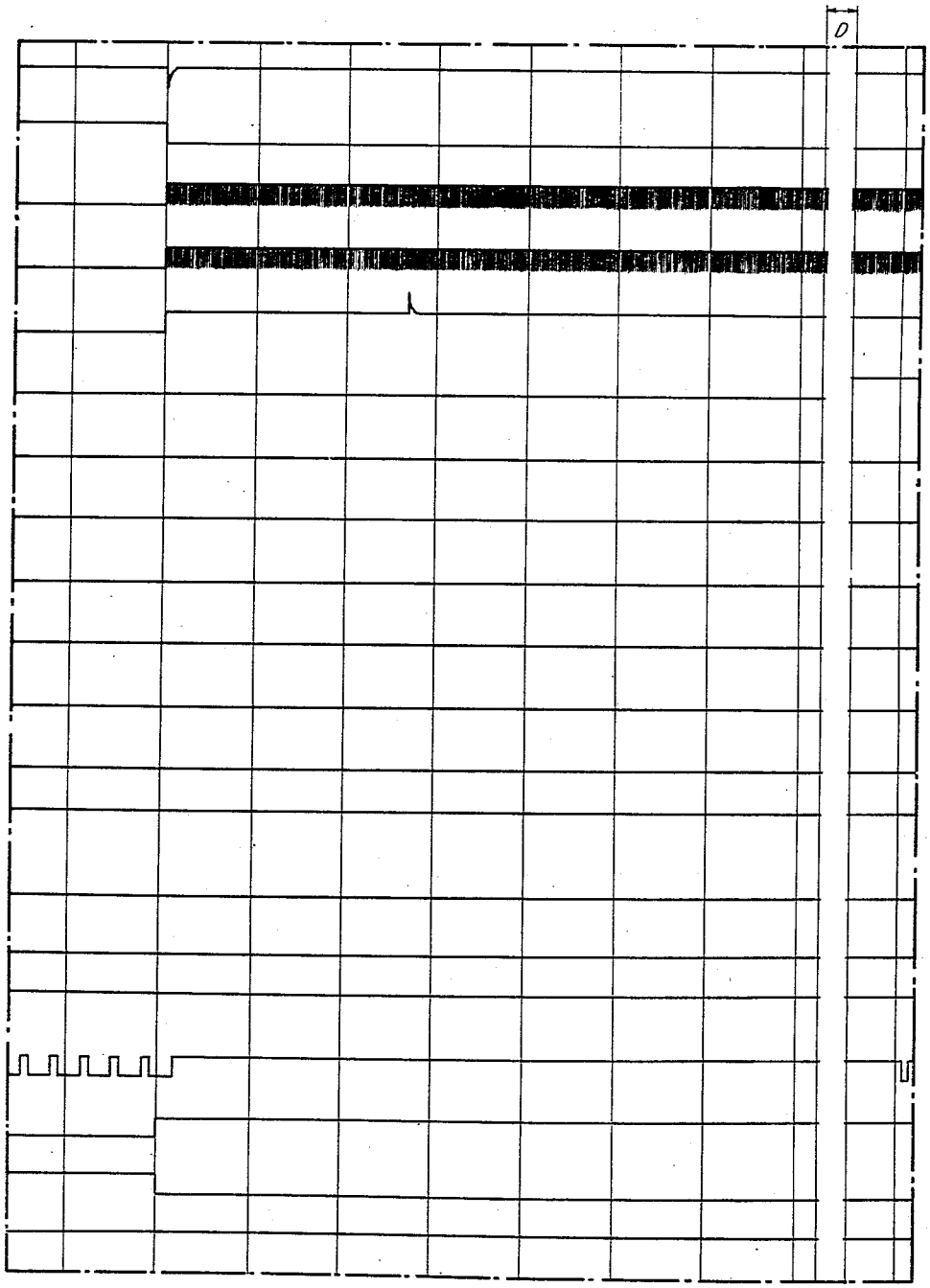
Figure 5F:
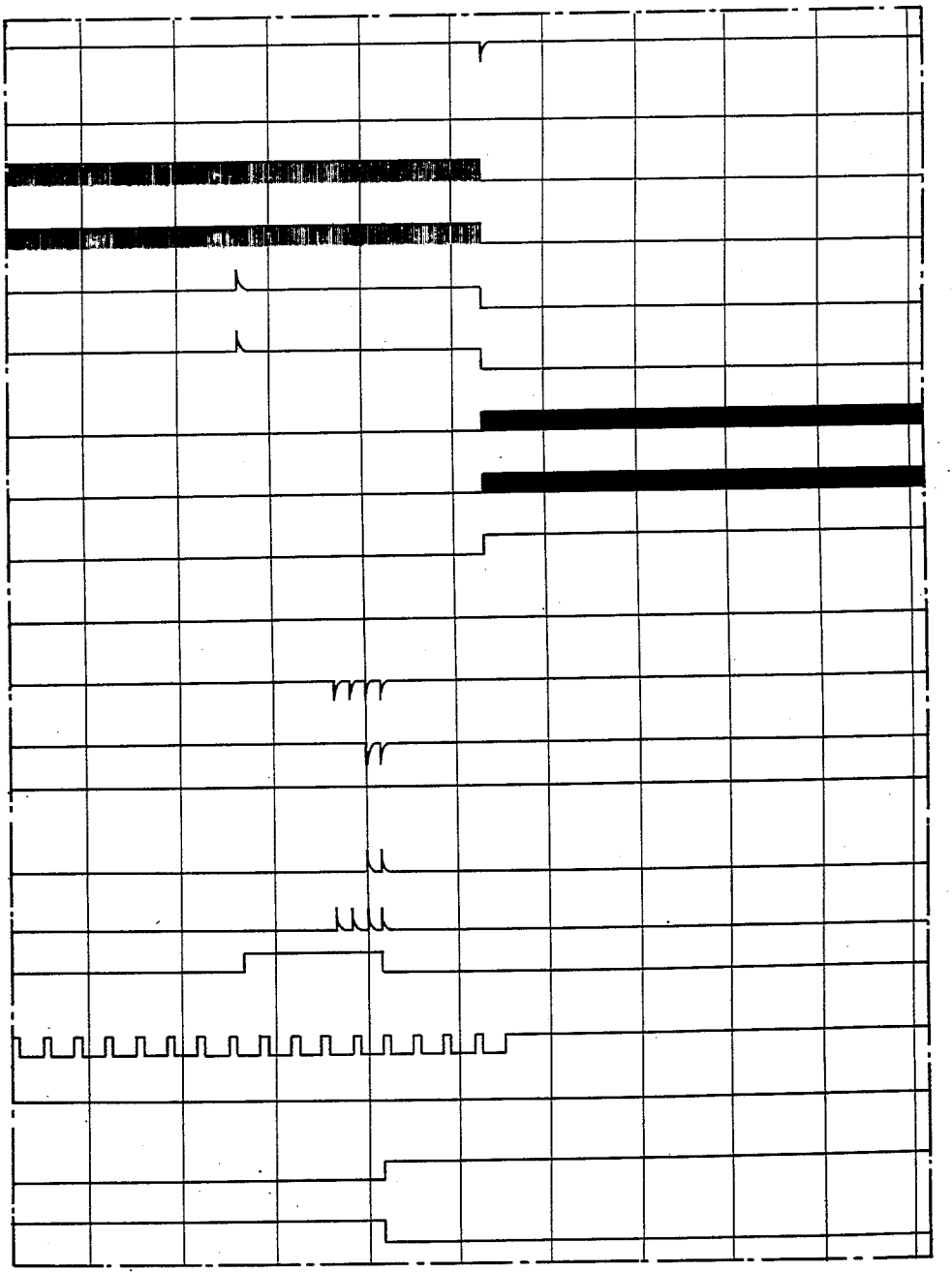
Figure 5G:
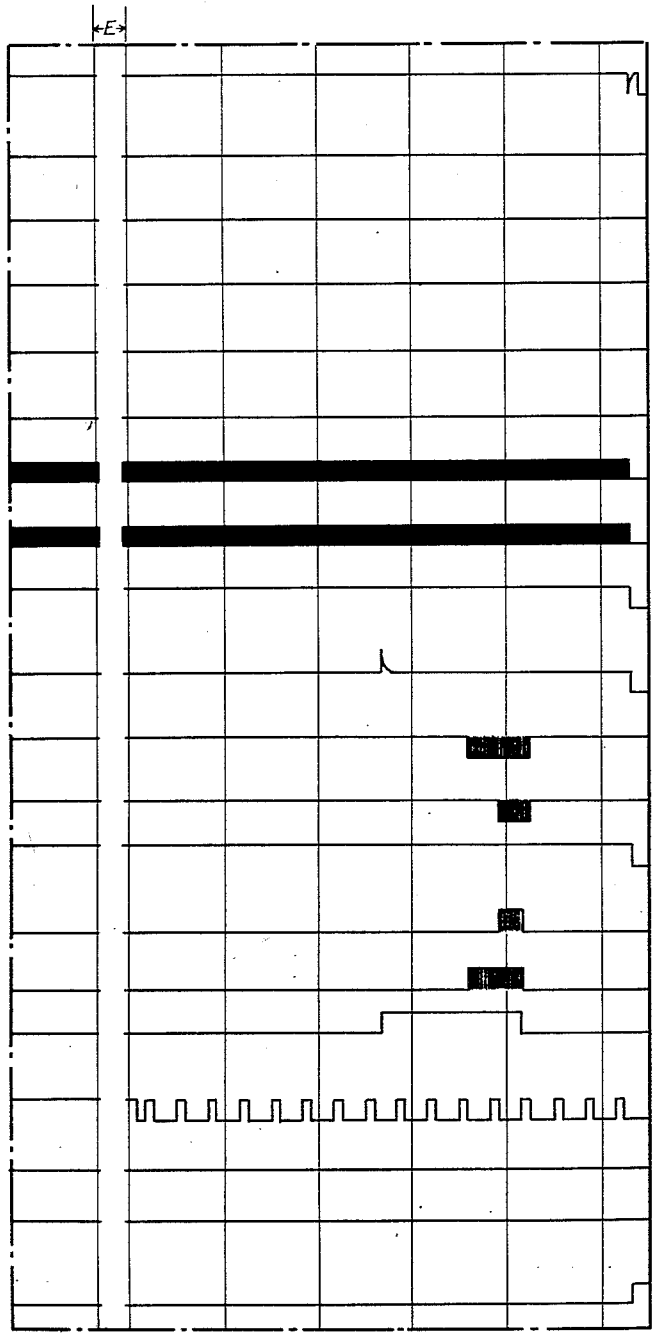
Figure 6A:
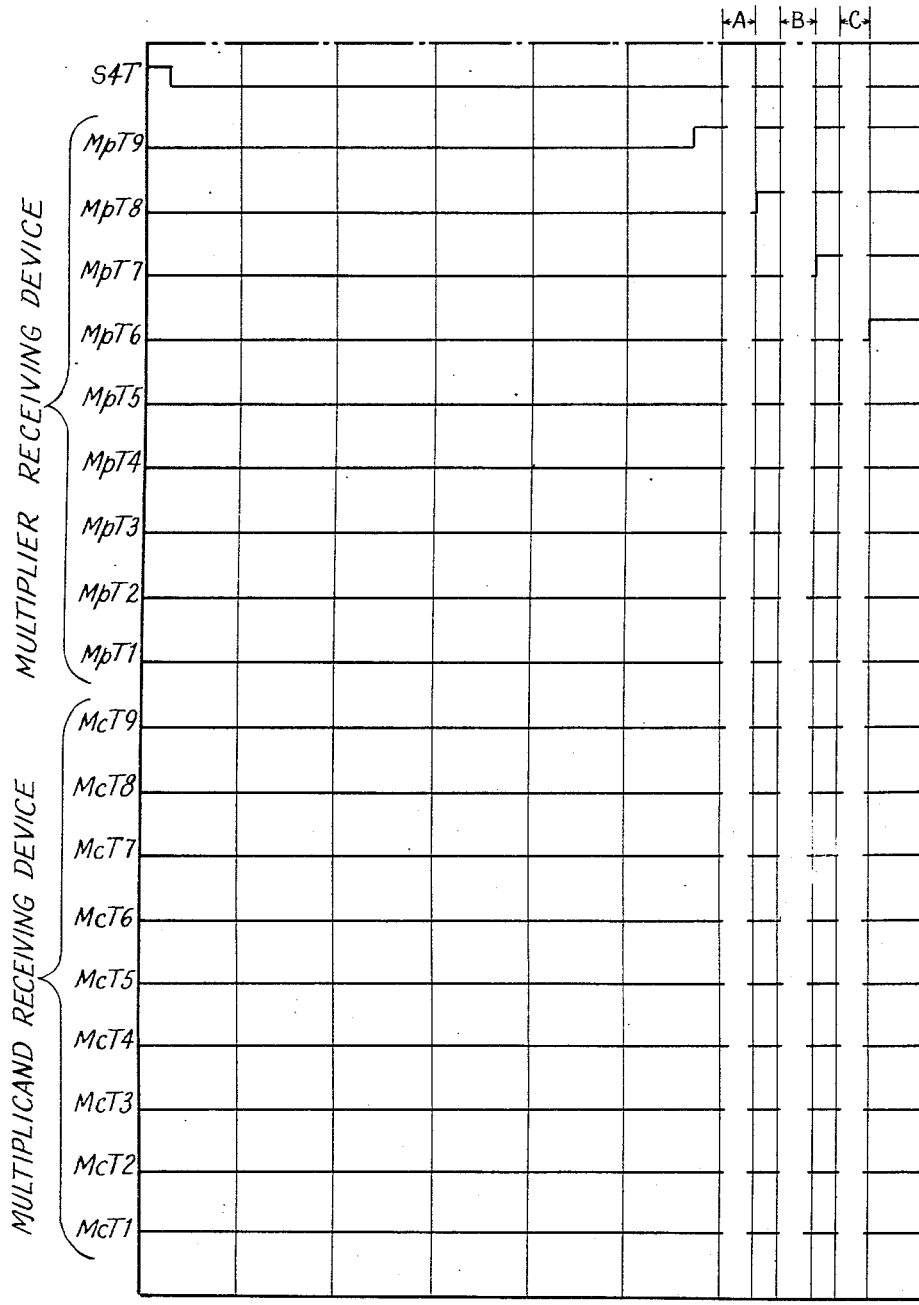
Figure 6B:
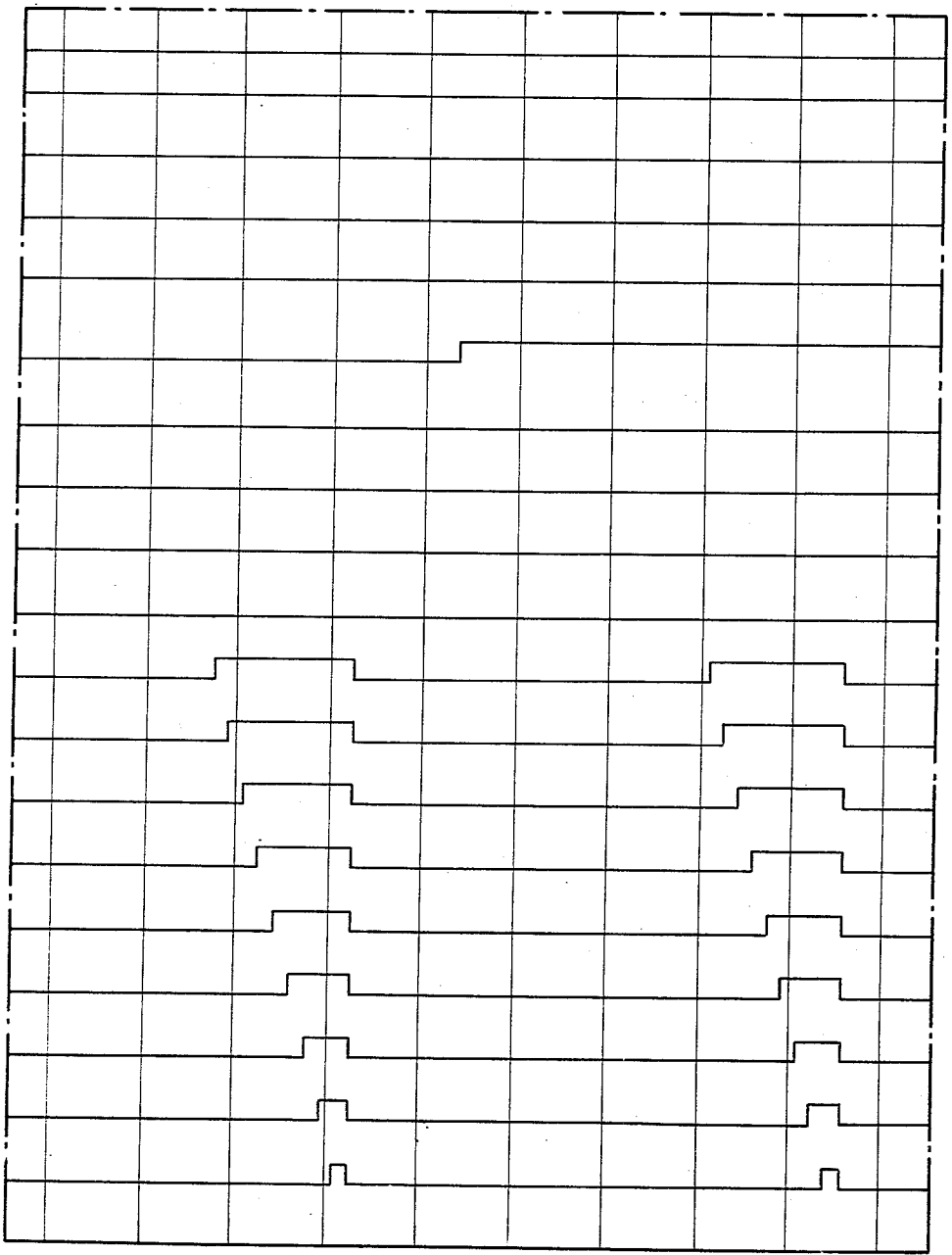
Figure 6C:
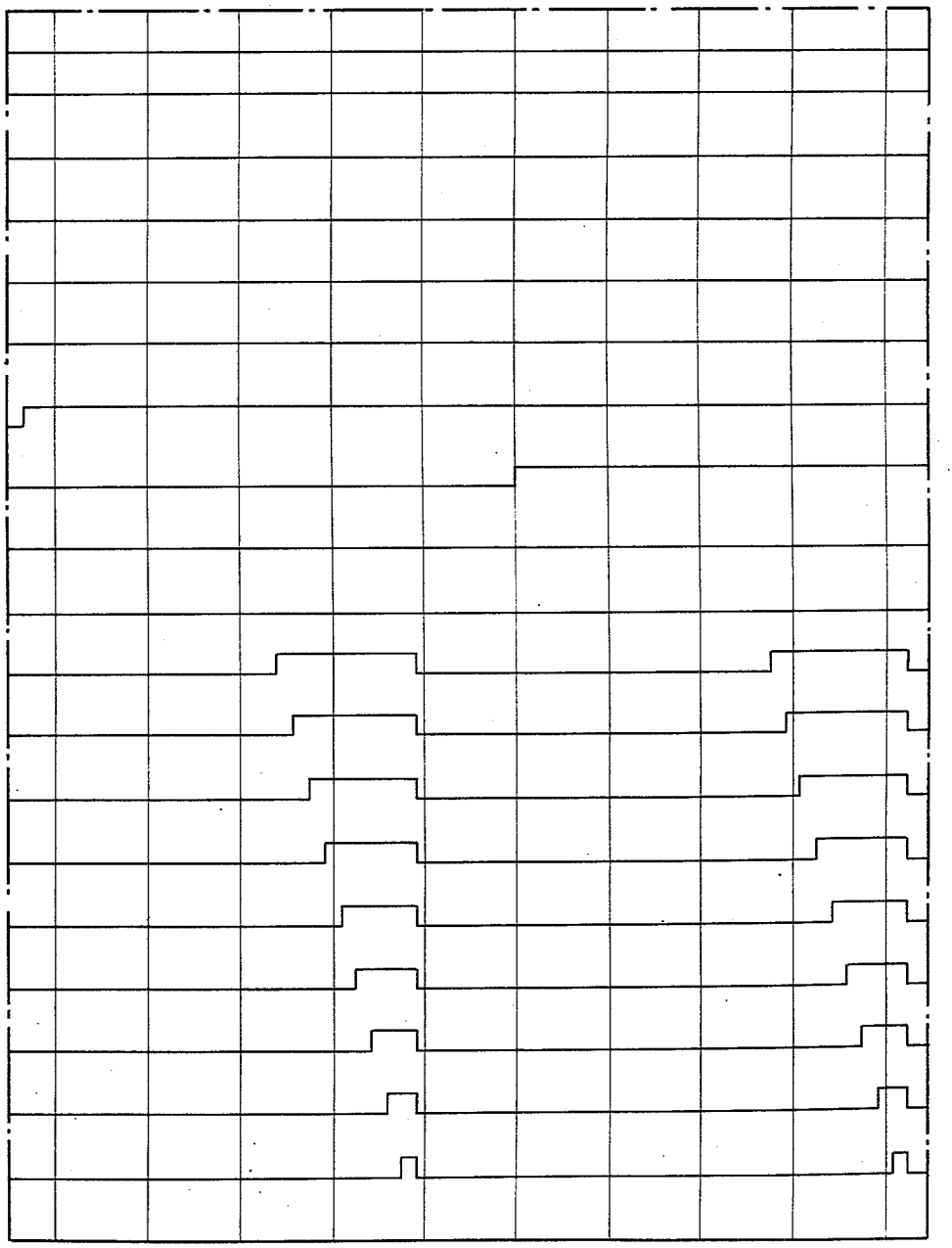
Figure 6D:
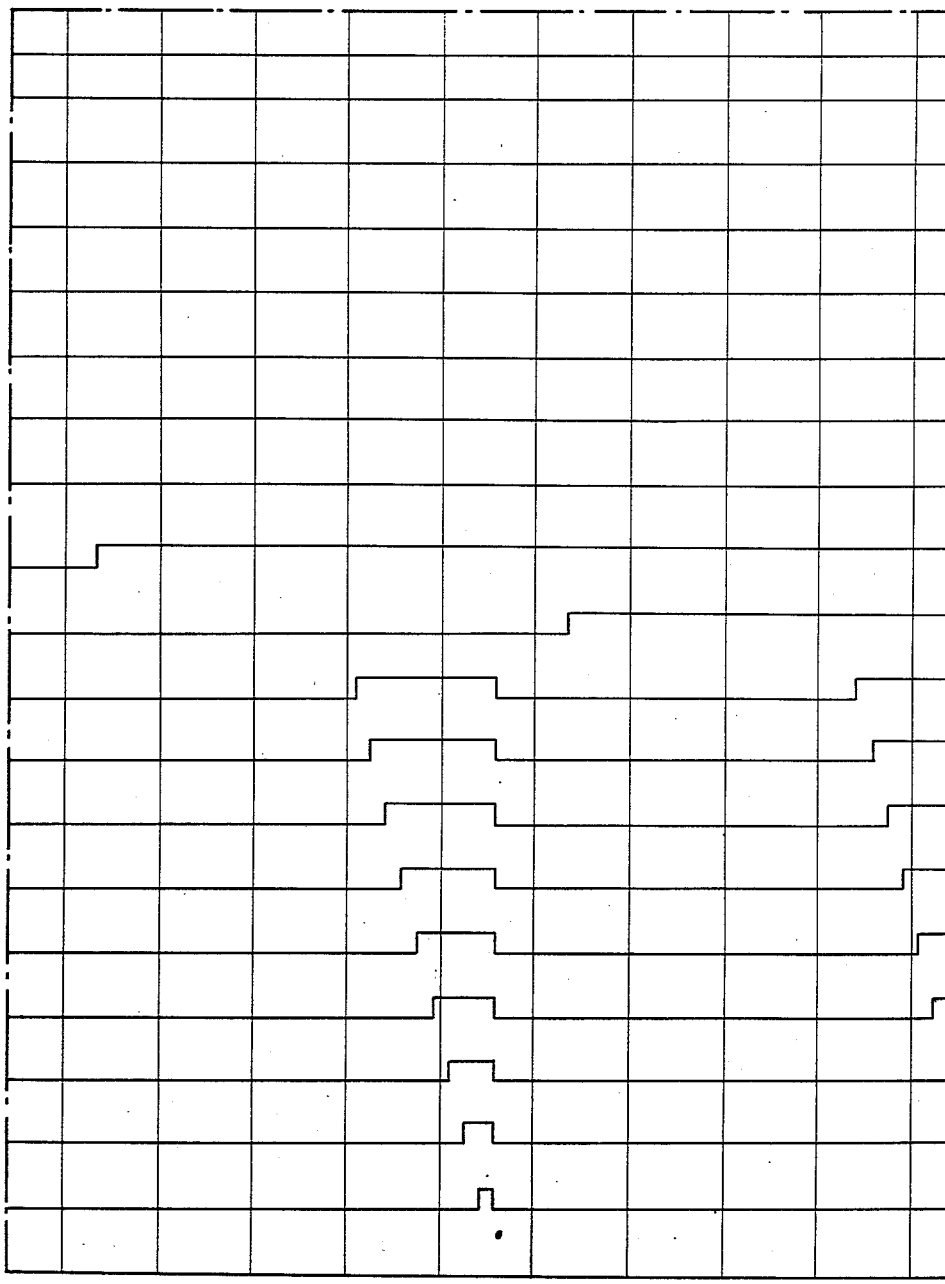
Figure 6E:
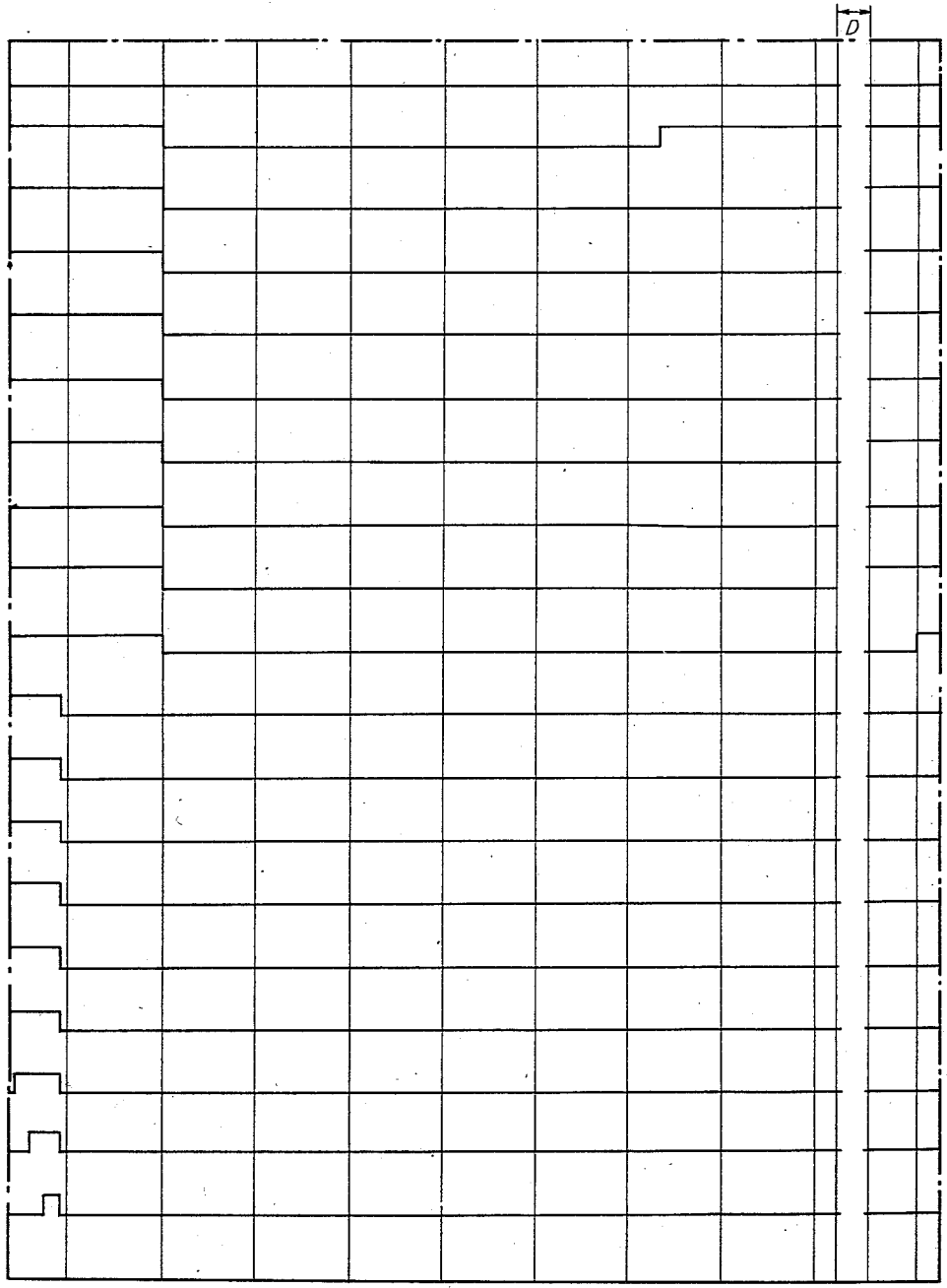
Figure 6F:
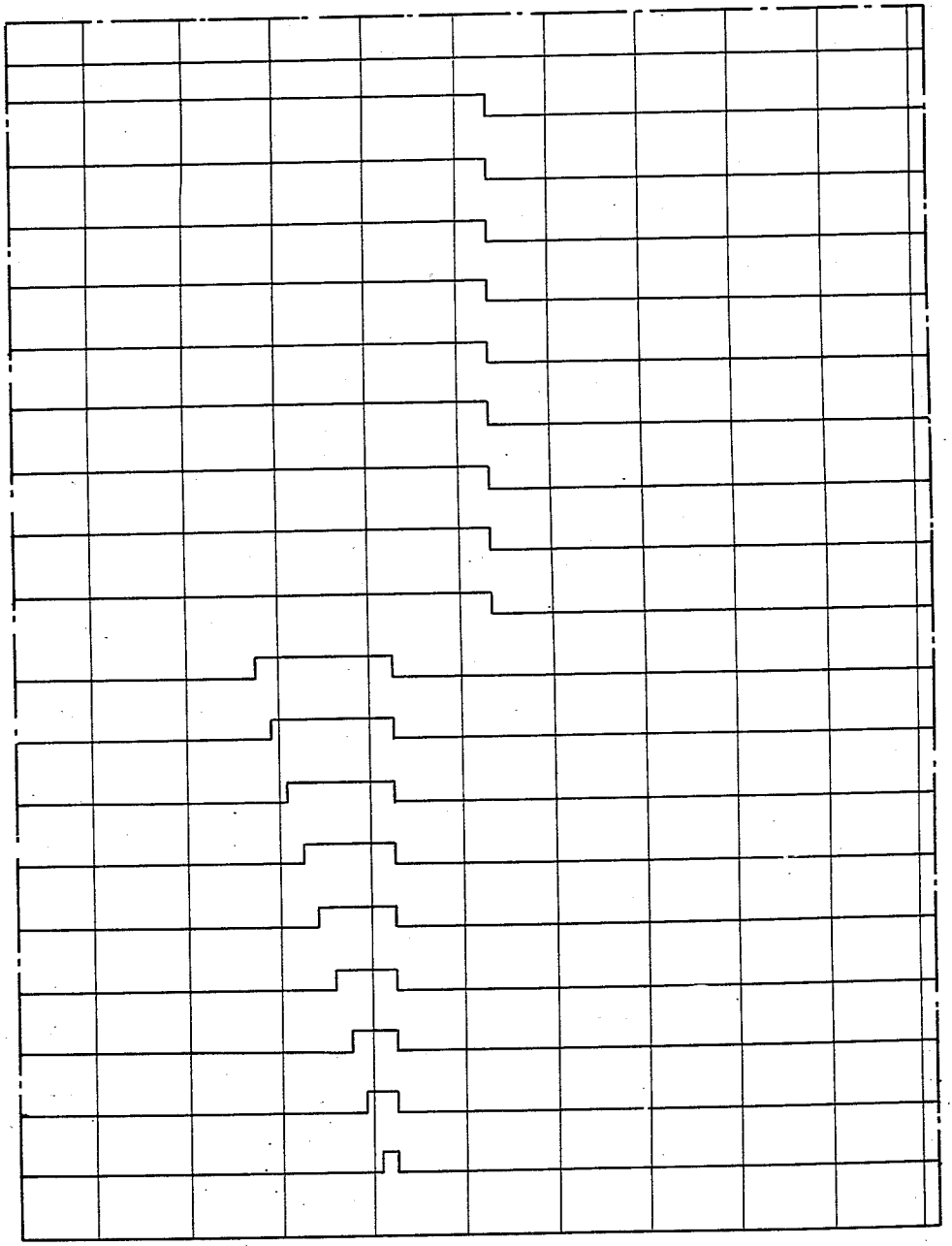
Figure 6G:
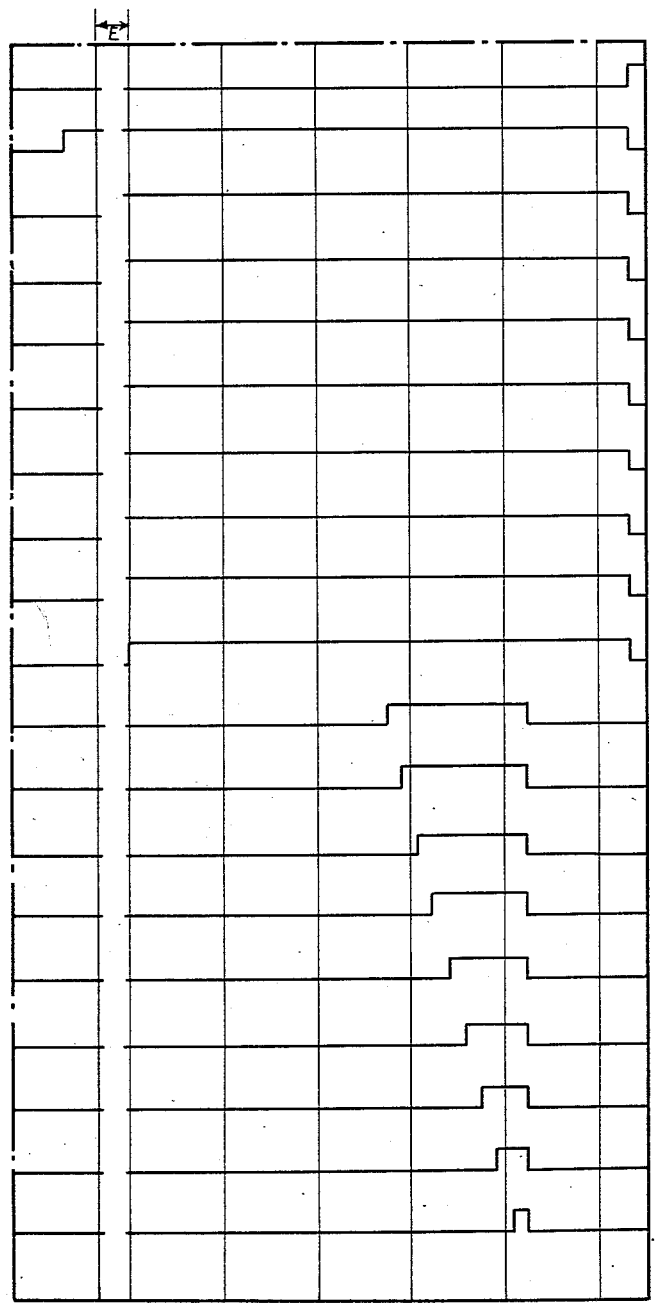

In the timing chart the triggers and gates shown in the circuit diagram are similarly designated at the left of Figs. 4a, 5a and 6a. A line representing the stable condition of each during a cycle of operation extends from each designation to the right across the consecutively lettered drawings bearing the same numeral designation.

Spaced along the top of the chart in Figs. 4a–4g there are listed various circuit elements followed by an R or L to indicate Right or Left respectively. This indicates that the element listed is switched to the Right or Left condition respectively, as the case may be, at the cyclic time indicated by its position along the chart.

When the line representing the stable condition of a trigger is shown in the lower of its two extreme positions it is indicative of the trigger being in the Left condition. When that line is in its upper position it is indicative of the trigger being in the Right condition. When the line representing the condition of a gate is in its lower position the gate is de-conditioned and when that line is in its upper position the gate is conditioned. If the space between a conditioned and de-conditioned line is blacked in it indicates that the gate is conductive during the entire time represented by the blacked-in portion. It will be noted further that gates shown to be conditioned may have pulses superimposed on the conditioned portion of the line representing its stable condition. These pulses denote the time of occurrence and polarity of the output pulses of the gate. It follows therefore that a conditioned gate having negative output pulses extending from its conditioned-representing line is non-conductive when conditioned and not receiving input pulses. A large number of vertical lines underneath a conditioned-representing line indicates that the negative output pulses produced by that gate are too numerous to be shown individually on the chaft. The gates 73, 53U, 79U, 123T, 125T, 139H and 141H are of a cathode follower type and a negative output pulse is therefore produced by a negative input pulse.

Referring to Figs. 4a, 5a, and 6a the stable condition of the circuits at starting is as follows: Gates 55, 73, 65, 53U, 79U, 33, 37U, 123T, 39T, 51U, 121T, 137H, 49CU, 119CT, 135H, 125T, 139H, 141H, and 41H are non-conducting. Gates 67 and 31 are conducting. Triggers 62, T*mc*, T*mp*, TCU, TCT, M*p*T9–M*p*T1 and McT9–McT1 are all in the Left condition; triggers S1T, S2T, S3T and S4T are in the Right condition; and buffers 111 and 129 are nonconducting.

To perform the indicated operation, it is first necessary to set up the multiplicand (124) in the multiplicand push-button switches and multiplier (236) in the multiplier push-button switches. The "calculate" (Fig. 4a) switch is then operated. Upon operation of the calculate switch, triggers S1T (Fig. 5a) and S4T (Fig. 6a) revert to Left condition and gates 55 (Fig. 4a), 53U (Fig. 4a), 51U (Fig. 4a) and 49CU (Fig. 4a) become conditioned. Gate 53U, being conditioned, commences to transfer positive pulses in response to positive C pulses applied to it; gate 51U being conditioned transfers a positive pulse in response to each negative F1 pulse applied to it; and gate 49CU transfers a negative pulse in response to each KF1 pulse applied to it. When the next negative A pulse is applied to gate 55, a positive pulse is transferred therefrom to the inverter tube T57I and a negative pulse is applied to switch the trigger T*mp* (Fig. 5a) to the Right condition. This switching of T*mp* causes the trigger 62 (Fig. 5a) to switch to the Right condition thereby conditioning gate 73 (Fig. 5a). The switching of T*mp* also de-conditions gate 67 (Fig. 4a) and conditions gate 65 (Fig. 4a). Upon application of the next negative C pulse to gate 65 the trigger M*p*T9 (Fig. 6a), being conditioned by virtue of trigger T*mp* being in the Right condition, is switched to the Right condition and in so switching conditions M*p*T8 (Fig. 6a) to be responsive to a positive pulse transferred to it. It will be noted that a break A then occurs in the timing chart.

Following the break A the next negative C pulse to gate 65 (Fig. 4a) causes M*p*T8 to be switched to the Right condition and thereby conditions M*p*T7 (Fig. 6a). A break B then occurs in the chart following which the digit-representing element M*p*T7 is switched to the Right condition in response to the next negative C pulse applied to gate 65. This switching causes M*p*T6 (Fig. 6a) to be conditioned so that the next negative C pulse will cause it to switch to the Right condition. The next break C in the timing diagram occurs during the interval of time between the switching of M*p*T7 and M*p*T6.

The next negative C pulse applied to gate 65 following the break C switches M*p*T6 to the Right condition and causes the conditioning of M*p*T5 (Fig. 6a). Since the units digit of the multiplier is 6, this switching of M*p*T6 conditions gate 79U (Fig. 5a). Hence, the next positive C pulse transferred to gate 53U causes it to conduct, and this conduction causes the conditioned gate 79U to conduct which permits the inverter T85I to transfer a negative pulse to the trigger T*mc* (Fig. 5a) causing it to switch to the Right condition. This switching of T*mc* de-conditions gate 31 (Fig. 4a) and conditions gate 33. The next negative KF1 pulse applied to gate 33 (Fig. 4a) causes it to transfer a positive pulse to McT9 (Fig. 6a) to switch it from the Left to the Right condition and thereby condition McT8 (Fig. 6a). Successive negative KF1 pulses in a like manner cause McT8, McT7, McT6, McT5 and McT4 (Fig. 6a) to switch to the Right condition. Since the units digit of the multiplicand is 4, the switching of McT4 to the Right condition conditions gate 37U (Fig. 4a) and thereby permits it to transfer pulses in response to pulses applied to it from the gate 51U (Fig. 4a). Since the pulses applied to the gate 51U are negative F1 pulses, one pulse will be transferred by gate 37U for each pulse transferred by gate 33 and applied to the multiplicand receiving device.

The next negative KF1 pulse applied to gate 33 will cause it to transfer a pulse to McT3 (Fig. 6a) to switch it to the Right condition and the next negative KF1 pulse afterwards occurring will cause McT2 (Fig. 6a) to be switched to the Right condition. Since the tens digit of the multiplicand is 2, this switching of McT2 conditions gate 39T (Fig. 4a) thereby permitting it to transfer pulses in response to pulses applied to it from gate 51U. The next negative KF1 pulse applied to the multiplicand receiving device will cause McT1 (Fig. 6a) to switch to the Right condition and, since the hundreds digit of the multiplicand is 1, will condition gate 41H (Fig. 4a) thereby permitting it also to transfer pulses in response to pulses applied to it from the gate 51U. Also, the switching of McT1 to the Right condition conditions the trigger T*mc* so that it will be switched to the Left condition by the next negative F1 pulse. When the next negative F1 pulse switches the trigger T*mc* back to Left condition, the gate 33 is de-conditioned and the gate 31 is conditioned. The next positive F1 pulse applied to the gate 31 will cause it to transfer a negative pulse to all digit-representing elements of the multiplicand receiving device to switch them all to the Left condition and thereby de-condition gates 37U, 39T and 41H to prevent further entries into the result register. Thus, the multiplicand has been entered into the result register one time. This entry cycle was initiated by the fourth negative C pulse and was completed prior to the receipt of negative C pulses by gate 65. In response to the fifth negative C pulse being applied to gate 65, trigger MpT5 is switched to the Right condition. However, gates 79U, 125T (Fig. 5a) and 141H (Fig. 5a) remain conditioned because trigger MpT6 is not switched from the Right condition. Between this fifth negative C pulse and the sixth negative C pulse, another entry of the multiplicand into the result register occurs in the same manner as just described. Similarly, such an entry occurs between the sixth and seventh, seventh and eighth, eighth and ninth, and ninth and tenth negative C pulses.

However, upon application of the ninth negative C pulse to the multiplier receiving device via gate 65 the trigger Tmp is conditioned and the next negative KF1 pulse switches it to the Left condition. During the time interval between the ninth and tenth negative C pulses, the trigger Tmp is therefore alternately in Left and Right conditions as successive negative KF1 and negative A pulses are applied to it. However, as the tenth negative C pulse occurs, the trigger Tmp is in Left condition thereby causing gate 67 to be conditioned and gate 65 de-conditioned. Therefore, since positive D pulses occur simultaneously with negative C pulses, at the time of the tenth negative C pulse, gate 67 transfers a negative pulse in response to a positive D pulse causing all the digit-representing elements of the multiplier receiving device to switch to the Left condition thereby de-conditioning gates 79U, 125T, and 141H. This same negative pulse transferred from gate 67 is also applied to gate 73 (Fig. 5a) which applies a pulse to the sequence unit causing trigger S1T to switch to the Right condition and trigger S2T (Fig. 5a) to reverse to Left condition. When trigger S1T is switched to the Right condition, the gates 53U, 51U and 49CU are de-conditioned. The switching of trigger S2T to the Left condition causes the gates 123T (Fig. 5a), 121T (Fig. 5a) and 119CT (Fig. 5a) to be conditioned, gate 123T will transfer positive pulses in response to positive C pulses applied to it, gate 121T will transfer positive pulses in response to negative F2 pulses applied to it and gate 119CT will transfer negative pulses in response to negative KF2 pulses applied to it.

During the entry of the multiplicand into the result register a number of times equal to the units digit of the multiplier three conditions of carry occur. During the third entry of the multiplicand into the result register, the units order of the result register advanced from 9 to 0 and, in so doing, switched the units carry trigger TCU (Fig. 5a) from the Left to the Right condition. The next negative KF1 pulse applied to trigger TCU via gate 49CU causes the trigger TCU to switch back to the Left condition and thereby provide a positive pulse for transfer to the buffer 111 (Fig. 5a) to permit negative pulse transfer to the tens order of the result register. Since the pulse applied to the tens order is initiated by a negative KF1 pulse it is out of phase with any pulses that could have been applied to the tens order via gate 39T.

During the fifth entry of the multiplicand into the result register, a carry occurred between both the units and tens orders and the tens and hundreds orders. The carry from the units to the tens orders is as just previously described. The carry from the tens to the hundreds order occurs as follows: As the tens order advances from 9 to 0, a pulse is applied to the tens carry trigger TCT (Fig. 5a) causing it to switch from the Left to the Right condition. When the next negative KF1 pulse is applied to TCT from the gate 49CU it switches back to the Left condition and transfers a positive pulse to the buffer 129 (Fig. 5a) to permit a negative pulse to be applied to the hundreds order of the result register. If pulses were being transferred by the gate 41H at this time the carry pulse would be out of phase with it because the carry pulse is initiated by a negative KF1 pulse and the pulses transferred by gate 41H are initiated by negative F1 pulses.

As was previously mentioned, the tenth negative C pulse caused the switching of triggers S1T and S2T thereby de-conditioning gates 53U, 51U and 49CU and conditioning gates 123T, 121T and 119CT. This switching causes the frequency of the pulses applied to gates 37U, 39T and 41H and the carry triggers TCU and TCT to be increased by a factor of 10, the pulses applied to the triggers being 180° out of phase with the pulses applied to the gates. When all the digit-representing elements of the multiplier receiving device are switched to the left condition by the tenth positive D pulse, the positive bias voltage is removed from trigger Tmp, so that the next positive pulse applied to it in response to a negative A pulse applied to the gate 55 switches the trigger Tmp to Right condition where it remains until trigger MpT1 is again switched to the Right condition. When the trigger Tmp switches to the Right condition, the gate 67 is de-conditioned and the gate 65 conditioned. The next negative C pulse therefore causes MpT9 to switch to the Right condition.

Successive negative C pulses transferred to gate 65 will cause MpT8–MpT3 (Fig. 6a) to switch to the Right condition. When MpT6 is switched to the Right condition, the gate 79U is conditioned but cannot effect pulse transfer because the gate 53U is de-conditioned. This switching of MpT8–MpT3 is not shown on the timing chart and occurs during the break D.

Since the tens digit of the multiplier is 3, the switching of MpT3 to the Right condition causes the gate 125T to be conditioned. Since the gate 123T is already conditioned, the next negative C pulse causes the trigger Tmc to be switched to the Right condition and thereby de-condition gate 31 and condition gate 33.

Successive negative KF1 pulses transferred to the gate 33 cause McT9–McT4 to be switched to the Right condition. When McT4 switches to the Right condition, the gate 37U is again conditioned so that it responds to positive pulses transferred from the gate 121T in response to negative F2 pulses applied to it. Since these negative F2 pulses have ten times the frequency of the negative F1 pulses effective during the multiplier units entry cycle, forty entries will be made into the units order of the result register during this tens entry cycle. This entry into the result register of ten times the number of pulses during the tens cycle as during the units cycle produces the same result that woud be accomplished by employing column shift and entering the same number of pulses into the result register during each multiplier entry cycle.

Subsequent successive negative KF1 pulses applied to gate 33 switch McT3–McT1 to the Right condition. When each of these digit-representing elements is switched the gates 39T and 41H are conditioned and pulses transferred into the result register.

When McT1 switches to the Right condition, a bias voltage is applied to trigger Tmc allowing it to be switched to the Left condition by the next negative F1 pulse applied to it and thereby de-conditions gate 33 and conditions gate 31. Gate 31 then transfers a negative pulse to the multiplicand receiving device in response to the next positive F1 pulse applied to it to effect switching of all digit-representing elements thereof to the Left condition and thereby de-condition gates 37U, 39T and 41H.

In the above cycle of the multiplicand receiving device to effect entries into the result register in response to the tens digit of the multiplier four carry pulses are emitted by the units order of the result register, two by the tens order and one by the hundreds order. There being no input to the thousands order, other than the carry pulses thereto, no phase shift or other entry means is associated with it.

Following the above-mentioned entry of the multiplicand into the result register, the next negative C pulse causes MpT2 (Fig. 6a) to reverse to the Right condition, following which a second multiplicand entry cycle occurs. The next negative C pulse applied to the multiplier receiving device switches MpT1 (Fig. 6a) to the Right condition allowing a third multiplicand entry to be made. When MpT1 is switched to the Right condition, a bias voltage is applied to the trigger Tmp permitting it to be switched to the Left condition by the next negative KF1 pulse. Since gate 55 is conditioned and therefore effecting pulse transfer in response to negative A pulses the trigger Tmp will be switched from each stable condition to the other. Trigger Tmp is in the Left condition when the next positive D pulse (positive D pulses occur simultaneously with negative C pulses) is transferred to gate 67 to switch all digit-representing elements of the multiplicand receiving device to the Left condition thereby de-conditioning gates 79U, 125T and 141H and effecting pulse transfer from gate 73 to the sequencer to switch the triggers S2T and S3T (Fig. 5a) to the Right and Left condition, respectively. This switching of the trigger S2T de-conditions gates 123T, 121T and 119CT and the switching of the trigger S3T conditions gates 139H (Fig. 5a), 137H (Fig. 5a) and 135CH (Fig. 5a).

The trigger T$mp$ is switched to the Right condition by the next negative A pulse and gate 65 is conditioned and gate 67 is de-conditioned. The gate 137H is supplied with negative F3 pulses, and the pulses applied by it to gates 37U, 39T and 41H are at ten times the frequency of the pulses applied to these gates during the multiplier tens entry cycle and one hundred times the frequency of the pulses applied during the multiplier units entry cycle.

The next negative C pulse switches M$p$T9 to the Right condition and successive negative C pulses switch M$p$T8–M$p$T1 to the Right condition. The timing chart does not show the successive switching of M$p$T8–M$p$T2 since this occurs during the break E.

When M$p$T2 switches to the Right condition, the gate 141H is conditioned because the hundreds digit of the multiplier is 2. The gate 139H is conditioned because the trigger S3T is in the Left condition and the next positive C pulse transferred to the gates 139H causes pulse transfer from the gate 141H to the inverter 85I (not shown) and therefrom to the trigger T$mc$ to switch it to the Right condition. This switching of T$mc$ de-conditions gate 31 and conditions gate 33. Hence, successive negative KF1 pulses are transferred to gate 33 which switches McT9–McT1 of the multiplicand receiving device to the Right condition. When McT4 is switched to the Right condition, the gate 37U is conditioned to effect pulse transfer in response to the output of the gate 137H. Since these pulses have ten times the frequency of those used when multiplying by the tens digit of the multiplier, four hundred pulses will be applied to the units order of the result register during this entry cycle. Such simulates a double column shift and carry pulses will occur forty times between the units and tens orders and are out of phase with any pulse being applied to that order via gate 39T. When McT1 is switched to the Right condition, the trigger T$mc$ is conditioned. The next negative F1 pulse switches the trigger T$mc$ to the Left condition and thereby conditions the gate 31 and de-conditions the gate 33. The next positive F1 pulse transferred to the gate 31 causes McT9–McT1 to switch to the Left condition to de-condition the gates 37U, 39T and 41H.

When M$p$T1 of the multiplier receiving device is switched to the Right condition, trigger T$mp$ is conditioned so that it will be switched to the Left condition by the next negative KF1 pulse. Successive negative KF1 and negative A pulses will reverse trigger T$mp$. However, when the next positive D pulse occurs (simultaneously with a negative C pulse), trigger T$mp$ will be in the Left condition and hence gate 67, responsive to the positive D pulse, will transfer a pulse to the multiplier receiving device causing all of its elements M$p$T9–M$p$T1 to switch to the Left condition thereby de-conditioning 79U, 125T and 141H. Furthermore, this same positive D pulse transferred to gate 67 causes gate 73 of the sequencer to conduct and thereby switch the reversing trigger S3T from the Left to the Right condition and the trigger S4T from the Left to the Right condition. This switching of trigger S3T de-conditions gates 135CH, 137H and 139H. The switching of the trigger S4T produces a pulse which is applied to trigger 62 to switch it from the Left to the Right condition thereby de-conditioning the gate 73. The switching of trigger S4T de-conditions gate 55 thereby preventing it from being rendered conductive in response to negative A pulses to switch the trigger T$mp$ from the Left to the Right condition. Negative KF1 pulses are applied to the trigger T$mp$ and it remains in the Left condition. All of the gates, triggers, and buffers of the circuit, with the exception of the triggers of the result register, are now in their original starting condition and the multiplication is complete.

While there have been shown and described and pointed out the fundamental novel features of the invention as applied to a preferred embodiment, it will be understood that various omissions and substitutions and changes in the form and details of the circuit illustrated and in its operation may be made by those skilled in the art, without departing from the spirit of the invention. It is the intention, therefore, to be limited only as indicated by the scope of the following claims.

What is claimed is:

1. In an electronic multiplier having a result register for manifesting the product of a multiplicand and a multiplier, and a multiplicand receiving device and a multiplier receiving device for receiving a preselected multiplicand and multiplier, respectively; a source for producing separate trains of pulses; circuit means connecting said source to said multiplier receiving device, said multiplicand receiving device and said result register; and electronic switching means connected between said source and each of said devices and between said source and said result register, said switching means including a first set of electronic gates, a sequencer coupling said electronic gates and said multiplier receiving device and cyclically responsive to the latter for selectively conditioning one of said gates during each cycle of the operation of said multiplier receiving device, a second set of electronic gates connected to said multiplicand receiving device and responsive thereto so that one gate is conditioned during each cycle of the operation of said multiplicand receiving device, said second set of gates being coupled to said result register and said first set of gates to enable operation of said second set of gates during each cycle of operation of said multiplicand receiving device to transfer pulses to said result register.

2. In an electronic multiplier; a multiplier receiving device sequentially operable at one preselected speed; a multiplicand receiving device sequentially operable at another preselected speed so that it completes a cycle of operation intermediate sequential operations of said multiplier receiving device; a source for providing separate series of pulses, each series having a recurrence frequency ten times that of the series having the next lower recurrence frequency; a result register for receiving pulses from said source and manifesting the product of a multiplicand and a multiplier; voltage transferring means including electronic switches and connections therefrom to said multiplicand receiving device for enabling sequential operation of the multiplicand receiving device in response to the sequential operation of the multiplier receiving device; first electronic gate means connected to be responsive to the sequential operation of said multiplicand receiving device and means connecting said gate means to permit operation of the result register in response to the sequential operation of the multiplicand receiving device; circuit means including electronic tube means connected to be actuated from said multiplier receiving device; electronic sequencer means connected to be actuated from said electronic tube means and second electronic gate means selectively energizable from said sequencer and connected to be conditioned by said multiplicand receiving device to enable, at one time, pulses from only a selected one of said series of pulses to be received into said result register after said multiplicand receiving device has reached a preselected place in its cycle of operation, said first and second gate means being connected in series, the input of said second gate means being connected to said source and the output of said first gate means being connected to said result register.

3. In an electronic multiplier including a cyclically operable multiplier receiving device for entering a preselected multiplier therein and a cyclically operable multiplicand receiving device for entering a preselected multiplicand therein; a result register for manifesting the product of said multiplier and said multiplicand; a source of pulses including means for producing a plurality of pulse trains each having ten times the recurrence frequency of the pulse train having the next lower recurrence frequency; first gate circuits, electronic circuit means connected to permit the operation of said multiplier and said multiplicand receiving device in response to pulses from said source, a sequencer circuit electronically coupled to said multiplier receiving device to be responsive cyclically as the multiplier receiving device completes a cycle of operation to condition said first gate circuits to enable said result register to be responsive to said pulse train having the next higher recurrence frequency; and second gate circuits corresponding to each order of said multiplicand receiving device; a connection from said multiplicand receiving device to each said second gate to condition that gate during each cycle of operation of said multiplicand receiving device in response to the cyclic operation thereof; and connections from the second gates to the result register and to the first gates to enable conduction of each second gate during each cycle of operation of said multiplicand receiving device to convey pulse entries to said result register.

4. In a cyclically operable multiplier wherein a multiplicand is multiplied by the digit of each order of a multiplier, one at a time, in succession; a result register for manifesting the product of said multiplicand and multiplier; a source of pulses for effecting cyclic operation of said multiplier, said source providing a plurality of pulse trains for effecting entries into said result register, the recurrence frequency of each pulse train being ten times that of a pulse train having the next lower recurrence frequency so that a pulse train corresponds to each order of the multiplier; a multiplier receiving device; sequencer circuit means connected through first electronic gating means to said multiplier receiving device to thereby synchronize the operation of said sequencer circuit means with the cyclic operation of said multiplier; second electronic gating means; and third electronic gating means, said second gating means being connected to be responsive to the operation of said sequencer circuit means and couple said source to said result register, through said third electronic gating means conditioned by the operation of said multiplicand receiving device, to permit entries into the result register in response to the train of pulses corresponding to each order of the multiplier, from the lowest to the highest.

5. In an electronic multiplier having a plural order multiplicand receiving device and a plural order multiplier receiving device and means for entering a preselected multiplicand and multiplier in the respective devices and for effecting sequential cyclic operation thereof, a result register for receiving pulse entries and manifesting the product of said multiplicand and multiplier; a source of pulses for providing pulse entry to said result register; a first set of electronic gates connected to be responsive to pulses from said source, a gate being provided for each order of said preselected multiplier; a sequencer connected through electronic gating means to said multiplier receiving device to be responsive to the sequential cyclic operation of said multiplier receiving device, said sequencer being coupled to said first set of electronic gates for selectively conditioning a preselected gate thereof; a second set of electronic gates connected between said first set of electronic gates and said result register, one for each order of the multiplicand receiving device; a connection from each order of said multiplicand receiving device to the corresponding gate of said second set of gates to condition that gate in response to the cyclic operation of said multiplicand receiving device to permit entries into the result register when a gate of said second set of gates is responsive to pulses from said source.

6. In an electronic multiplier having cyclically operable multiplicand and multiplier receiving devices for receiving a preselected multiplicand and multiplier respectively, each device comprising a series of digit-representing elements having two stable conditions wherein each element is representative of the same digit of an arbitrarily chosen number of orders and means for advancing the multiplicand receiving device through a complete cycle of operation while the multiplier receiving device is advanced one step in its cycle of operation; a result register for manifesting the product of said multiplier and multiplicand in response to pulse entries; a source for providing a number of pulse trains equal in number to and corresponding to the respective orders of the multiplier, each pulse train having a recurrence frequency proportional to the order of the multiplier corresponding thereto; a first set of electronic gates wherein one gate is connected to said source to be responsive to each of said pulse trains; a sequencer electronically coupled to said multiplier receiving device to be cyclically responsive thereto and electronically coupled to said gates for selectively conditioning one of said gates during each cycle of operation of said multiplier receiving device; a second set of electronic gates, one corresponding to each order of said multiplicand receiving device; a connection from said multiplicand receiving device to each gate of said second set to condition that gate during each cycle of operation of said multiplicand receiving device in response to the cyclic operation thereof and connections from said second set of gates to the result register and to said first set of gates to enable conduction of each gate of said second set during each cycle of operation of said multiplicand receiving device to convey pulse entries to said result register.

7. An electronic multiplier wherein a multiplicand and a multiplier are entered into pulse responsive devices and the product of said multiplicand and multiplier is indicated by a pulse responsive result register; a multi-recurrence frequency pulse source for providing pulses to effect multiplication of a multiplicand by the respective digits of the multiplier; gate circuit means respectively and independently interconnecting said source and said result register and said source and said multiplicand receiving device to effect pulse entry into said result register; and sequencer circuit means electronically coupled to said multiplier receiving device for rendering, conjointly with said multiplicand receiving device, said respective gate circuit means responsive to pulses from said source in accordance with the order of the multiplier by which the multiplicand is next to be multiplied.

8. An electronic circuit including a first device cyclically operable at one uniform speed, a second device cyclically operable at a different uniform speed; a third pulse-responsive device to be energized; a source for producing a plurality of pulse trains of different recurrence frequency, said pulse trains one at a time energizing said third device; a first electronic gate circuit corresponding to each pulse train and connected to be responsive thereto; a sequencer connected to be responsive to said second device for permitting the gate circuits to be responsive, one at a time, to the pulse train corresponding thereto during a preselected portion of each cycle of operation of said device; and a second electronic gate circuit connected between said first gate circuit and said third device and connected to be conditioned by said first device during a preselected portion of each cycle of operation thereof to be responsive to said first gate circuit.

9. An electronic multiplier for indicating the product of a multiplicand and multiplier including a source of pulses providing a number of pulse trains equal to the number of digital orders of the multiplier, each pulse train having ten times the recurrence frequency of a pulse train having the next lower recurrence frequency so that each pulse train, from the one having the lowest recurrence frequency to the one having the highest, corresponds to an order of the multiplier from the lowest to the highest, respectively; a multiplicand receiving device and a multiplier receiving device for receiving a multiplicand and a multiplier, respectively; a result register for exhibiting the product of said multiplicand and multiplier; first gate circuit means coupling said source to said result register; electronic cyclic means including a sequencer connected to be cyclically controlled from said multiplier receiving device and connected to effect a conditioning of said first gate circuit means to be responsive to said source; and second gate circuit means connected to be conditioned by said multiplicand receiving device to permit pulses from said source to pass from said first gate circuit means to said result register thereby separately multiplying the multiplicand by the digit of each order of the multiplier in response to the pulse train corresponding to that order so that the indicated product of each multiplication is equal to the partial product multiplied by a number equal to the digital order of the multiplier digit which effected that multiplication.

10. An electronic multiplier for multiplying a multiplicand having three digital orders by a multiplier having three digital orders; a cyclically operable multiplicand receiving device having nine digit-representing elements corresponding to the digits 1–9 respectively, each element having two stable conditions alternately assumed in response to pulses applied thereto, said elements being sequentially switchable to one stable condition and simultaneously switchable to the other in response to pulses; three push-button switches connected to each said element, each switch corresponding to a separate digital order and being effective when closed to enter into the multiplicand receiving device the same digit of a multiplicand so that when the element to which it is connected is switched to said one stable condition an increased voltage is transferred over all closed switches; a cyclically operable multiplier receiving device having nine digit-representing elements corresponding to the digits 1–9 respectively, each element having two stable conditions alternately assumed in response to pulses applied thereto, said elements being sequentially switchable to one stable condition and simultaneously switchable to the other in response to pulses; three push-button switches connected to each said element, each switch corresponding to a separate digital order and being effective when closed to enter into the multiplier receiving device the same digit of a multiplier so that when the element to which it is connected is switched to said one stable condition an increased voltage is transferred over all closed switches; a first source of pulses connected to sequentially switch the elements of the multiplier receiving device; a second source of pulses having at least ten times the recurrence frequency as the pulses from said first source connected to sequentially switch the elements of said multiplicand receiving device; a third source of pulses for producing three pulse trains of different recurrence frequencies, each pulse train having a recurrence frequency equal to ten times that of the train having the next lower recurrence frequency; a pulse-responsive result register connected to indicate the product of said multiplicand and multiplier in response to pulses from said third source; an electronic gate for each pulse train and connected to be rendered effective when conditioned and pulses are received from said pulse train; and a sequencer circuit coupled to said multiplier receiving device to be responsive as the elements of said multiplier receiving device are simultaneously switched to successively condition said electronic gates one at a time.

11. An electronic multiplier for multiplying a multiplicand having three digital orders by a multiplier having three digital orders; a cyclically operable multiplicand receiving device having nine digit-representing elements corresponding to the digits 1–9 respectively, each element having two stable conditions alternately assumed in response to pulses applied thereto, said elements being sequentially switchable to one stable condition and simultaneously switchable to the other in response to pulses; three push-button switches connected to each said element, each switch corresponding to a separate digital order and being effective when closed to enter into the multiplicand receiving device the same digit of a multiplicand so that when the element to which it is connected is switched to said one stable condition an increased voltage is transferred over all closed switches; a cyclically operable multiplier receiving device having nine digit-representing elements corresponding to the digits 1–9 respectively, each element having two stable conditions alternately assumed in response to pulses applied thereto, said elements being sequentially switchable to one stable condition and simultaneously switchable to the other in response to pulses; three push-button switches connected to each said element, each switch corresponding to a separate digital order and being effective when closed to enter into the multiplier receiving device the same digit of a multiplier so that when the element to which it is connected is switched to said one stable condition an increased voltage is transferred over all closed switches; a first source of pulses connected to said multiplier receiving device to sequentially switch the elements of the multiplier receiving device; a second source of pulses having at least ten times the recurrence frequency as the pulses from said first source and connected to sequentially switch the elements of said multiplicand receiving device; a third source of pulses for producing three pulse trains of different recurrence frequency, each pulse train having a recurrence frequency equal to ten times that of the train having the next lower recurrence frequency; a pulse-responsive result register for indicating the product of said multiplicand and multiplier in response to pulses from said third source; an electronic gate for each pulse train connected to receive pulses therefrom and be rendered effective in response thereto when conditioned; a sequencer circuit electronically coupled to said multiplier receiving device and said electronic gates to be responsive after the elements of said multiplier receiving device are simultaneously switched to successively condition said electronic gates one at a time; a set of three electronic gates commonly connected to said first-mentioned gates to receive input pulses therefrom and connected to said result register to supply pulses thereto; and a connection from each of said three electronic gates to a different one of the switches connected to said elements of said multiplicand receiving device to transfer said increased voltage to condition said three electronic gates so that pulses are applied to said result register in response to said input pulses.

12. In an electronic multiplier having a multiplicand receiving device for receiving a multiplicand, a multiplier receiving device for receiving a multiplier and a plurality of order counters for manifesting the product of said multiplicand and multiplier in response to pulses; a carry circuit for effecting pulse carry from a first order counter to a second order counter and including a carry trigger circuit having two stable conditions alternately assumed and switchable to only one of said stable conditions in response to the normal operation of said first order counter; a source of pulses; a buffer tube circuit connected between said carry trigger circuit and said second order counter and non-responsive to said carry trigger circuit when it is switched to said one condition; and an electronic gate having its output connected to said carry trigger circuit and responsive to pulses from said source to switch said carry trigger to its other stable condition to render said buffer tube circuit responsive to effect carry to said second order counter.

13. In an electronic multiplier having a multiplicand receiving device comprising a single series of pulse-responsive digit-representing elements and means for entering therein a multiplicand having a plurality of orders, a multiplier receiving device comprising a single series of pulse-responsive digit-representing elements and means for entering therein a multiplier having a plurality of orders, and a plurality of orders counters for manifesting the product of said multiplicand and multiplier in response to pulses; a carry circuit for effecting carry from a first order counter to a second order counter and from said second order counter to a third order counter and including a first and second carry trigger circuit connected to said first and second order counters respectively and having two stable conditions alternately assumed, said carry trigger circuits being switchable to only one of said stable conditions in response to the normal operation of said first and second order counters respectively; a source of pulses; a first buffer tube circuit connected between said first carry trigger circuit and said second order counter and non-responsive to said first carry trigger circuit when it is switched to said one condition; a second buffer tube circuit connected between said second carry trigger circuit and said third order counter and non-responsive to said second carry trigger when it is switched to said one condition; and an electronic gate having output connections to said carry trigger circuits and responsive to pulses from said source to switch said carry trigger circuits to their other stable condition to render said first and second buffer circuits responsive to effect carry to said second and third order counters respectively.

14. In an electronic multiplier having a first source of pulses providing first, second and third pulse trains of different recurrence frequency, a cyclically operable multiplicand receiving device comprising a single series of pulse-responsive digit-representing elements and means for entering a multiplicand therein having a plurality of orders and rendering said multiplicand receiving device responsive to pulses, a cyclically operable multiplier receiving device comprising a single series of pulse-responsive digit-representing elements for entering a multiplier therein having a plurality of orders, and a plurality of order counters for manifesting the product of said multiplicand and multiplier as a result of the selective response of said counters to pulses from any one of the pulse trains of said first source; gate circuit means coupling said first source and said counters a carry circuit for effecting a carry from a first order counter to a second order counter including a carry trigger circuit having two stable conditions alternately assumed, said carry trigger circuit being switchable to only one of said stable conditions in response to the normal operation of said first order counter; a second source of pulses wherein pulse occurrence is intermediate the pulse occurrence of said first source, said second source providing first, second, and third pulse trains of different recurrence frequency and corresponding to that of said first, second and third pulse trains from said first source; a buffer tube circuit connected between said carry trigger circuit and said second order counter and non-responsive to said carry trigger circuit when it is switched to said one condition; an electronic circuit having its output connected to said carry trigger circuit and its input connected to said second source to be selectively responsive to pulses from said first, second and third pulse trains of said second source to switch said carry trigger circuit to its other stable condition to render said buffer circuit responsive to effect carry to said second order counter and a sequencer circuit electronically coupled to said multiplier receiving device to be responsive as said multiplier receiving device completes each cycle of operation to permit said gate circuit means to be responsive to pulses from said source to render said counters and said electronic circuit selectively responsive.

15. In an electronic multiplier having a first source of pulses providing first, second and third pulse trains of different recurrence frequency, a cyclically operable multiplicand receiving device comprising a single series of pulse-responsive digit-representing elements and means for entering a multiplicand therein having a plurality of orders, a cyclically operable multiplier receiving device comprising a single series of pulse-responsive digit-representing elements for entering a multiplier therein having a plurality of orders, and a plurality of order counters for indicating the product of said multiplicand and multiplier as a result of the selective response of said counters to pulses from any one of the pulse trains of said first source; a carry circuit for effecting a carry from a first order counter to a second order counter and including a carry trigger circuit having two stable conditions alternately assumed, said carry trigger circuit being switchable to only one of said stable conditions in response to the normal operation of said first order counter; a second source of pulses wherein pulse occurrence is intermediate the pulse occurrence of said first source, said second source providing first, second, and third pulse trains of different recurrence frequency and corresponding to that of said first, second and third pulse trains from said first source; a buffer tube circuit connected between said carry trigger circuit and said second order counter and responsive to said carry trigger circuit when it is switched to said one condition; an electronic circuit having its output connected to said carry trigger circuit and its input connected to said second source to be selectively responsive to pulses from said first, second and third pulse trains of said second source to switch said carry trigger circuit to its other stable condition to render said buffer circuit responsive to effect carry to said second order counter; a sequencer circuit electronically coupled to said multiplier receiving device to be responsive as said multiplier receiving device completes each cycle of operation; electronic gate means including first and second sets of electronic gates connected between said counter and said first source of pulses; connections from said sequencer circuit to said first set of electronic gate means and from said sequencer circuit to said electronic circuit to cause said carry trigger circuit and connections from said multiplicand receiving device to said second set of electronic gates to said counters to be non-responsive to one of said pulse trains and enable response to another when said sequencer circuit is rendered responsive.

16. In an electronic multiplier wherein the multiplicand is multiplied by the digit of each order of the multiplier in response to a pulse train having a recurrence frequency corresponding to that order so that the manifested product of each multiplication is equal to the partial product multiplied by a number equal to the digital order of the multiplier digit which effected that multiplication, a source for each of said pulse trains, an electronic carry circuit, electronic gates respectively connected between said carry circuit and the sources of said pulse trains to selectively energize said carry circuit in response to said pulse trains, and circuit means for conditioning the electronic gates one at a time in accordance with the digital order of the multiplier which is then effecting multiplication.

17. An electronic multiplier wherein each digit of a multiplier causes separate multiplication of a multiplicand and the product of that multiplication is entered directly into a device for indicating the product of said multiplicand and multiplier including a source of pulses, a cyclically operable multiplicand receiving device steppable in response to successive pulses through the different digit positions of the numerical system employed and capable of manifesting each digit of a multiplicand entered therein when stepped through the corresponding positions, first gate circuit means connected between said source and said multiplicand receiving device, a device for indicating the summation of pulses transferred thereto, second gate circuit means connected between said summation indicating device and said source, and connections joining said multiplicand receiving device and said second gate circuit means for permitting the transfer of pulses from said source to said device in response to a manifestation of each digit of said multiplicand.

18. An electronic multiplier wherein the digit of each order of a multiplier causes a separate multiplication of the multiplicand and the product of that multiplication is entered directly into a pulse summation device for manifesting the product of a multiplicand and multiplier including a source of pulses for producing a plurality of pulse trains of different recurrence frequency, each pulse train having a recurrence frequency of ten times that of the pulse train having the next lower recurrence frequency so that a pulse train corresponds to each order of the multiplier, a multiplier receiving device connected to be cyclically operable in response to pulses from said source and comprising a single series of digit-representing elements each having two stable conditions alternately assumed in response to pulses and circuit interrupting means for entering therein a multiplier having a plurality of orders, a multiplicand receiving device cyclically operable under the control of said multiplier receiving device in response to pulses from said source and comprising a single series of digit-representing elements each having two stable conditions alternately assumed in response to pulses and circuit entering means for entering therein a multiplicand having a plurality of orders, gate circuit means comprising a first set of gates and a second set of gates connected between said source and said pulse summation device, connections between said circuit entering means of said multiplicand receiving device and said second set of gates for conditioning the latter, and a pulse train selection circuit comprising a sequencer circuit coupling said multiplier receiving device and said first set of gates and responsive to said multiplier receiving device for permitting pulse entries into said summation device in response to the train of pulses corresponding to each order of the multiplier from the lowest to the highest in turn.

19. In an electronic multiplier wherein a multiplier is entered in a multiplier receiving device and the digit of each order thereof determines the initiation of the cyclic operation of a multiplicand receiving device so that entries are made into a result register in accordance with the digital values of the digits of a multiplicand entered in a multiplicand receiving device; a source of pulses for providing a pulse train corresponding to each order of said multiplier; a gate circuit corresponding to each order of said multiplicand and connected to be energized, when conditioned, by the pulse train corresponding to said order; a multiplicand gate for each order of said multiplicand, each gate being responsive, when energized, to any one of said gate circuits, said multiplicand gates being connected to be selectively conditioned by the cyclic operation of said multiplicand receiving device to permit pulses to be applied to said result register; and a sequentially operable circuit coupled to and synchronized with said multiplier receiving device and comprising a number of trigger circuits equal to the number of orders in said multiplier for conditioning said gate circuits in turn to permit pulse transfer to said result register in response to pulses from said source.

20. An electronic multiplier wherein a multiplier is entered into a multiplier receiving device and the digit of each order thereof, from the lowest order to the highest in turn, determines the initiation of the cyclic operation of a multiplicand receiving device so that entries are made into a result register in response to the digital values of the digits of a multiplicand entered into a multiplicand receiving device, said multiplier receiving device and multiplicand receiving device each comprising a single series of digit-representing elements each having two stable conditions alternately assumed in response to pulses and manually operable circuit make and break means connected to each digit-representing element of said multiplier receiving device and multiplicand receiving device, a said means being provided for each order of said multiplier and multiplicand and serving to effect the entry of a preselected multiplier and multiplicand in said multiplier receiving device and multiplicand receiving device respectively; a first source for supplying pulses to operate said multiplier and multiplicand receiving devices, said multiplicand receiving device being operated at at least ten times the speed it operates said multiplier receiving device; a second source of pulses for providing a pulse train corresponding to each order of said multiplier; a gate circuit corresponding to each order of said multiplier and connected to be energized, when conditioned, by the pulse train from said second source corresponding to said order; a multiplicand gate connected to be responsive to any one of said gate circuits, said multiplicand gate being connected to be selectively conditioned under the control of said multiplicand receiving device to permit pulses to be applied to said result register; a sequentially operable circuit coupled to and synchronized with said multiplier receiving device and comprising a number of trigger circuits equal to the number of orders of said multiplier each of said trigger circuits being coupled to a different one of said gates to condition and de-condition said gate circuits in turn and a gating circuit connecting said multiplier receiving device and said sequentially operable circuit; a multiplier trigger circuit coupled to said gating circuit and said sequentially operable circuit and having two stable conditions alternately assumed in response to pulses; a connection from one element of said multiplier receiving device to said multiplier trigger circuit to supply a bias voltage to the latter when said element is switched to one condition so that the next pulse applied to said trigger circuit from said first source switches said multiplier trigger circuit to one stable condition; and an electronic switch connected between said first source and said multiplier receiving device and connected to be conditioned by said multiplier trigger circuit when it switches to said one condition so that the next pulse from said first source switches all digit-representing elements of said multiplier receiving device to the same stable condition and operates said sequentially operable circuit.

21. A multiplier as set forth in claim 20 including a multiplicand trigger circuit having two stable conditions alternately assumed in response to pulses; a switching circuit coupling one said element of said multiplicand receiving device to said multiplicand trigger and to said first source to supply a bias voltage to the latter when said element is switched to one condition so that the next pulse received from said first source switches said multiplicand trigger circuit to one stable condition to enable the next pulse from said first source to switch all digit-representing elements of said multiplicand receiving device to the same stable condition; a first electronic gate for each order of said multiplier commonly connected to said first source and said sequentially operable circuit to be selectively conditioned and de-conditioned by said sequentially operable circuit; a second electronic gate for each order of said multiplier connected to be energized by the corresponding said first electronic gate and conditioned by a bias voltage transferred over said circuit make and break means of said multiplier receiving device to permit pulse transfer from said second electronic gate to switch said multiplicand circuit to the other stable condition; and electronic switch means connected between said first source and said multiplicand receiving device and connected to be conditioned and de-conditioned by said multiplicand trigger circuit to effect pulse transfer to said multiplicand receiving device to cause the sequential operation thereof when said multiplicand trigger circuit is in said other stable condition.

22. An electronic calculator for performing a given mathematical operation in response to two preselected numbers and entering the result thereof in a register in direct response to a source of pulses including means for producing a plurality of pulse trains of different recurrence frequency, coincidence electronic circuits connected between said means and said register for rendering said pulse trains selectively effective to actuate said register to enter said result, and electronic circuit means responsive to said source of pulses for rendering said coincidence circuits effective.

23. An electronic calculator for performing a given mathematical operation in response to two preselected numbers and entering the result thereof in a register in direct response to a source of pulses including means for producing a plurality of pulse trains of different recurrence frequency; coincidence electronic circuits connected between said means and said register for permitting said pulse trains to individually actuate said register to enter said result; a cyclically operable device for entering each of said numbers therein, a device corresponding to each of said numbers; a second source of pulses for operating said devices; and circuits interconnecting said devices and said second source of pulses and said coincidence circuits so that each digit of the number entered in one device permits initiation of the cyclic operation of the other device.

24. The calculator as set forth in claim 23 including a coupling circuit joining said one device and said coincidence electronic circuits and responsive to a preselected cyclic operation of said device; and connections from said other device to said coincidence electronic circuits to transfer a voltage thereto at a preselected cycle time during the operation of said other device, said cyclic time being determined by each digit of the number entered therein.

25. An electronic calculator for performing a given mathematical operation in response to pulse trains cyclically selected to effect operation in response to pulse transfer permitted between entry of preselected digital values therein including a first pulse-responsive cyclically operable receiving device having nine digit-representing elements corresponding to the digits 1–9 respectively, each element having two stable conditions alternately assumed in response to pulses applied thereto; a plurality of switching means each having two circuit positions and one terminal connected to each said element, each switching means corresponding to a separate digital order and being effective when in one position to enter the digital value to which it corresponds into said device so that when the element to which it is connected assumes one stable condition a voltage is transferred over all switching means in said one position; a second pulse-responsive cyclically operable receiving device cyclically operable and having nine digit-representing elements corresponding to the digits 1–9 respectively, each element having two stable conditions alternately assumed in response to pulses applied thereto; a plurality of switching means each having two circuit positions and having one terminal connected to each said element of said second device, each switching means corresponding to a separate digital order and being effective when in one position to enter the digital value to which it corresponds into said second device so that when the element to which it is connected assumes one stable condition a voltage pulse is transferred over all switching means in said one position, a source of pulses for producing pulse trains and coupling said circuits therefrom to said respective receiving devices to render the switching means thereof operative, and sequencing switching circuits coupled to said first receiving device and said coupling circuits to be responsive as the switching means thereof completes a cycle of operation to selectively condition said coupling circuits.

References Cited in the file of this patent

UNITED STATES PATENTS

| | | |
|---|---|---|
| 2,302,001 | Bryce | Nov. 17, 1942 |
| 2,369,662 | Deloraine | Feb. 20, 1945 |
| 2,398,771 | Compton | Apr. 23, 1946 |

(Other references on following page)

UNITED STATES PATENTS

| | | |
|---|---|---|
| 2,403,873 | Mumma | July 9, 1946 |
| 2,413,859 | Brand | Jan. 7, 1947 |
| 2,419,502 | Saxby | Apr. 22, 1947 |
| 2,461,895 | Hardy et al. | Feb. 15, 1949 |
| 2,484,115 | Palmer et al. | Oct. 11, 1949 |
| 2,595,045 | Desch | Apr. 29, 1952 |

FOREIGN PATENTS

| | | |
|---|---|---|
| 616,962 | Great Britain | Jan. 28, 1949 |

OTHER REFERENCES

Electronic Computing Circuits of the ENIAC, A. W. Burgs, Proc. of the I. R. E., vol. 35, #8; Aug. 1947; pages 758–759 and 763–766 only relied on.